United States Patent
Lynam

[11] Patent Number: 6,122,093
[45] Date of Patent: *Sep. 19, 2000

[54] REDUCED ULTRAVIOLET RADIATION TRANSMITTING, SAFETY PROTECTED ELECTROCHROMIC GLAZING ASSEMBLY

[75] Inventor: Niall R. Lynam, Holland, Mich.

[73] Assignee: Donnelly Corporation, Holland, Mich.

[*] Notice: This patent is subject to a terminal disclaimer.

[21] Appl. No.: 09/418,525

[22] Filed: Oct. 14, 1999

Related U.S. Application Data

[63] Continuation of application No. 09/233,164, Jan. 18, 1999, Pat. No. 5,986,797, which is a continuation of application No. 08/939,854, Sep. 29, 1997, Pat. No. 5,864,419, which is a continuation of application No. 08/617,333, Mar. 18, 1996, Pat. No. 5,680,245, which is a continuation of application No. 08/293,736, Aug. 19, 1994, Pat. No. 5,523,877, which is a continuation of application No. 08/082,882, Jun. 25, 1993, Pat. No. 5,355,245, which is a continuation of application No. 07/732,572, Jul. 18, 1991, Pat. No. 5,239,406, which is a continuation-in-part of application No. 07/464,888, Jan. 16, 1990, Pat. No. 5,115,346, which is a continuation-in-part of application No. 07/155,256, Feb. 12, 1988, abandoned.

[51] Int. Cl.$^7$ .................................................. G02F 1/153
[52] U.S. Cl. ........................ 359/275; 359/272; 359/265
[58] Field of Search ..................................... 359/265–275

[56] References Cited

U.S. PATENT DOCUMENTS

| | | | |
|---|---|---|---|
| 3,280,701 | 10/1966 | Donnelly et al. | 359/267 |
| 3,443,859 | 5/1969 | Rogers | 359/275 |
| 3,806,229 | 4/1974 | Schoot et al. | 359/273 |
| 3,867,175 | 2/1975 | Dornte | 359/507 |
| 3,869,196 | 3/1975 | Kubota | 359/63 |
| 3,900,673 | 8/1975 | Mattimoe et al. | 428/339 |
| 3,933,407 | 1/1976 | Tu et al. | 359/907 |
| 4,022,628 | 5/1977 | Deeg | 65/30.13 |
| 4,048,978 | 9/1977 | Plumat et al. | 126/200 |
| 4,093,908 | 6/1978 | Wolf et al. | 359/275 |
| 4,153,526 | 5/1979 | Cherenko et al. | 204/159.21 |
| 4,218,500 | 8/1980 | Radisch | 428/78 |

(List continued on next page.)

FOREIGN PATENT DOCUMENTS

| | | |
|---|---|---|
| 28147 | 5/1981 | European Pat. Off. . |
| 794044 | 5/1983 | European Pat. Off. . |
| 146672A | 7/1985 | European Pat. Off. . |
| 240226 | 10/1987 | European Pat. Off. . |
| 2513198 | 9/1981 | France . |
| 2732727 | 3/1978 | Germany . |
| 3324691A | 1/1985 | Germany . |
| 58-146202 | 3/1982 | Japan . |
| 57-167009 | 10/1982 | Japan . |
| 61-7803 | 6/1986 | Japan . |
| 61-94819 | 6/1986 | Japan . |
| 52-215247 | 9/1987 | Japan . |
| 2205075 | 11/1988 | United Kingdom . |

OTHER PUBLICATIONS

*CRC Handbook of Chemistry and Physics*, CRC Press, Inc., Boca Raton, Florida, pp. D–187, D–188 and C–735–745, 1980–81.

(List continued on next page.)

*Primary Examiner*—Georgia Epps
*Assistant Examiner*—Evelyn A. Lester
*Attorney, Agent, or Firm*—Van Dyke, Gardner, Linn & Burkhart, LLP

[57] ABSTRACT

An electrochromic glazing assembly is disclosed with reduced ultraviolet (UV) radiation transmission and safety protection. The assembly may include at least a pair of glass or other elements confining an electrochromic medium therebetween. Ultraviolet radiation reducing means are incorporated for reducing ultraviolet radiation transmission through the assembly. A polymeric antilacerative layer is disposed on one surface of one of the glass elements for preventing lacerative injuries.

39 Claims, 24 Drawing Sheets

U.S. PATENT DOCUMENTS

| | | | |
|---|---|---|---|
| 4,232,000 | 11/1980 | Orain et al. | 428/215 |
| 4,268,126 | 5/1981 | Mumford | 359/36 |
| 4,315,053 | 2/1982 | Poth et al. | 428/423.7 |
| 4,338,000 | 7/1982 | Kamimori et al. | 359/275 |
| 4,408,837 | 10/1983 | Kozaki et al. | 359/79 |
| 4,435,048 | 3/1984 | Kamimori et al. | 359/275 |
| 4,496,611 | 1/1985 | Kawakubo et al. | 428/425.5 |
| 4,505,538 | 3/1985 | Toussaint et al. | 359/274 |
| 4,521,078 | 6/1985 | Baeger | 359/62 |
| 4,521,079 | 6/1985 | Leenhouts et al. | 359/74 |
| 4,533,601 | 8/1985 | Hermann et al. | 428/437 |
| 4,543,283 | 9/1985 | Curtze et al. | 428/38 |
| 4,549,894 | 10/1985 | Araujo et al. | 65/30.11 |
| 4,556,288 | 12/1985 | Sekimura | 359/74 |
| 4,565,424 | 1/1986 | Huffman et al. | 359/98 |
| 4,572,619 | 2/1986 | Beninger et al. | 359/254 |
| 4,601,532 | 7/1986 | Musser et al. | 350/1.1 |
| 4,609,688 | 9/1986 | Radisch et al. | 523/169 |
| 4,632,877 | 12/1986 | Watanabe et al. | 428/409 |
| 4,657,796 | 4/1987 | Musil et al. | 428/38 |
| 4,664,479 | 5/1987 | Hiroshi | 359/38 |
| 4,671,619 | 6/1987 | Kamiori et al. | 359/275 |
| 4,676,601 | 6/1987 | Itoh et al. | 359/38 |
| 4,726,664 | 2/1988 | Tada et al. | 359/275 |
| 4,749,261 | 6/1988 | McLaughlin et al. | 359/51 |
| 4,761,061 | 8/1988 | Nishiyama et al. | 359/265 |
| 4,793,669 | 12/1988 | Perilloux | 359/355 |
| 4,852,979 | 8/1989 | Agrawal | 359/274 |
| 4,902,108 | 2/1990 | Byker | 350/357 |
| 5,066,112 | 11/1991 | Lynam et al. | 359/267 |
| 5,073,012 | 12/1991 | Lynam | 359/265 |
| 5,076,674 | 12/1991 | Lynam | 359/265 |
| 5,099,044 | 3/1992 | Baughman et al. | 52/171 |
| 5,115,346 | 5/1992 | Lynam | 359/265 |
| 5,140,455 | 8/1992 | Varaprasad et al. | 359/265 |
| 5,148,305 | 9/1992 | Byker | 359/265 |
| 5,239,406 | 8/1993 | Lynam | 359/275 |
| 5,355,245 | 10/1994 | Lynam | 359/267 |
| 5,523,877 | 6/1996 | Lynam | 359/275 |
| 5,680,245 | 10/1997 | Lynam | 359/265 |
| 5,864,419 | 1/1999 | Lynam | 359/265 |
| 5,986,797 | 11/1999 | Lynam | 359/265 |

OTHER PUBLICATIONS

Tooley, P.V., Handbook of Glass Manufacture, vol. 1, Ogden Publishing Company, Copyright 1953, p. 11.

"SAFLEX Polyvinyl Butyral Interlayer Laminating Guide", Monsanto Co., St. Louis, Missouri, Feb., 1988.

"BUTACITE Polyvinyl Butyral Resin Sheeting Customer Specifications", E.I. DuPont de Nemours & Co., (Inc.), Washington, Delaware, Oct., 1984.

"Smart Windows for Automobiles", SAE Technical Paper Series No. 900419; Naill R. Lynam, Feb. 26, 1990–Mar. 2, 1990.

Fan, John C.C. and Bachner, Frank J. "Transparent Heat Mirrors for Solar–energy Applications" *Applied Optics,* vol. 15, No. 4, Apr. 1976, pp. 1012–1017.

"Anti–Lacerative Windshields—An Overview", SAE Technical Paper Series, 840388 by N.W. Johnston, S.H. Herlicaek and C.E. Ash, Feb. 27–Mar. 2, 1984.

Ultraviolet Radiation, Second Edition, Lewis R. Koller, John Wiley & Sons, Inc., New York, 1965, pp. 4–7.

"Chemicals and Additives" p. 178, Modern Plastics Encyclopedia, 1988.

Preamble to Amendment to Motor Vehicle Safety Standard No. 205—Glazing Materials (Docket No. 71–1; Notice 3), Jun. 21, 1972.

"Electrochromic Automotive Day/Night Mirrors", Lynam, SAE Technical Paper Series, 870636, Feb. 23–27, 1987.

The MERCK Index, an Encyclopedia of Chemicals, Drugs and Biologicals, Tenth Edition, 1983, p. 158.

"Norland Technical Data", Norland Products, Inc., New Brunswick, New Jersey, Sep. 1985.

Dymax Engineering Adhesives Products Data Sheet 478, Dymax Engineering Adhesives, Torrington, Connecticut, Dec., 1990.

H.G. Pfaender et al., Schott Guide to Glass, Van Nostrand Reinhold Company, 1980, 1983, p. 56.

Shelepin, I.V. et al. "Electrochromism of Organic Compounds—Electrochemical and Spectral Properties of a System Based on Methylviologen and 3–Ethyl–2–Benzothia–Zolone Azine", Scientific Research Institute of Intermediates and Dyes, Moscow, translated from Electrokhimiya, vol. 13, pp. 32–37, Jan., 1977.

I. Haller, "Ultraviolet Protecting Coating", *IBM Technical Disclosure Bulletin*, vol. 15, No. 5, Oct. 1972, pp. 1723 24, New York, U.S.A.

SILVER ON GLASS

TIO2/AG/TIO2 HEAT MIRROR

NEAR-IR REFLECTIVITY

REDUCED ULTRAVIOLET RADIATION TRANSMITTING, SAFETY PROTECTED ELECTROCHROMIC GLAZING ASSEMBLY

This application is a continuation of prior application Ser. No. 09/233,164, filed Jan. 18, 1999, now issued as U.S. Pat. No. 5,986,797, which is a continuation of prior application Ser. No. 08/939,854, filed Sep. 29, 1997, now issued as U.S. Pat. No. 5,864,419, which is a continuation of Ser. No. 08/617,333, filed Mar. 18, 1996, now issued as U.S. Pat. No. 5,680,245, which is a continuation of pending application Ser. No. 08/293,736, filed Aug. 19, 1994, now U.S. Pat. No. 5,523,877, which is a continuation of prior application Ser. No. 08/082,882, filed Jun. 25, 1993, now issued as U.S. Pat. No. 5,355,245, which is a continuation of pending application Ser. No. 07/732,572, filed Jul. 18, 1991, now issued as U.S. Pat. No. 5,239,405, which is a continuation-in-part of pending application Ser. No. 07/464,888, filed Jan. 16, 1990, now issued as U.S. Pat. No. 5,115,346, which is a continuation-in-part of prior application Ser. No. 07/155,256, filed Feb. 12, 1988, now abandoned, the disclosures of all of which are hereby incorporated by reference herein.

BACKGROUND OF THE INVENTION

This invention relates to electro-optic devices for vehicles and, more particularly, to an enhanced vehicular rearview mirror or window glazing incorporating an electro-optic medium allowing variation in the transmission of light in response to application of an electric field to the electro-optic medium.

Specifically, in one aspect, the invention is a variable reflectance, electro-optic mirror including protection against laceration injuries and scattering of glass or other fragments if broken or damaged, against degradation from ultraviolet radiation, and against fogging and misting in high humidity conditions.

This invention also relates to glazing in vehicles and, more particularly, to an enhanced vehicular window, sun visor, shade band or sunroof incorporating an electrochromic medium allowing variation in the light transmitted by the glazing in response to application of an electric field to the electrochromic medium. Specifically, the invention is a variable transmission, electrochromic vehicular window including protection against laceration injuries and scattering of glass, other fragments, or chemicals if broken or damaged, against degradation from ultraviolet radiation, and including thin film means to reflect a substantial portion of incident, solar, near-infrared radiation. Optionally, and preferably, the electrochromic glazing assembly in blue or green in transmission, as viewed from the vehicle interior, so as to reduce glare from the sun and to optimize visibility and a true-to-nature blue view of the sky.

In a collision, the glass typically used as the substrate in vehicular rearview mirrors poses potential hazards to the driver or other vehicle occupants. Since glass easily shatters into sharp, irregular fragments, there is a high likelihood of facial or other injury, typically lacerative in nature, in any collision. For this reason, prior known interior and exterior vehicular rearview mirrors, which typically consist of a single glass piece coated with reflective material, are conventionally protected by applying a tape or a plastisol-type plastic adhesive to the back surface of the glass piece. Accordingly, if impacted or broken in an accident, and shattered, glass fragments are retained by the tape or plastisol-type plastic adhesive.

More recently, however, a new generation of electro-optical mirrors has emerged which are fabricated using two pieces of glass separated by a gap or space which contains an electro-optical medium allowing variation in the light reflected by the assembly. For example, in liquid crystal rearview mirrors, the space between the transparent front and reflective coated rear glass pieces is filled with a semi-viscous liquid crystal material. In electrochemichromic or electrochromic mirrors, the gap or space contains a liquid, thickened liquid, gel or semi-solid material.

In these types of electro-optic, laminated mirror assemblies, scatterproofing of the rear glass piece is relatively easy since tape or plastisol-type plastic adhesives can be applied to its rear surface behind the reflective coating in the conventionally known manner. However, scatterproofing the front piece of glass in such a laminated assembly is difficult since the material used to fill the space between the front and rear glass pieces is usually insufficiently viscous or adhering to retain fragments of the front glass should it shatter in a collision.

Another problem encountered with electro-optic rearview mirrors and windows or glazing assemblies is degradation due to exposure to ultraviolet radiation over the life of the mirror or glazing. Ultraviolet (UV) radiation from the sun which penetrates the earth's atmosphere has a wavelength in the range between 290 and 400 nanometers (nm) and can cause breakdown in the operational characteristics of the electro-optical medium including chain scission, cross-linking and stimulation of chemical changes in the chemicals used to formulate the electro-optical medium. This interferes with electronic conjugation in the aromatic conjugated materials typically used and thus the electro-optic activity of those materials is impaired. Moreover, the medium will often discolor taking on a yellowish tint visible in light reflected or passing therethrough and drastically affect the usefulness of the rearview mirror or window. Such degradation from UV solar radiation is particularly problematic in electro-optical automotive windows which are typically exposed to the full solar radiation, often when the electro-optical medium is in its colored state.

In order to overcome ultraviolet radiation degradation in such electro-optic rearview mirrors and glazings, it is possible to add UV radiation absorbing materials to the electro-optic medium. However, such UV absorbing additives, especially in higher concentrations and with broad UV absorbance, themselves impart a yellowish tint to the materials to which they are added. Such yellow tint is also visible in light reflected or transmitted therethrough,. Yellow is aesthetically displeasing in many applications, and is particularly displeasing when used in rearview mirrors. Consumer acceptance of rearview mirrors having a yellowish tint or cast in the reflected light has been poor. Moreover, yellow mirrors are efficient reflectors of headlamp glare which itself is yellow. Consequently, prolonged exposure to sunlight and UV radiation, or reducing UV degradation in electro-optic mirrors with UV absorbing additives, can create negative consumer reaction and acceptance. Likewise, a yellow tint in, for example, an automotive sunroof is consumer displeasing as it detracts from the consumer's appreciation of, and natural view of, the blue sky.

Another objective in the use of rearview mirrors is the matching of human sight sensitivity in various light conditions during the use of such mirrors to the glare sources and ambient lighting present. It is known that the spectral sensitivity of the human eye depends on its light adaptation. Thus, daylight and night driving conditions create differing human eye sensitivities. Further, nearly all night driving is affected by the reflection of light from the headlights of the driver's own vehicle on the road. The electro-optic mirror assemblies of this invention should, therefore, optimally be constructed to correspond as much as possible with the eye sensitivities in both day and night driving conditions.

The electro-optic media commonly used in electro-optic mirrors and windows are often constructed of materials and chemicals of a potential toxic or otherwise hazardous nature. Should the mirror glass break in an accident, there is a possibility of automobile occupants contacting the electro-optic media, either directly or by contact with glass particles to which these potentially hazardous media are still adhering. Such contact presents a hazard to the occupants through toxic effects, and through skin irritation such as to eyes and facial areas. The anti-lacerative layers and laminate interlayers of this invention offer a barrier that ensures that contact with chemicals used within the mirror is minimized should the glass shatter in an accident.

Yet another problem is unwanted misting or fogging of the rearview mirror surface or the glazing surface when the vehicle encounters high humidity conditions. For example, in damp, cold conditions where the interior passenger compartment of a vehicle has a highly humid atmosphere, water droplets may tend to condense on the rearview mirror surface or window surface thereby obscuring vision in the mirror or through the window. Not only does such condensation prevent effective use of the mirror or window, but also requires frequent wiping by the vehicle's driver which distracts his attention from driving.

Vehicular windows provide a field of view so that the driver can make safe driving decisions and allow occupants to comfortably view the surroundings. Glass vehicular sunroofs are luxury items that serve both aesthetic and functional needs. A transparent sunroof is primarily consumer-selected so that the occupants feel less claustrophobic and more linked to the outside environment. Sunroofs have a functional benefit in that, when opened, they can greatly increase cabin ventilation and so substitute somewhat for air-conditioning.

As reviewed in the publication SMART WINDOWS FOR AUTOMOBILES by Niall R. Lynam, SAE paper #900419, Society of Automotive Engineers, International Congress and Exposition, Detroit, Mich., Feb. 16–Mar. 2, 1990, the disclosure of which is hereby incorporated by reference, increases in the area of windows used in automobiles coupled with down-sizing of vehicular air-conditioners and environmental concerns associated with use of halocarbons in air-conditioners, have led to an increased need to use solar heat-load reducing glazing in vehicles. Since solar energy (for solar mass 2) is, on the average, 3% ultraviolet (UV), 48% visible radiation, and 49% near-infrared (NIR) radiation, nearly one-half of the solar energy can be eliminated without any loss in visibility.

Solar-energy reducing glazing is already in use on automobile windows and is based on two principles: modification of the glass composition to increase the infrared absorption; and deposition of single and multilayer coatings to reflect or absorb infrared radiation. In a vehicle, the glazing need not be concerned with heat insulative properties such as are required for solar efficient windows in buildings and homes. Building solar windows allow as much of the solar spectrum as is possible to transmit into the room but also trap this solar energy by acting as a heat mirror for energy radiated from walls, floors, furniture, etc.

With respect to a vehicle, heat build up when parked or driven in sunny climates is the principal concern. Thus, the solar glazing used in vehicle should, ideally, reflect away all of the incident near-IR solar radiation above around 800 nm since visible light is between about 400 and 800 nm. Even with such reflection, however, the approximate 50% of solar energy contained in the UV/visible spectral region, if transmitted, can contribute to heat buildup within the vehicular cabin.

Chromogenic materials have been suggested for providing electrically variable control over solar transmission in automobile windows. SAE paper #900419 discloses a variety of possible designs and constructions, among them being designs using liquid crystal or electrochromic materials. Liquid crystal designs, and particularly those that operate by scattering light rather than by absorbing/reflecting light, however, yield only moderate solar energy benefit when used in automobile glazing. Electrochromic windows, because they do not operate by a light scattering mechanism, are preferred for use in variable transmission solar-efficient automobile window glazing.

A wide variety of infrared attenuating means including those that operate principally by reflecting varying amounts of the near-IR region, or by absorption, also have been disclosed in the prior art. Some have been used in association with variable transmission liquid crystal panels. For example, U.S. Pat. No. 4,749,261 to McLaughlin et al. describes a liquid crystal material operable to modulate light transmitted through a panel such as a sunroof, window, or partition. The liquid crystal material selectively operate to transmit or to scatter light.

McLaughlin et al. describe an embodiment which includes an infrared light reflective material which may take the form of stainless steel or tin oxide, optically transparent, infrared reflecting, and electrically conductive coating that preferentially reflects infrared light while allowing visible radiation to pass. McLaughlin et al., however, fail to explicitly distinguish to which portion of the infrared spectrum (i.e., near-IR between 800 nm and 2500 nm or IR above 2500 nm) their invention is directed, and fail to combine that revelation with an electrochromic medium. Other references have failed to distinguish the particular needs of vehicular variable transmission glazing from variable transmission glazing usable as building windows and the like.

Accordingly, a need is apparent for a laminate electro-optic vehicular rearview mirror and glazing assembly which can be effectively scatterproofed to retain glass fragments from both glass pieces in the assembly, protected against lacerative-type injuries, protected against ultraviolet radiation damage throughout its life, and protected against annoying fogging and misting of the interior cabin surface in high humidity conditions. In addition, there is a related need for electro-optic rearview mirror assemblies which provide reflected light of a commercially and consumer acceptable color or tint and which match human sight sensitivity in both day and night conditions to the glare sources and ambient lighting present.

In addition, a further need is apparent for a combination near-infrared attenuating/electrochromic window which maximizes solar attenuation performance while allowing maximum variability of visible light. There is also a related need for a vehicular window which combines an electrochromic medium which attenuates visible light by absorbance and/or reflection with an efficient near-infrared reflector and an ultraviolet reducing means. Further, there is a related need for a solar attenuating window which can be effectively scatterproofed to retain glass fragments from the glass pieces in the window, protected against lacerative-type injuries, protected against leakage of chemicals, protected against ultraviolet radiation damage throughout its life, and protected against annoying fogging and misting of its surface in high humidity conditions.

SUMMARY OF THE INVENTION

The present invention overcomes the above problems by providing a laminate electro-optic vehicular rearview mirror which is protected against scattering of glass or other mirror element fragments if broken or damaged in a collision while reducing the risk of laceration from contact with the front glass or other element. In addition, the assembly is protected against degradation by ultraviolet radiation. The ultraviolet radiation reduction may be incorporated together with the scatterproofing, anti-lacerative protection. Further, the assembly may incorporate anti-fogging/anti-misting materials which prevent or reduce condensation and fogging in high humidity conditions.

In one form, the invention is an anti-lacerative, scatter protected, laminate, electro-optic rearview mirror assembly including first and second spaced optically transparent elements mounted in a mirror case. The elements each have front and rear surfaces defining a spaced between the rear surface of the first element and the front surface of the second element. An electro-optic medium is included in the space and has a light transmittance variable upon application of an electric field. Means are provided for applying an electric field to the electro-optic medium to cause variation in the light transmittance thereof. A reflective coating is included on one surface of the second element and is adapted to reflect light incident thereon through the first element and the electro-optic medium. A layer of optically transparent, tear/perforation resistant material is adhered to the front surface of the first element for retaining and preventing and scattering of fragments from that element in the event of damage or breakage and for reducing risk of laceration from contact with the first element if damaged or broken.

The optical elements may be glass or plastic. The anti-lacerative, anti-scattering layer preferably is a sheet of polymer material such as reticulated polyurethane. In order to reduce ultraviolet radiation transmitted into the assembly, the polymer may be a combination of polyvinylbutyral and polyester which has ultraviolet radiation reducing properties. Alternately, the anti-lacerative layer may incorporate ultraviolet radiation absorbing, blocking or screening additives selected from the group including benzophenones, cinnamic acid derivatives, esters of benzoin acids, salicylic acid, terephthalic and isophthalic acids with resorcinol and phenols, pentamethyl piperidine derivatives, salicylates, benzotriazoles, cyanoacrylates, benzilidenes, malonates and oxalanilides which may also be combined with nickel chelates and hindered amines. These additives also stabilize the anti-lacerative layer itself against ultraviolet degradation.

Another UV radiation reducing alternative is the use of a clear, transparent UV transmission reducing coating preferably applied to the front surface of the front glass element followed by the anti-lacerative, scatterproofing polymer layer.

It is also possible to incorporate a sheet polarizer with the anti-lacerative layer, or apply a dichroic, reflective filter material to the glass element which provides wide band ultraviolet radiation reduction. Examples of such filters include thin film stacks.

It is also possible to substitute a laminated glass assembly for the front element, such assembly including a pair of glass panels adhered to one another with a sheet of polyvinylbutyral or sheet polarizer which have ultraviolet radiation reducing qualities. An anti-lacerative layer may be applied to the front surface of the first of the two glass panels in such a laminate.

A second form of the invention is a reduced ultraviolet radiation transmitting laminate electro-optic rearview mirror assembly which also includes first and second spaced optically transparent elements, an electro-optic medium therebetween, means for applying an electric field to the electro-optic medium and a reflective coating on one surface of the second element. In this form, ultraviolet radiation reducing means are incorporated in the assembly for reducing transmission of ultraviolet radiation into the electro-optic medium and the assembly.

Preferably, such ultraviolet radiation reducing means may include glass having an increased iron oxide or cerium oxide content or other specialized glasses such as blue or green tinted glass which are highly transmitting in the visible portion of the electromagnetic spectrum but have greatly reduced transmission in the ultraviolet portion of the electromagnetic spectrum. Anti-lacerative layers may be adhered to the front surface of such UV reducing glass to both strengthen the glass and provide anti-lacerative, scatterproofing properties. When such anti-lacerative layers are used, similar UV absorbers blockers and screening materials may be incorporated in such layer. Alternately, sheet polarizers, transparent, UV reducing coatings, and UV radiation dichroic reflective filter materials may be used or added. Anti-fogging additives may also be included.

In addition, the ultraviolet radiation reducing means may include a laminated assembly incorporated as the front or first element of the mirror assembly and include spectrally selective absorbing means for absorbing more light in those regions of the visible spectrum from about 560 nanometers to about 780 nanometers than is absorbed in those regions of the visible spectrum from about 400 nanometers to about 560 nanometers. Such spectrally selective absorbing means may include blue or green tinted specialized glass or blue or blue/green tinted polymeric interlayers adhering the panels of the laminate front element together. In addition, coatings or layers of UV radiation reducing paint or lacquer or polymeric films may be included on the interior, facing surfaces of the laminate. Alternately, the panels of the laminate first element assembly may be adhered via a moderate to low modulus of elasticity adhesive layer which is preferably poured between the panels, cured with ultraviolet radiation, and which preferably includes an index of refraction similar to that of the glass panels to reduce distortion.

It is also possible to incorporate UV radiation reducing additives directly in the clear plastic when such plastic is used to form the first optical element. Alternately, UV reducing additives can be added to the electro-optic medium for UV stabilization.

The present invention also provides a combination near-infrared attenuating, electrochromic glazing assembly which is protected against scattering of glass or fragments if broken or damaged in a collision while reducing the risk of laceration from contact. Further, protection is offered against contact with the chemicals used in the electro-optical medium should the assembly be damaged in an accident. In addition, the window assembly is protected against degradation by ultraviolet radiation. The ultraviolet radiation reduction may be incorporated together with the scatterproofing, anti-lacerative protection. Further, the window assembly may incorporate anti-fogging/anti-misting materials which prevent or reduce condensation and fogging in high humidity conditions.

In one form, the invention is an anti-lacerative scatter protected electrochromic glazing assembly including first and second spaced optically transparent elements. The elements each have inside and outside surfaces defining a space between the outside surface of the first element and the inside surface of the second element. An electrochromic medium is included in the space and has a light transmittance variable upon application of an electric field. Means are provided for applying an electric field to the electrochromic medium to cause variation in the light transmittance thereof. Near-infrared reflective means are located on at least one of the first and second elements for reducing the transmission of near-infrared radiation through said window assembly. The reflective means incorporate at least one semi-transparent, elemental, thin metal film which reflects at least about 30% of the solar energy for Air Mass 2 in the spectral region from 800 nanometers to 2500 nanometers. In a preferred embodiment, the thin metal film has a physical thickness of between about 80 angstroms and 300 angstroms and, preferably, of sheet electrical resistance of no greater than about 8 ohms/square.

The optical elements for the glazing assembly may be glass or plastic and may employ the same anti-lacerative, anti-scattering, absorbing/filtering, tinting and ultraviolet reducing means listed above for the optical elements of the electro-optic mirror. It is also possible to substitute a laminated glass assembly for the inside element or the outside element, such assembly including a pair of glass panels adhered to one another with an interlayer such as a sheet of plasticized polyvinylbutyral or equivalent which has ultraviolet radiation reducing qualities. An anti-lacerative layer may be applied to the inner surface of the first or innermost of the two glass panels where the first element is such a laminate.

In preferred forms, the near-infrared reflective elemental thin film is sandwiched between optically transparent layers consisting of metal oxide, nitride, halide, or sulfide thin films. These thin films serve as an undercoat to the thin metal film to enhance its bonding to the substrate and as a visible light anti-reflection overcoat to enhance visible light transmitivity. The elemental thin metal film is preferably elemental silver or a silver alloy such as with copper but with the silver being the majority component. Gold, copper, or aluminum are alternate choices.

Accordingly, the present invention recognizes and applies novel protective concepts to laminate, electro-optic vehicular rearview mirrors and glazings not previously obtained. The invention solves three difficult problems encountered in prior commercialization of laminate electrochromic mirrors, namely, scatter protecting the front glass element, reducing lifetime ultraviolet degradation problems arising from the UV instability of the typical electro-optical medium sealed between the glass elements, and reducing fogging or misting caused by condensation in high humidity conditions. Further, the invention enhances the aesthetic appearance and customer acceptance of UV stabilized, electro-optic rearview mirror assemblies which would otherwise reflect light with a yellow tint by absorbing light in the yellow/orange/red regions of the visible spectrum to produce a commercially acceptable silvery or silvery-blue reflection. Further, the invention matches human sight sensitivity in both day and night conditions for either inside or outside mirrors to the glare sources and ambient lighting present by incorporating means causing light reflection in the blue region of the visible spectrum and thus well-suiting the mesopic human vision range. In addition, these results are obtained in an economical manner easily incorporated in existing rearview mirror cases requiring no specialized supports or surrounding apparatus in the vehicle.

The present invention also recognizes that maximum solar attenuation performance can be obtained through the combination of novel near-infrared attenuating concepts and electrochromic concepts while maintaining maximum variability of visible light. The glazing assembly incorporating the near-infrared attenuating and electrochromic means also incorporates the novel protective concepts listed above which solve for glazings or windows the similar problems encountered in prior commercialization of laminate electrochromic mirrors, namely, scatter protection, reduction of ultraviolet instability of the typical electrochromic medium, and diminution of fogging or misting problems. Further, the solutions suggested for masking the yellow tint caused by ultraviolet reductors are applicable to the window assembly.

These and other objects, advantages, purposes and features of the invention will become more apparent from a study of the following description taken in conjunction with the drawings.

DESCRIPTION OF THE PREFERRED EMBODIMENTS ELECTRO-OPTIC REARVIEW MIRROR DEVICES

Figure 1:
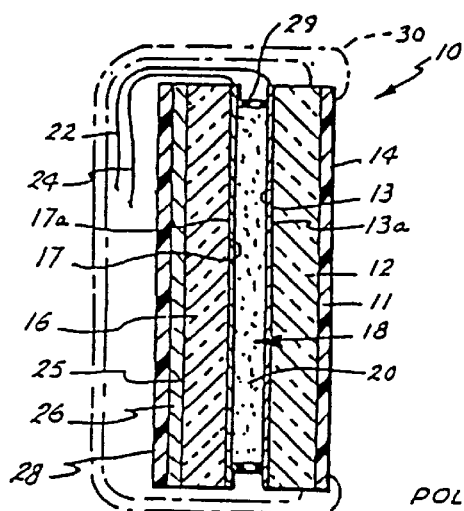
FIG. 1 is a sectional side elevation of a scatter protected, anti-lacerative, laminate, electro-optic rearview mirror assembly of the present invention.

Referring now to the drawings in greater detail, FIG. 1 illustrates a laminate, electro-optic rearview mirror assembly 10 having a front element 12 which is scatter and anti-lacerative protected with a resinous, polymeric or other coated or applied layer 14 on its first or front surface 11. Element 12 is preferably formed from a generally planar sheet of conventional soda lime window glass as is second glass element 16 which is spaced slightly rearwardly from front glass piece 12 to define a gap or space 18 for receiving an electro-optic medium 20 as explained below. As explained hereinafter, elements 12, 16 may also be resinous, polymeric sheets to further prevent fragment scattering and lacerative injuries if broken and to reduce weight. Space 18 is formed between the generally parallel rear surface 13 of front glass element 12 and forward facing surface 17 of rear glass element 16. Preferably, each of the front and rear surfaces 13, 17 is coated with a layer of indium tin oxide (ITO) which is substantially transparent to incident visible light yet is sufficiently electrically conductive to enable application of an electric field or voltage across space 18 between ITO layers 13a, 17a. Electrical energy is provided by wire leads 22, 24 secured in conventional manner to the upper portions of ITO coatings 13a, 17a as shown in FIG. 1.

The rear surface 25 of rear glass element 16 is coated with a reflective layer 26 preferably of metallic material such as aluminum, or a combination of silver and copper as is conventionally known. Such layer provides a highly specular surface which reflects approximately 80–90% of the light incident thereon through layer 14, front and rear glass elements 12, 16 and electro-optic medium 20 in space 18. In order to prevent scattering of glass fragments from the rear glass element 16 in the event of breakage or damage during a collision in the vehicle, a layer 28 of tape or a plastisol-type plastic adhesive, typically about 0.1 millimeters thick, is applied to the rear surface of reflective coating 26. Anti-scattering layer 28 may be opaque, translucent or transparent since it is behind reflective coating 26 and need not transmit or reflect any light.

In order to confine and retain the electro-optic medium in gap 18, a peripheral seal 29, formed from an epoxy material which adheres well to the ITO coatings 13a, 17a on glass surfaces 13, 17 is applied adjacent to the periphery of glass elements 12, 16. A suitable epoxy sealing material is EPON 828™ from Shell Chemical Company of Houston, Tex. cured by polyamide based curing agents such as V-40™ from Miller Stephenson Company of Danbury, Conn. The epoxy is preferably silk screened onto the inner surface of the front glass element 12 or the back glass element 16 or onto both glass elements. The corresponding glass element is then placed face to face with the still tacky epoxy. Seal 29 is then fully cured, typically by placing the assembly into an oven at 110° C. for three hours. Gap 18 can then be filled by a variety of means such as simple injection of electro-optically active material using a syringe or by vacuum backfilling using a technique well established for manufacture of liquid crystal devices.

Assembly 10 is preferably incorporated in a molded thermoplastic or other mirror case 30 of conventional form and supported within a vehicle in a conventionally known manner through an articulated support from the inside windshield surface or a header mounted support arm.

Typically, glass elements 12, 16 will each be two millimeters in thickness while ITO coatings 13a, 17a will have a typical thickness of 1,500 angstroms. Reflective coating 26 may have a thickness within the range of between about 500 and 1,000 angstroms. Various types of electro-optic media may be inserted in gap 18. For example, a suitable liquid crystal material in which molecules are oriented to block the passage of light therethrough when an electric field is applied is a guest host dye such as D5™ produced by BDH Co. of Dorset, England dissolved in n-type nematic liquid crystal such as n-(p-methoxybenzilidene)-p'-butylaniline. For such material, cell gap 18 is typically 8 to 12 microns. For electrochemichromic mirrors, the gap may contain a liquid, thickened liquid, gel or semi-solid material such as formulations described in U.S. Pat. No. 3,806,229 to Schoot. In electrochromic mirrors, a material such as POLY-AMPS™ available from Lubrizol Corp. of Wickliffe, Ohio may be used. Also, a liquid, thickened liquid, gel or semi-solid material may be used as is conventionally known. Cell gap or space 18 is typically 50 to 100 microns in these electrochromic or electrochemichromic devices. With the latter materials, application of an electric field will cause the media 20 to color to successively darker colors or shades as larger voltages are applied. When voltage is turned off or reversed, the coloring is bleached allowing full transmittance of light and, hence, full reflectivity from reflective layer 26.

Because the electro-optic media 20 such as those described above are typically of relatively low viscosity and have little or no capability of retaining or holding solid elements thereto, the scatter and anti-lacerative protection conventionally available through the use of tape or plastisol layers such as those at 28 on rear glass element 16 has been unavailable for use with the front glass element 12 because transmission of light through the glass element must be unimpeded. The present invention overcomes that problem by providing scatterproofing, anti-lacerative layer 14 which retains fragments should glass element 12 be shattered. Layer 14 also provides enhanced anti-lacerative protection since it remains intact upon collision, is tear and perforation resistant and thus reduces or avoids laceration injury to the skin of any person contacting the shattered or broken mirror.

A specific example of a material found useful for layer 14 is reticulated polyurethane having a thickness within the range of about 0.01 to about 0.25 inches and marketed under the trade name SECURIFLEX™ by Saint-Gobain Vitrage of Paris, France. When used as layer 14, SECURIFLEX™ has excellent adhesion to glass surface 11 for retaining glass fragments during and after shattering in a collision. It also has high deformation capacity to resist tearing while continuing to form a protective screen which protects the skin of any person impacting the mirror and preventing contact with broken, jagged edges of the glass. It also has excellent optical quality, clarity and transparency so as not to detract from the rear vision capability of the rearview mirror. Further, it is abrasion and scratch resistant so that high quality clear images can be obtained in the mirror throughout its life. It is also relatively inert and resistant to environmental variation such as high and low temperatures, high and low humidity conditions.

Figure 17:
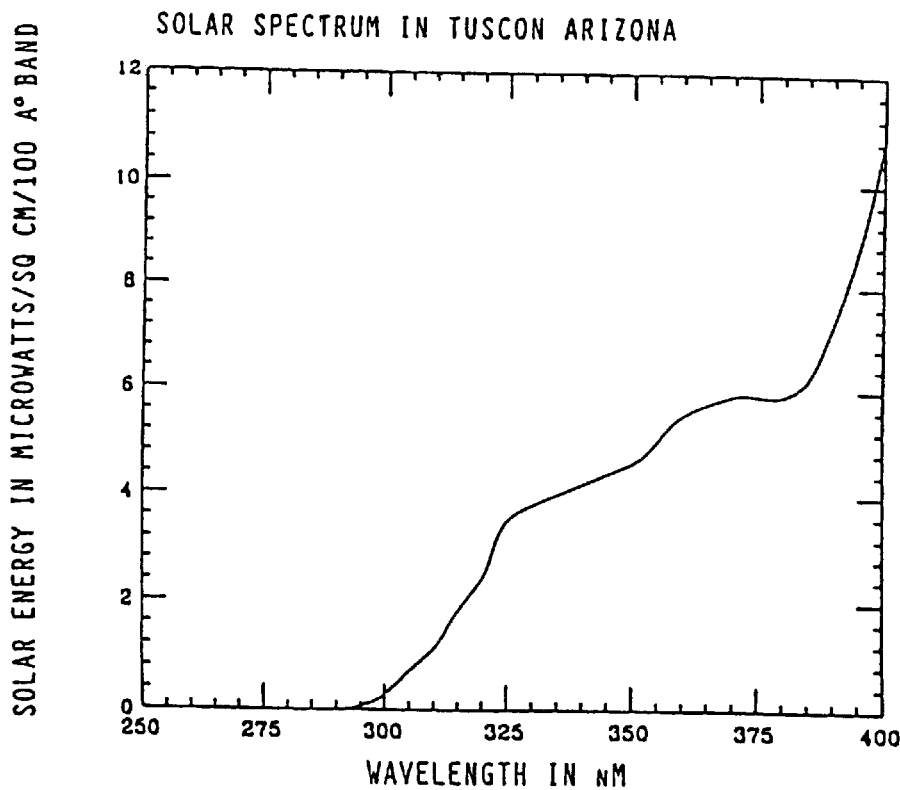
FIG. 17 is a graph showing the solar spectrum in the ultraviolet region incident at a desert location such as Tucson, Ariz.
Figure 18A:
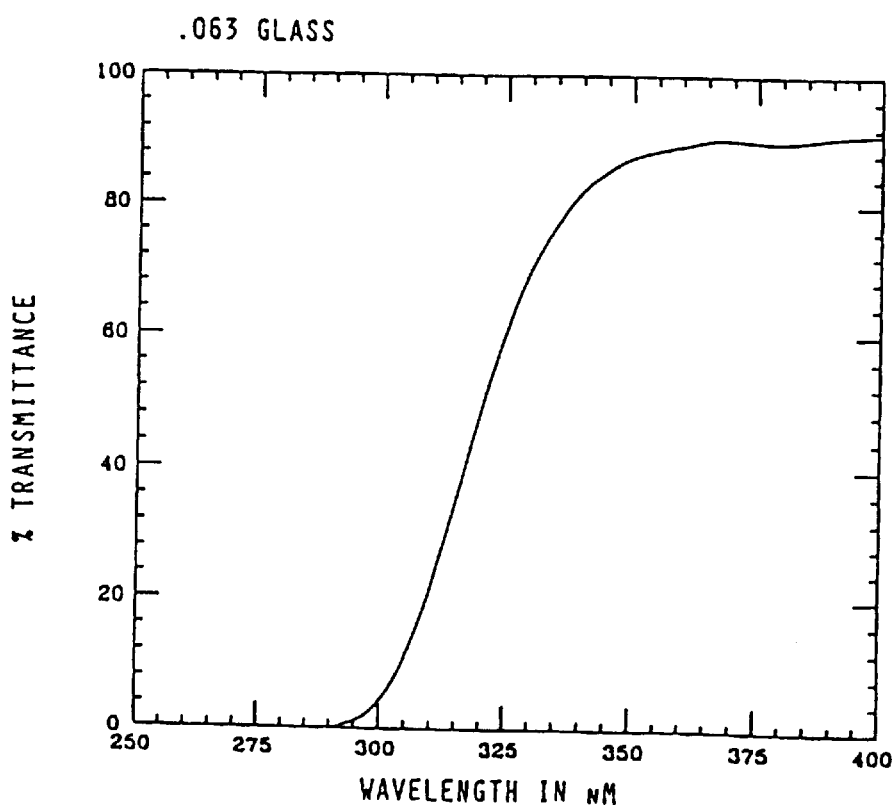
FIGS. 18a and 18b are graphs showing the percent light transmission of 0.063 inch thick, standard, clear, soda lime glass in the ultraviolet and visible regions of the spectrum, respectively.
Figure 18B:
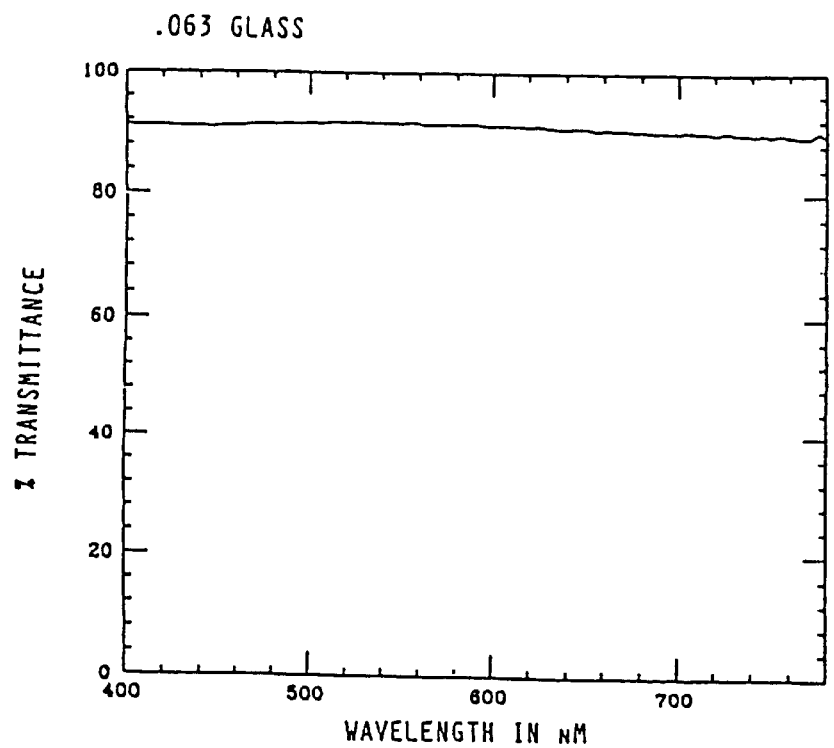
Figure 19:
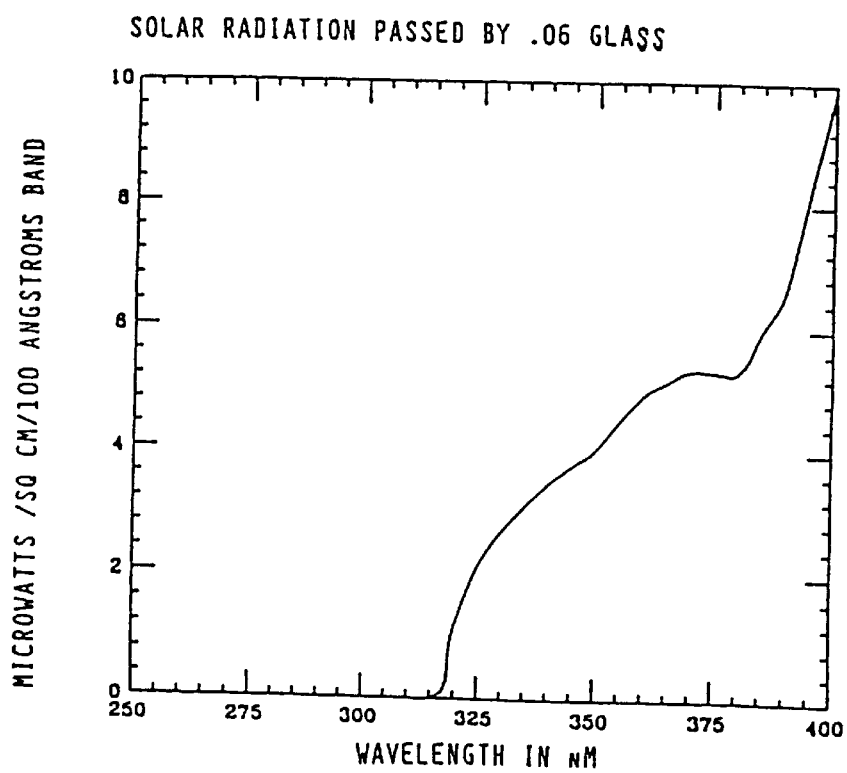
FIG. 19 is a graph showing the solar radiation in the ultraviolet region transmitted by 0.63 inch thick, standard, clear, soda lime glass.

Use of an anti-lacerative layer 14 also affords another advantage. It is known that several electro-optic mirror devices developed in recent years have generally poor ultraviolet radiation stability. When exposed to prolonged ultraviolet radiation from sunlight, such electro-optic assemblies may suffer substantial degradation of their electro-optic media resulting in poor electrical coloration responsiveness including increased response time and/or failure to properly bleach when electric voltage is switched off. Permanent discoloration of the medium may also occur. This can cause substantial vision problems. An example of the ultraviolet region of the solar spectrum incident at a desert location such as Tucson, Ariz. is shown in FIG. 17. Such solar spectrum must typically pass through a glass front panel of an electro-optic rearview mirror assembly to irradiate the electro-optic solution in an electro-optic rearview mirror assembly such as that shown in FIG. 1 or the other assemblies shown herein. FIG. 17 shows that there is little or no incoming solar radiation below about 295 nm. The light transmission of a 1.6 mm thick panel of standard, clear, soda lime glass is shown in FIGS. 18a and 18b while the solar energy spectrum transmitted into any electro-optic medium behind such a front glass piece is the combination of the graphs in FIGS. 17 and 18 as shown in FIG. 19. The 0.063 inch (1.6 mm) soda lime glass panel passes about 63% of the incoming UV solar energy in the 250–350 nm region and about 90% in the 350–400 nm region. Overall, a 1.6 mm soda lime glass sheet passes about 83% of the incident solar energy in the 250–400 nm region. Thus, a substantial portion of the incoming solar UV radiation is unattenuated by the glass front panel.

Figure 20:
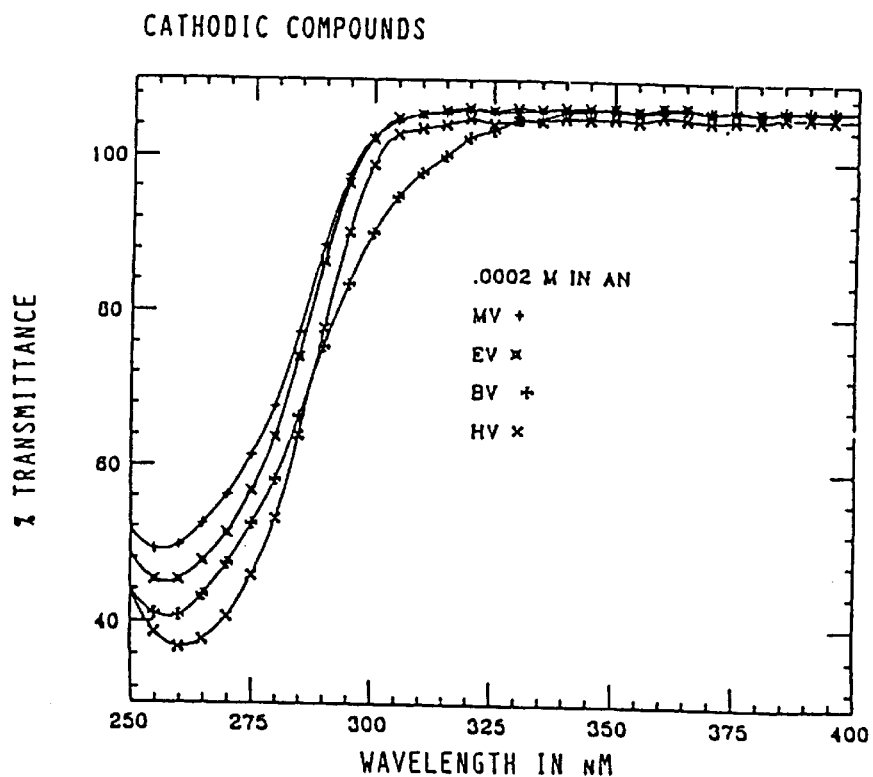
FIG. 20 is a graph showing the percent light transmission of specific solutions of four cathodic electrochemichromic compounds including methylviologen (MV), ethylviologen (EV), benzylviologon (BV) and heptylviologen (HV) in the ultraviolet region of the spectrum.
Figure 21:
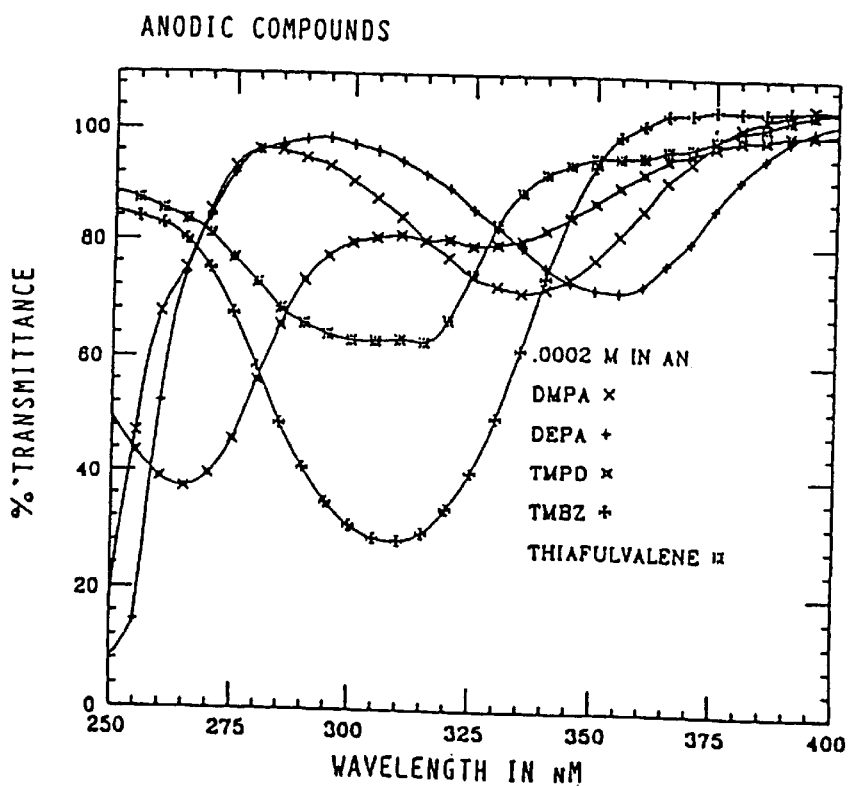
FIG. 21 is a graph showing the percent light transmission of specific solutions of four anodic electrochemichromic compounds including dimethyldihydrophenazine (DMPA), diethyldihydrophenazine (DEPA), tetramethylphenylenediamine (TMPD), and tetratetramethylbenzidine (TMBZ) as well as thiafulvalene in the ultraviolet region of the spectrum.

When such solar radiation passed into the electro-optic medium therebehind it irradiates the electro-optic species. Electrochemichromic (ECC) materials, especially organic species, are particularly susceptible to degradation by UV radiation. This is caused by their absorption of UV radiation with consequent disruption of electronic states. As shown in the graph of FIG. 20, the cathodically coloring ECC species most commonly used in prior art literature such as methylviologen (MV), ethylviologen (EV), benzylviologen (BV), and heptylviologen (HV), have an absorption peak below 295 nm and, thus, are largely nonabsorbing to the solar UV radiation transmitted into an ECC cell. However, as shown in FIG. 21, anodic compounds, such as dimethyldihydrophenazine (DMPA), diethyldihydrophenazine (DEPA), tetramethylphenylenediamine (TMPD), and tetratetramethylbenzidine (TMBZ) as well as thiafulvalene have substantial UV radiation absorbance in the 250–400 nm region. For example, DMPA in 0.0002M solution in acetonitrile (AN) and in a 1 mm pathlength quartz cell absorbs about 22% of the UV solar energy spectrum in the 250–350 nm region. Therefore, it is desirable to shield the ECC compounds from UV irradiation in this region. Also, because some absorption continues up to about 400 nm or so, and since the solar energy transmitted into the cell as shown in FIG. 19 is also substantial in the 350–400 nm region, it is beneficial to protect the ECC compounds from irradiation in this region as well.

The present invention recognizes that use of ultraviolet radiation absorbing, blocking or screening materials, either incorporated in the anti-lacerative layer or in layers in addition to such layer, will reduce ultraviolet radiation impinging on the mirror assembly and the electro-optic medium and significantly prolong its lifetime.

It is also recognized that substantial reduction in the amount of UV radiation transmitted into the electro-optic medium of the assembly may be accomplished by using specialized glasses, paints/lacquers, and laminate interlayers, coatings and/or films while simultaneously and synergistically protecting a vehicle driver against laceration or injury due to scattering or breaking of glass fragments should the protected mirror assembly be struck in an accident.

Figure 2:
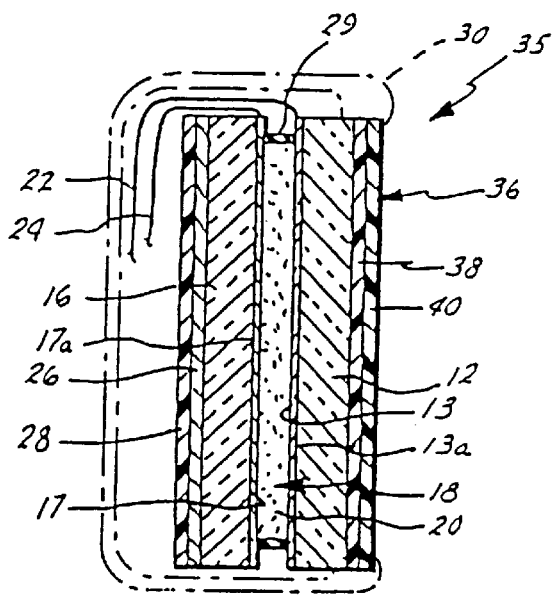
FIG. 2 is a sectional side elevation of a scatter protected, anti-lacerative and ultraviolet radiation protected, laminate, electro-optic rearview mirror assembly of the present invention.

As shown in FIG. 2, an enhanced, laminate, electro-optic rearview mirror assembly 35 with increased ultraviolet radiation resistance and stabilization is shown. As with subsequent embodiments of the invention explained below, assembly 35 is similar to the mirror assembly 10 of FIG. 1 but includes a different scatter protecting, anti-lacerative, UV radiation reducing layer 36 on the front surface of glass element 12. Layer 36 is preferably of two-ply construction comprising a laminate of polyvinylbutyral and polyester commercially available from E. I. duPont de Nemours and Company under product No. duPont BE1028D and also has the same qualities as described for polyurethane layer 14. The outer ply or layer 40 is abrasion resistant, weather resistant, polyester while the inner ply or layer 38 is resilient, tear resistant polyvinylbutyral. Composite layer 36 has a thickness preferably between about 0.005 and 0.25 inches, and provides a solution to two problems found during commercialization of prior known laminate electro-optic, and especially electrochromic mirrors, i.e., difficulty in scatter protecting the front glass element 12 and protection against degradation of the electro-optic or electrochromic media 20 in space 18 throughout the lifetime of the assembly due to inherent ultraviolet radiation instability and sensitivity.

Figure 3:
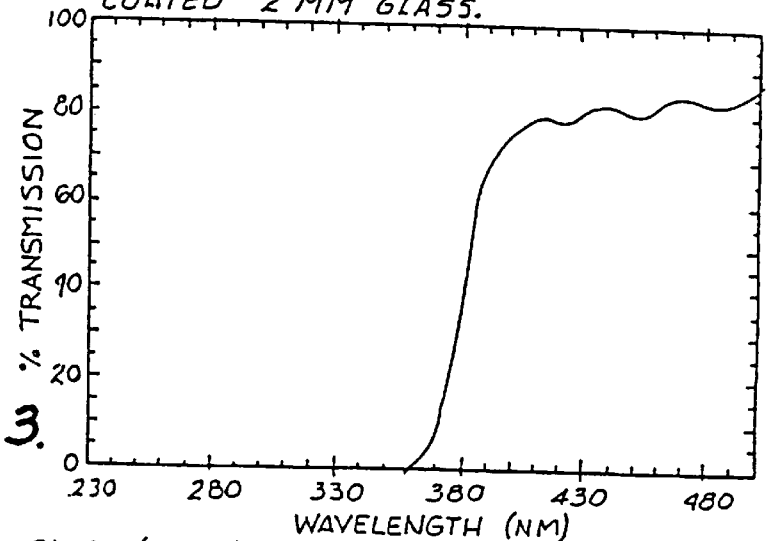
FIG. 3 is a graph showing percent transmission of electromagnetic radiation of wavelengths between 230 and 500 nanometers through a two millimeter glass sheet coated with indium tin oxide on one surface and having a sheet of polyvinylbutyral/polyester composite adhered to its opposite surface.
Figure 4:
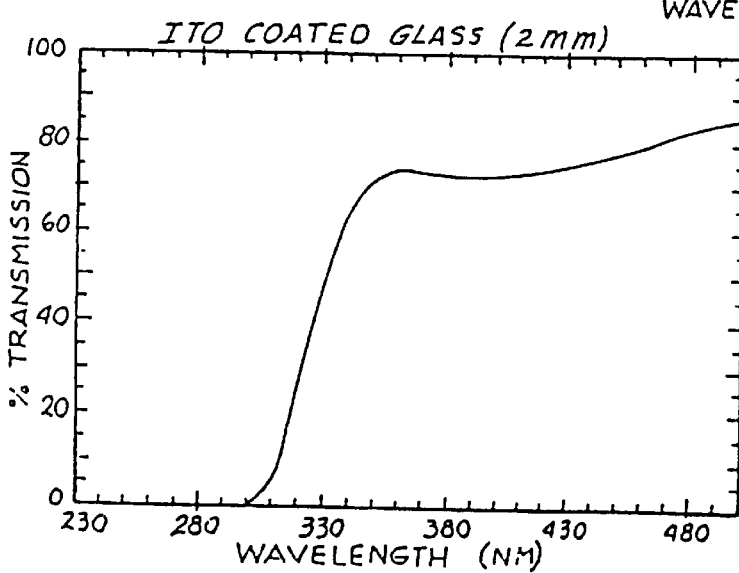
FIG. 4 is a graph of the percent transmission of electromagnetic radiation of wavelengths between 230 and 500 nanometers through a two millimeter glass sheet coated only on one surface with indium tin oxide.

The polyester/polyvinylbutyral composite layer 36 is a particularly good filter for ultraviolet radiation as shown in FIGS. 3 and 4. FIG. 3 is a graph of the percent transmission of electromagnetic radiation through a two millimeter thick element of conventional soda lime window glass coated with a layer of indium tin oxide (ITO) on one surface and a layer of duPont BE1028D polyvinylbutyral/polyester composite on the opposite surface. The graph shows the transmission over the wavelength spectrum between 230 and 500 nanometers (nm) and illustrates that below about 350–360 nm, wavelength transmission is cut off or stopped. Ultraviolet radiation which penetrates the earth's atmosphere from the sun typically ranges in wavelength over a wide band of between about 290 and 400 nanometers (nm). In contrast, light sensitive to the human eye ranges from about 400 nm to about 700 nm. Hence, the composite polyvinylbutyral/polyester layer 36 substantially eliminates ultraviolet radiation below about 350 nm while simultaneously scatter protecting and protecting against laceration when applied to the mirror glass surface.

Compare the graph in FIG. 3 to that in FIG. 4 which illustrates a two millimeter glass element coated only on one surface with indium tin oxide and not including a polyvinylbutyral/polyester layer. Such ITO coated glass transmits light in the visible wavelength spectrum above about 400 nanometers but also allows transmission of ultraviolet wavelengths down to about 295 nm which is substantially farther into the UV region than with the coated glass having the two-ply composite layer 36 thereon as shown in FIG. 3. Hence, reduction of UV radiation intensity passing through front glass 12 of such laminate mirrors as in assembly 35 substantially increases the useful lifetime of the mirror assembly.

A specific example of an assembly such as that shown at 35 comprising a laminate electrochromic mirror and providing the anti-lacerative, anti-scatter, UV radiation reducing advantages of the present invention was fabricated consisting of two plates of ITO coated, conventional soda lime window glass separated by a gap of 50 microns. The space between the two glass elements was filled with an electrochromic solution consisting of N,N,N',N' tetramethyl-1,4-phenylenediamine 0.025M, 1,1'-diheptyl-4,4'-bipyridinium dibromide 0.025M and tetrabutylammonium fluoroborate 0.5M dissolved in propylene carbonate. The nonmirrored front glass piece was anti-lacerative protected with a duPont BE1028D two-ply, anti-lacerative layer consisting of an outer abrasion resistant layer of polyester and an inner layer of polyvinylbutyral as described above in connection with FIG. 2. Reflective coated, rear glass plate 16 was scatter protected on its rear surface using conventional tape. The assembly was shattered by dropping a one kg weight over a distance of one meter to impinge on the front nonmirrored glass element, the anti-lacerative layer retained glass fragments from the front glass and remained unperforated such that it would have provided anti-lacerative protection if struck by a person in an accident. Moreover, when this laminate electrochromic mirror assembly was placed under UV lamps in a sunlight simulator, electrochromic activity and general mirror performance was maintained for a period of some five (5) times longer than that obtained using a control sample which was similarly tested with UV radiation but was not anti-laceratively protected with a polyester/polyvinylbutyral layer.

Although the anti-scattering, anti-lacerative layer 14 of assembly 10 in FIG. 1 provides some ultraviolet radiation reduction protection, and is itself ultraviolet radiation stable, the polyvinylbutyral/polyester composite is preferred since the polyvinylbutyral ply or layer has significantly higher UV radiation reduction capability as well as inherent UV stability than does polyurethane.

Longer lifetimes for laminate electro-optic rearview mirror assemblies can be achieved by using ultraviolet radiation absorbing, blocking or screening materials added to or incorporated with the anti-scatter, anti-lacerative layers 14, 36 as shown in FIGS. 1 and 2. Most commercial polymers absorb ultraviolet radiation because they possess chromophoric groups either as regular constituents or as impurities. Only those chromophores which absorb electromagnetic radiation of a wavelength below about 400 nanometers are, therefore, effective screens against UV radiation. Polycarbonate, polyester and aromatic polyurethanes contain such chromophores as a major part of their structures. However, polyolefins contain only relatively insignificant amounts of these chromophores as impurities. Yet, these above materials do not absorb UV radiation uniformly over the entire UV range. The chromophores which do absorb UV radiation can be conjugated structures, carbonyl groups, aromatic repeat units and heterocyclic repeat units. In addition, if polymers are used as UV screeners, they themselves must be stabilized against UV radiation since UV absorption generates free radicals which lead to chain scission and cross-linking and creation of other structures in these polymers. Thus, UV radiation itself degrades the polymer material which is intended to provide a UV absorber, block or screen by making the polymer brittle and even imparting color in the visible region.

The addition of UV absorbing, blocking or screening additives to polymers such as the polyurethane and/or polyvinylbutyral/polyester composite layers 14, 36 makes these materials more efficient UV screeners and preserves their properties over a longer period of time. Such UV additives, known as stabilizers, are transparent in the visible region and work to absorb UV radiation, quench the free radicals which are generated in the polymer and prevent oxidation reactions which lead to polymer degradation. For example, UV stabilizing additives drawn from benzophenones, cinnamic acid derivatives, esters of benzoin acids, salicylic acid, terephthalic and isophthalic acids with resorcinol and phenols, pentamethyl piperidine derivatives, salicylates, benzotriazoles, cyanoacrylates, benzilidenes, malonates and oxalanilides are effective to block UV radiation and stabilize the polymer layer when impregnated in such layer, included in separate coatings in addition to such layer or incorporated directly in front element 12 such as when it is cast from plastic. Other additives may be combined with the above materials such as nickel chelates and/or hindered amines. The following table shows several combinations of commercially available polymers and UV additives which may be used:

| Polymer | Stabilizer |
|---|---|
| Polyolefins | 2-hydroxy-4-octoxybenzophenones |
|  | nickel chelates |
|  | hindered amines |
| Styrenics | hindered amines |
|  | 2-hydroxyphenylbenzotriazole |
| PVC | benzotriazoles |
|  | benzophenones |
|  | acrylonitriles |
| Unsaturated Polyesters | 2-hydroxybenzotriazole |
|  | benzophenone |
| Polyurethanes | benzotriazole |
|  | pentamethyl piperidine derivatives |
| Polycarbonate | 2-hydroxy-phenylbenzotriazole |
| Polyamides | tetramethyl piperidyl sebacate |
| Acrylic | 2-hydroxyphenylbenzotriazole |

In many instances, two or more of such additives are combined together for increased, synergistic effects in UV radiation reduction and stabilization.

UV stabilizers/blockers/filters/absorbers are incorporated directly into the polymer anti-lacerative layer(s) 14, 36 in a variety of ways. For polyvinylbutyral, UV blocking additives are compounded with the PVB resin. Alternately, the UV blockers are dissolved in plasticizers which are then used to plasticize the PVB. PVB can also be dissolved in a suitable solvent, with UV stabilizers next added to the PVB solution and a UV stabilized PVB film/sheet can be cast from this solution. UV blockers can also be incorporated into polyester either through compounding or by solvent casting. Polyurethane anti-lacerative sheeting is a thermoset usually formed from reaction of isocyanate and polyols. Since both of these starting materials are liquids, UV blockers/stabilizers/filters/absorbers can be added to either the isocyanate component or the polyol component or to both. Concentrations of the various additives for combination with the various polymers are conventionally known such as are disclosed in U.S. Pat. No. 4,657,796 to Musil et al.

Figure 9:
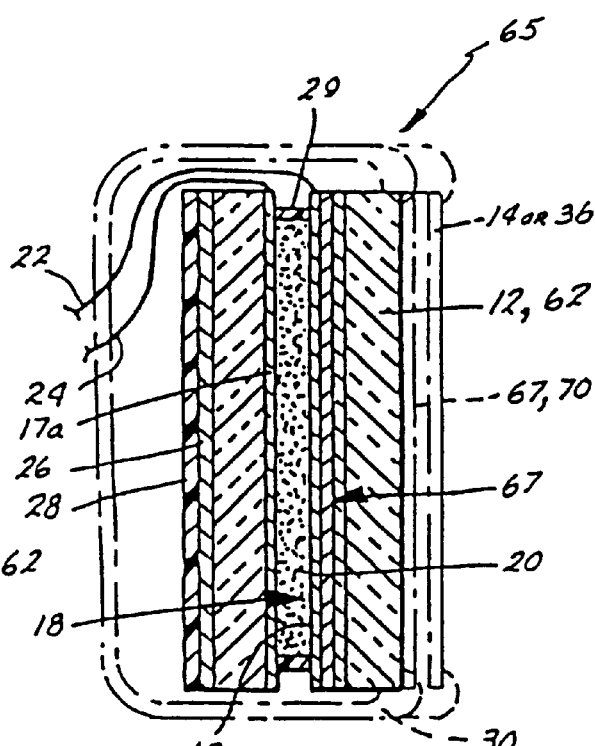
FIG. 9 is a second embodiment of an ultraviolet radiation protected, laminate, electro-optic rearview mirror assembly of the present invention.

As an alternative, UV blockers, filters or screens, or absorbers may be coated directly onto the front element 12, preferably on the first surface 11, regardless of whether it is glass or plastic (see FIG. 9). A clear transparent coating packed with UV blockers/filters/absorbers may be cast, spun, dipped, brushed, painted or sprayed onto glass surfaces through which UV radiation must pass before reaching the electro-optically active medium. A suitable solution can be made by dissolving a clear thermoplastic acrylic, polystyrene, NAS (70% polystyrene; 30% acrylic copolymer), polycarbonate, TPX (polymethylpentene), or SAN (styrene acrylonitrile copolymer) in a suitable solvent such as acetone, ethyl acetate, acetonitrile, tetrahydrofuran or any other common volatile solvent. To this, UV blockers are added such as CYASORB™ UV1084 or UV5411, available from American Cyanamid of Stamford, Conn., or any suitable material drawn from known UV blockers up to concentrations close to their solubility limit. CYASORB™ UV5411 is a benzotriazole while CYASORB™ UV1084 is an organo-nickel complex or nickel chelate. The solution so constituted can then be cast, spun, sprayed, brushed, painted or dipped onto, for instance, the outer surface of front glass element 12 followed by application of anti-lacerative layer 14 or 36 either with or without UV reducing additives as described above.

Figure 11:
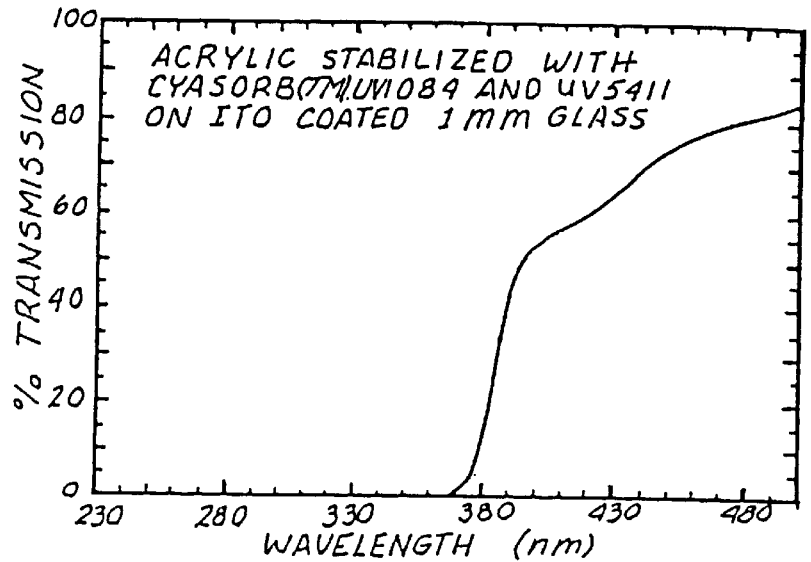
FIG. 11 is a graph showing percent transmission of electromagnetic radiation through a one millimeter glass sheet coated with indium tin oxide on one surface and a coating of clear acrylic including CYASORB™ UV radiation reducing compounds on its opposite surface.
Figure 12:
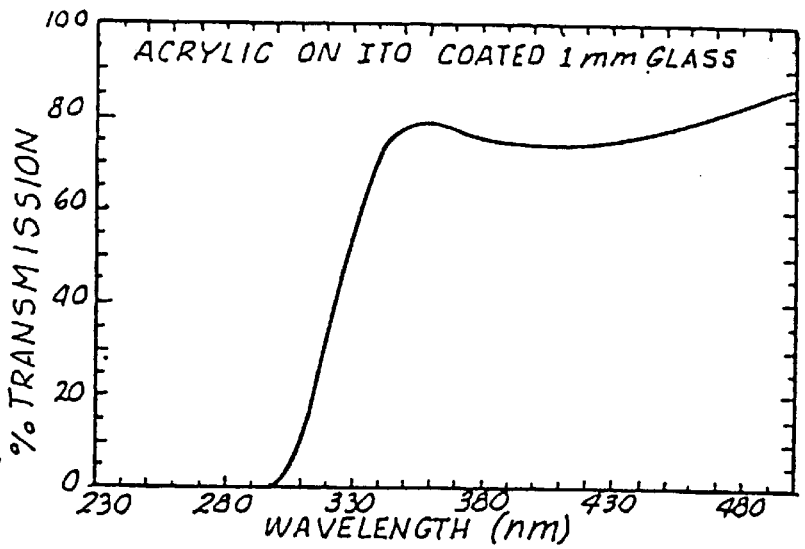
FIG. 12 is a graph showing percent transmission of electromagnetic radiation through a one millimeter glass sheet coated with indium tin oxide on one surface and a coating of clear acrylic on its opposite surface.
Figure 13:
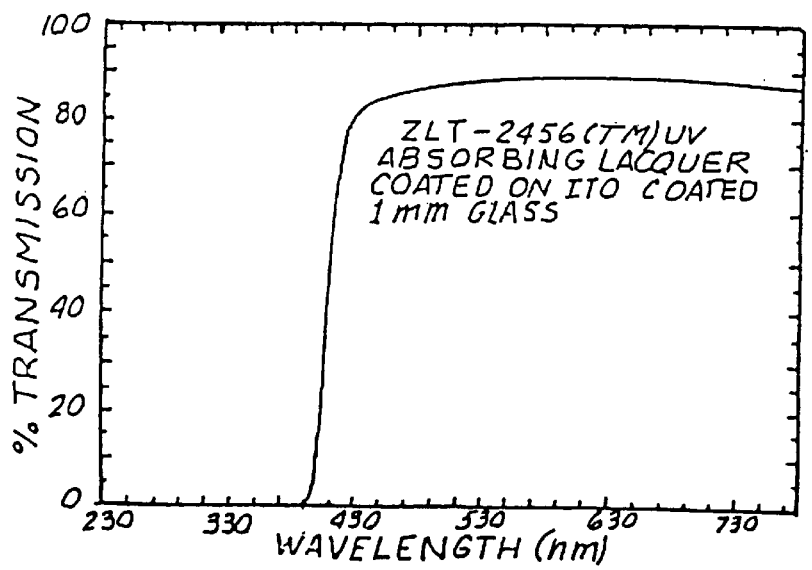
FIG. 13 is a graph showing percent transmission of electromagnetic radiation through a one millimeter glass sheet coated with indium tin oxide on one surface and clear UV protecting lacquer on its opposite surface.

For example, a 2.5% weight/volume casting solution was prepared by dissolving commercial acrylic sheeting in a 50:50 mixture of acetone and toluene. To 100 mls of this acrylic solution, 1.6 g of CYASORB™ UV1084 and 1.89 g of CYASORB™ UV5411 were added. When cast onto a piece of one mm thick ITO coated glass in a thickness of about eight microns, the acrylic was UV stabilized and yielded the transmission spectrum shown in FIG. 11. Transmission through such coated glass in the region from about 280 nm to about 350 nm was markedly reduced compared to similar transmission spectra generated when only a 2.5% non-UV stabilized acrylic solution was cast onto ITO coated glass (FIG. 12) or when no acrylic was cast and a spectrum of ITO coated glass itself was generated (FIG. 4). In spite of low UV transmission, the UV stabilized cast acrylic coating was highly transparent in the visible portion of the electromagnetic spectrum.

Alternatively, UV stabilizers/blockers/filters/absorbers can be incorporated into the polysiloxane solutions, such as Dow Corning ARC™ coatings, available from Dow Corning Inc. of Midland, Mich. These are commonly available to impart a transparent anti-abrasion coating onto optical plastics which can be used for front element 12 to further reduce fragment scattering and laceration-type injuries. Alternately, UV stabilizers/absorbers/blockers/filters can be added to thermosetting optical plastics such as CR-39™ (allyl diglycol carbonate) or optical nylons or polysulfones. With thermosetting materials such as CR-39™ optical plastic, available from PPG Industries, Inc. of Pittsburgh, Pa., the UV absorbing, blocking or screening additive is incorporated in the initial plastic components and cast onto the front surface of front element 12 prior to assembly followed by suitable curing in the conventionally known manner.

If a UV absorbing/blocking/screening material such as CR-39™ above is cast as a separate sheet, it may then be mounted on and adhered to front surface 11 of a clear plastic front element 12 with an adhesive bonding substance such as VERSILOK™ acrylics available from Lord Corporation of Erie, Pa. In such case a UV reducing additive such as benzotriazoles or hindered amines can also be incorporated directly in the adhesive bonding agent. Alternately, the sheet may be press laminated to the surface under increased pressure and modest heat.

As an alternative to adding the UV reducing additive materials to the scatter preventing, anti-lacerative layers 14, 36 or other polymers, or as coatings in combination with such anti-lacerative layers, or as coatings in combination with the addition of the above mentioned types of additives to such layers, other materials may be used to decrease the ultraviolet radiation passing through the front element 12 to the interior of the mirror assemblies as shown in FIGS. 5–10.

Figure 5:
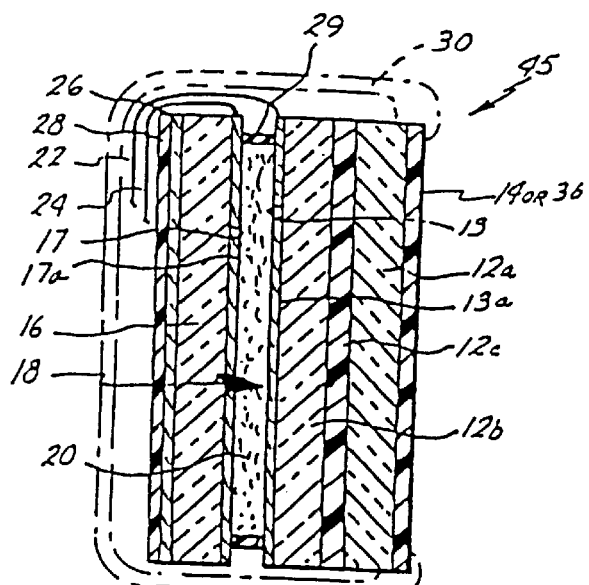
FIG. 5 is a second embodiment of the scatter protected, anti-lacerative and ultraviolet radiation protected, laminate, electro-optic rearview mirror assembly of the present invention.

In FIG. 5, where like numerals indicate like parts to those described above, a laminate, electro-optic rearview mirror assembly 45 has front glass 12 replaced with a laminate glass assembly comprised of a front glass element 12a having parallel front and rear surfaces adhered to an intermediate glass element 12b also having parallel surfaces by an interlayer 12c of polyvinylbutyral (PVB). Layer 12c is adhered to the rear surface of glass element 12a and the front surface of glass element 12b by heat and pressure lamination such as with the conventionally known autoclave method or the like. Glass elements 12a, 12b may be conventional soda lime window glass. The rear surface of glass element 12b is coated with indium tin oxide layer 13 which is, in turn, sealed with the front ITO coated surface of rear glass element 16 by seal 29 to provide the space 18. A scatter preventing, anti-lacerative, ultraviolet radiation reducing layer such as that shown above at 14 or 36 may be adhered to the front surface of front glass element 12a by suitable adhesives, heat, pressure or curing to provide the additional advantages noted above. However, the laminate glass assembly of assembly 45 inherently affords extra safety advantages by contributing to the reduction of ultraviolet radiation transmission into the assembly and providing greater shatter resistant strength for the assembly while providing scatter protection due to the use of the PVB layer 12c together with the anti-lacerative protection of layers 14 or 36.

Figure 6:
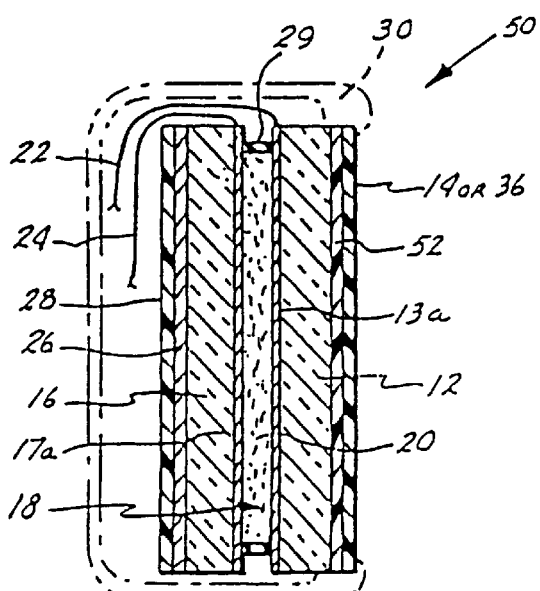
FIG. 6 is a third embodiment of the scatter protected, anti-lacerative and ultraviolet radiation protected, laminate, electro-optic rearview mirror assembly of the present invention.
Figure 7:
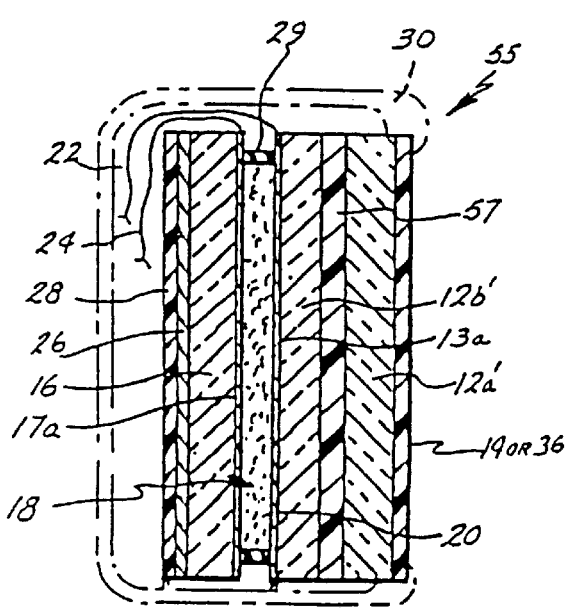
FIG. 7 is a fourth embodiment of the scatter protected, anti-lacerative and ultraviolet radiation protected, laminate, electro-optic rearview mirror assembly of the present invention.

With reference to FIGS. 6 and 7, where like numerals indicate like parts, it is also possible to incorporate sheet polarizers in the mirror assembly to further prevent ultraviolet radiation transmission into the assembly. In FIG. 6, a laminate electro-optic rearview mirror assembly 50 includes a layer of light polarizing sheet material 52 applied to the front surface 11 of front glass element 12 prior to adherence of the anti-scatter, anti-lacerative layer 14 or 36 mentioned above. A suitable H-sheet polarizer material is that sold under Product No. HN-38 by Polaroid Corporation of Cambridge, Mass. Such sheet polarizers act to block and screen out ultraviolet radiation below wavelengths of about 380 nm.

Alternately, a sheet polarizer material 57 like that above may be incorporated in the laminate electro-optic rearview mirror assembly 55 of FIG. 7 where it is laminated and adhered as an interlayer between the front and rear surfaces of intermediate and front glass elements 12b' and 12a' to provide a glass laminate assembly. That glass assembly is substituted for front glass element 12 just as assembly 45 of FIG. 5. As with assembly 45, mirror assembly 55 has increased mechanical strength due to the laminate construction of the front glass panel, may incorporate scatter preventing, anti-lacerative layers 14 or 36 on the front surface of the front glass element 12a' for safety purposes, and reduces UV radiation transmitted into the assembly due to the UV absorbing and blocking function of the sheet polarizer layer 57 and any layer 14 or 36 to increase the lifetime of the assembly.

Figure 8:
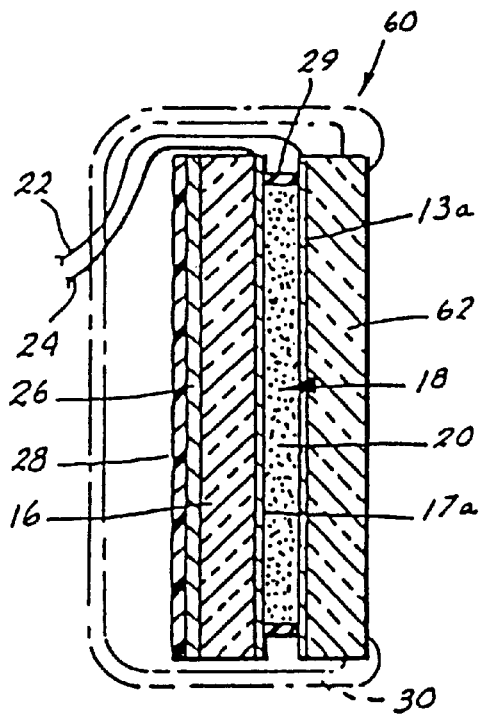
FIG. 8 is an ultraviolet radiation protected, laminate, electro-optic rearview mirror assembly of the present invention.

In FIG. 8, where like numerals indicate like parts to those described above, mirror assembly 60 includes a front glass element 62 formed from one of several types of specialized glass rather than conventional soda lime window glass. For example, front glass element 62 may have a higher iron oxide content of within the range of about 0.2% to 0.9% by weight thereby increasing the ultraviolet radiation absorption, blockage and/or screening effect. Similar improvement can be obtained using higher cerium oxide content of 0.2% to 0.9% by weight concentration. Other specialized glasses which have high visible transmission but are strong absorbers in the ultraviolet electromagnetic region can be used including NOVIOL™ glasses as described in "Spectral-Transmissive Properties and Use of Eye-Protecting Glasses" by R. Stair in National Bureau of Standards Circular 471 (1948). A two millimeter thick sheet of NOVIOL™ 0 CG306 (National Bureau of Standards Circular, 471 (1948)) transmits only about 12% of the incident ultraviolet radiation at 380 nanometers in contrast to transmission of approximately 70% of the incident ultraviolet radiation at 360 nanometers with a conventional soda lime window glass sheet. This is true even when such NOVIOL glass is coated with indium tin oxide as an electrical conductor. Conventional soda lime glass begins to screen out significant amounts of ultraviolet radiation only below about 300 nm.

Other useful specialty glasses include UV-36™ glass available from Hoya Corporation of Tokyo, Japan having an average transition wavelength of about 360 nm such that it cuts off ultraviolet radiation below that wavelength. Transition wavelength is the wavelength at the midpoint of the transition interval where glass goes from being highly transmitting to visible radiation to being highly absorbing for UV radiation. Other glasses which can be used include L-1B™ also available from Hoya Corporation having an average transition wavelength of 420 nm. Other examples include CS0501, No. 0-51™ available from Corning Glass Works, Corning, N.Y. having a transmittance less than 0.5% at 334 nm and lower at shorter wavelengths but being highly transmitting in the visible electromagnetic region and FG-62™ available from Ohara Optical Glass Manufacturing Company, Ltd., of Tokyo, Japan, having a UV cutoff just slightly below 400 nm. Such ultraviolet radiation reducing glasses may be used either with or without scatter preventing, anti-lacerative, UV reducing layers 14 or 36 or the UV reducing coatings mentioned above. When used, however, the scatter preventing, anti-lacerative layers have the added advantage of significantly strengthening such glass which, in many instances, are mechanically weaker than conventional window glass. In addition such speciality glasses may be used in the laminate assemblies substituted for front element 12 as described with FIGS. 5 and 7.

As mentioned above, elements 12, 16 may also be cut or cast from clear plastic sheet material such as acrylic or polycarbonate and used in place of front element 62 of FIG. 8. Additives such as benzotriazoles and benzophenones may be incorporated in the plastic to reduce UV radiation transmission. Other UV reducing layers or coatings as described herein, including polymer layers 14, 36, may also be used in combination with the plastic elements.

As shown in FIG. 9, wide band, ultraviolet radiation, dielectric, dichroic or reflective filter materials may also be used in conjunction with the front glass or plastic elements 12 or 62. Suitable dichroic filter or reflective materials include thin film coatings 67 which significantly reduce ultraviolet transmission. Thin film layers 67 can be applied to any glass or plastic surface ahead of the UV vulnerable electro-optic mirror medium 20 but preferably on front or first surface 11. A suitable thin film coating is the ultraviolet wide band dichroic filter available from Optical Coatings Laboratory, Inc. of Santa Rosa, Calif. When applied to the rear surface of front element 12 or 62 as shown in FIG. 9 in solid lines, coatings 67 are interposed between the element rear surface and ITO coating 13a. When applied to the front surface 11, however, thin film coatings 67 are interposed between the front surface and the scatter preventing, anti-lacerative layer 14 or 36 as illustrated in phantom. Thin film coatings 67 have a transmission of visible light over 80% at 550 nm with a sharply lowered transmission of about 5% at 400 nm at which level the thin films become reflecting to UV radiation.

As a substitute for the thin film coatings 67, ultraviolet radiation blocking paints or lacquers can be applied to the element surfaces provided such paints or lacquers are transparent to visible light. A suitable material for layer 70 is a lacquer supplied as ZLI-2456 transparent UV protecting lacquer which is a solvent based acrylic with added UV stabilizers manufactured by E. M. Industries of Hawthorne, N.Y. Such lacquer substantially reduces UV radiation transmitted into the assembly and is preferably applied to front surface 11 of element 12 to avoid dissolving in medium 20.

For example, the above UV protecting lacquer ZLI-2456 was coated on a one mm thick sheet of ITO conductive glass to a thickness of about 30 microns. The transmission spectrum of such coated glass is shown in FIG. 3. It has a sharp transmission cutoff below about 400 nm and greatly reduces UV radiation in the 290–400 nm region as compared to that normally transmitted by ITO coated glass (see FIG. 4).

Thin film coatings or UV reducing paint or lacquer layers 67, 70 may be used with conventional soda lime window glass as front glass element 12, or with specialized UV radiation reducing or higher iron oxide containing glass, or other UV reducing elements 62 such as the plastic elements mentioned above.

Figure 10:
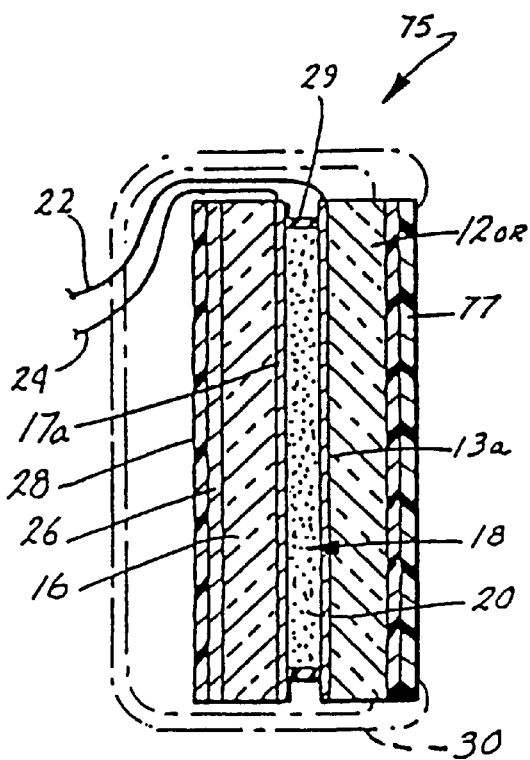
FIG. 10 is a scatter protected, anti-lacerative anti-fogging, laminate, electro-optic rearview mirror assembly.

As shown in FIG. 10, a further embodiment 75 of the laminate electro-optic rearview mirror assembly is illustrated including a scatter preventing, anti-lacerative layer 77 similar to the polyvinylbutyral/polyester composite layer 36 described above in connection with FIG. 2 but also including silicone moieties chemically incorporated in the anti-lacerative composite. Polymer layer 77 including the silicone additive prevents condensation and/or beading up of condensed water on the coated front surface 11 of front mirror element 12, 62 in high humidity conditions thereby providing an anti-fogging, anti-misting result. A material found useful as anti-lacerative, anti-fogging layer 77 is silicone impregnated polyurethane supplied under the trade name CLARIFLEX™ by Saint-Gobain Vitrage of Paris, France. UV reducing additives such as those described above in connection with FIG. 2 may also be incorporated in the anti-lacerative, anti-fogging layer to increase the lifetime of the assembly. Alternately, front glass element 12, 62 may be fashioned from conventional soda lime glass, UV reducing specialized glasses, or polymer plastics. It is also possible to utilize thin film coatings or UV reducing paints or lacquers 67, 70 on at least one surface of front element 12, 62 when the anti-lacerative, anti-fogging layer is incorporated.

It is also possible to incorporate UV radiation reducing or absorbing stabilizers directly in the electro-optic medium 20 injected or otherwise inserted in space 18. Such absorbers may be dissolved directly in the medium, e.g., an electrochemichromic liquid. The UV absorbers are selected to be compatible with the ingredients of the medium 20, such that they do not affect the electrical performance and function of the medium or oxidize or reduce in the assembly.

As an example, a laminate electrochemichromic mirror was fabricated as described in the above example in connection with FIG. 2 except that no anti-lacerative layer was used over front glass element 12. In addition, UV stabilizers CYASORB™ UV1084 and CYASORB™ UV5411 were added to the electrochemichromic active solution prior to filling into the gap 20 between front glass 12 and back glass 16. Concentration for the UV1084 was 0.6% by volume and the UV5411 was 0.6% by volume g/cc.

Figure 14:
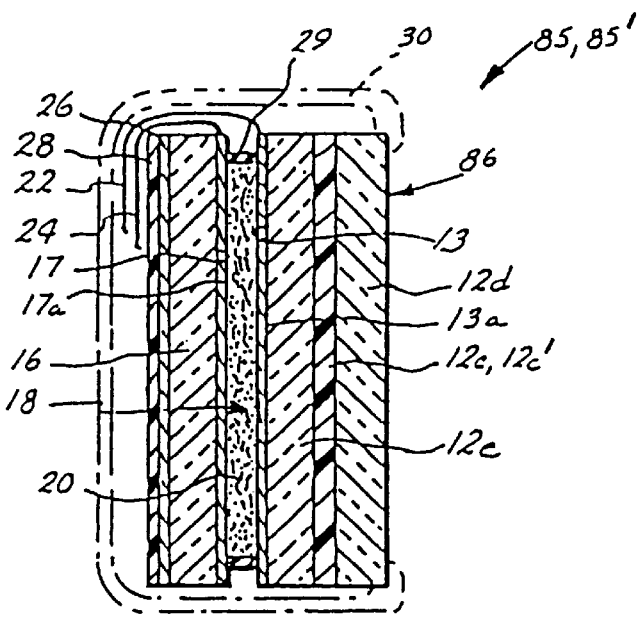
FIG. 14 is a fifth embodiment of the scatter protected, anti-lacerative and ultraviolet radiation protected, laminate, electro-optic rearview mirror assembly of the present invention.

As shown in FIG. 14, where like numerals indicate like parts to those described above, another embodiment 85 of the laminate, electro-optic rearview mirror assembly also includes a laminate glass assembly substituted for the front glass as is the case in embodiments 45 and 55 in FIGS. 5 and 7 above. The front or first, laminate assembly 86 includes a front or first glass panel 12d having parallel front and rear surfaces adhered to an intermediate glass panel 12e also having parallel surfaces by an interlayer 12c of polyvinylbutyral (PVB) or another interlayer as described below. As in the prior embodiments, layer 12c is adhered to the rear surface of glass panel 12d and to the front surface of glass panel 12e by heat and pressure lamination such as with the conventionally known autoclave method or the like. In embodiment 85, however, glass panel 12d is formed from a blue tinted specialized glass which significantly reduces UV radiation transmission while maintaining high visible light transmission. The rear surface 13 of glass panel 12e is coated with an indium tin oxide layer 13a which is, in turn, sealed with the front ITO coated surface 17 of rear glass element 16 by seal 29 to provide electro-optic media receiving space 18 as in the above embodiments.

Figure 22A:
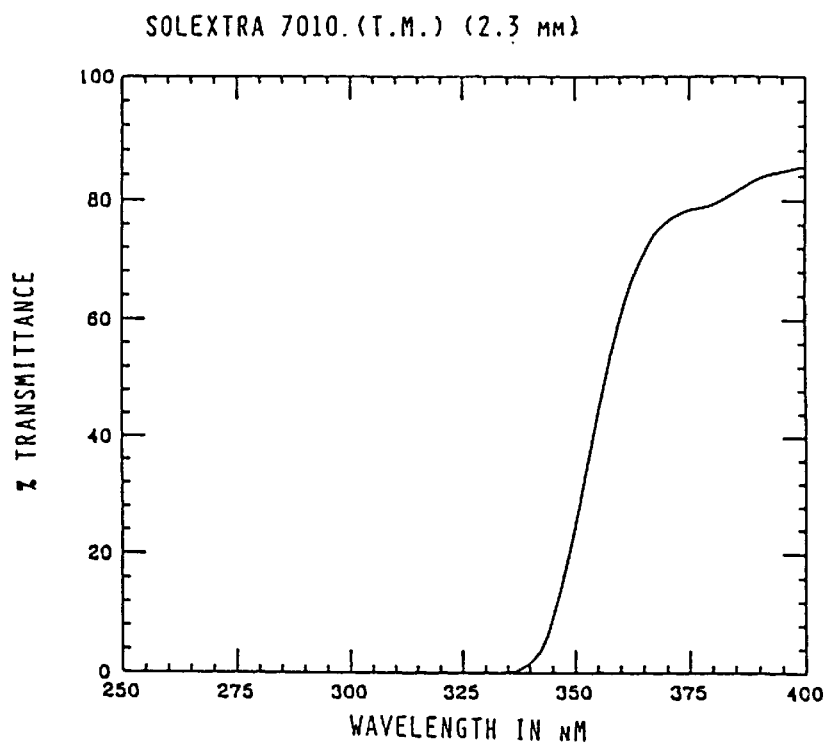
FIGS. 22a and 22b are graphs showing the percent light transmission of SOLEXTRA 7010™ blue tinted specialized glass in the ultraviolet and visible regions of the spectrum, respectively.
Figure 22B:
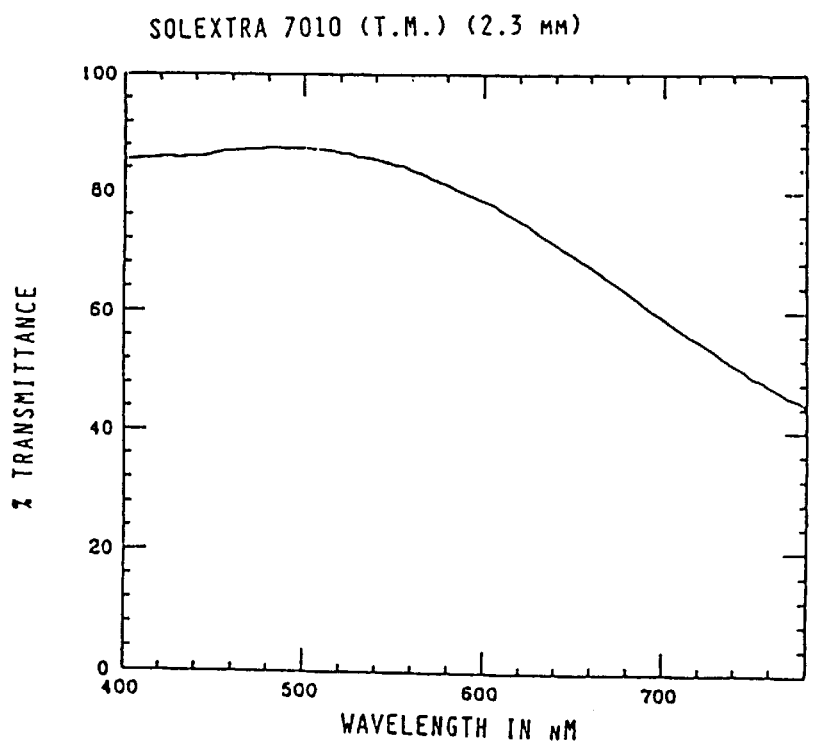

Preferably, the blue tinted specialized glass 12d is formed from SOLEXTRA 7010™ blue tinted glass available from Pittsburgh Plate Glass Industries, Pittsburgh, Pa. Graphs illustrating the percent transmission of both ultraviolet and visible light for a 2.3 mm thick pane of SOLEXTRA 7010™ glass are shown in FIGS. 22a and 22b. SOLEXTRA 7010™ glass is highly visibly transmitting at the 2.3 mm thickness, i.e., 83% transmission overall using a Standard Illuminant C and a photopic detector (FIG. 22b). Also, this glass appears light blue in transmission and strongly absorbs UV radiation below about 340 nm (FIG. 22a). At this thickness, Solextra 7010™ passes only about 2% of the incident solar energy in the 250–350 nm range. In the 350–400 nm region, it passes about 67% of the incident solar energy.

Figure 23A:
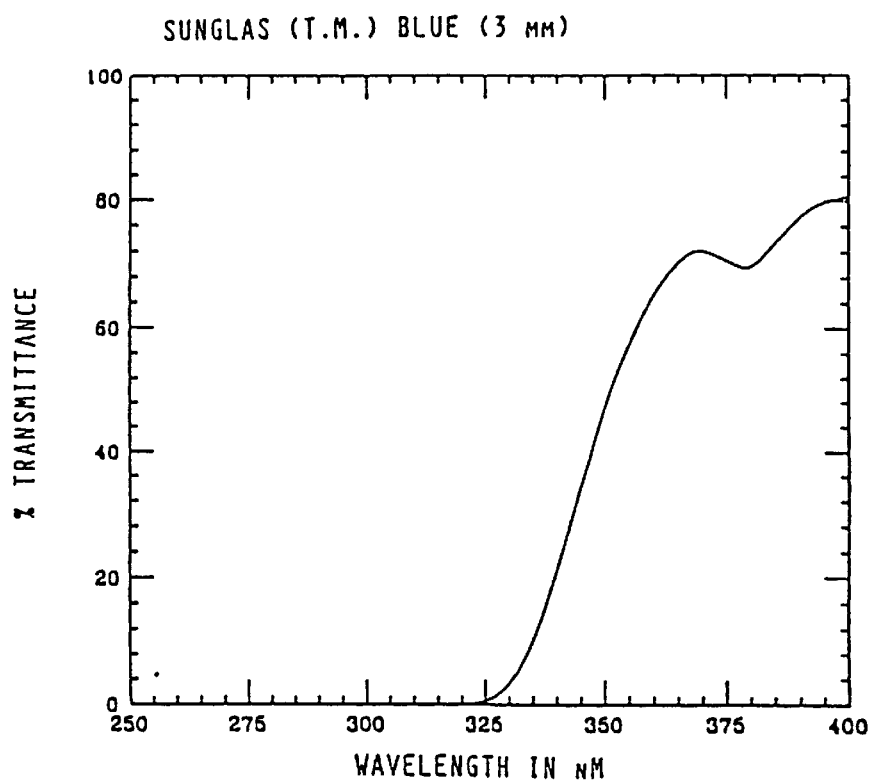
FIGS. 23a and 23b are graphs showing the percent light transmission of SUNGLAS™ Blue blue tinted specialized glass in the ultraviolet and visible regions of the spectrum, respectively.
Figure 23B:
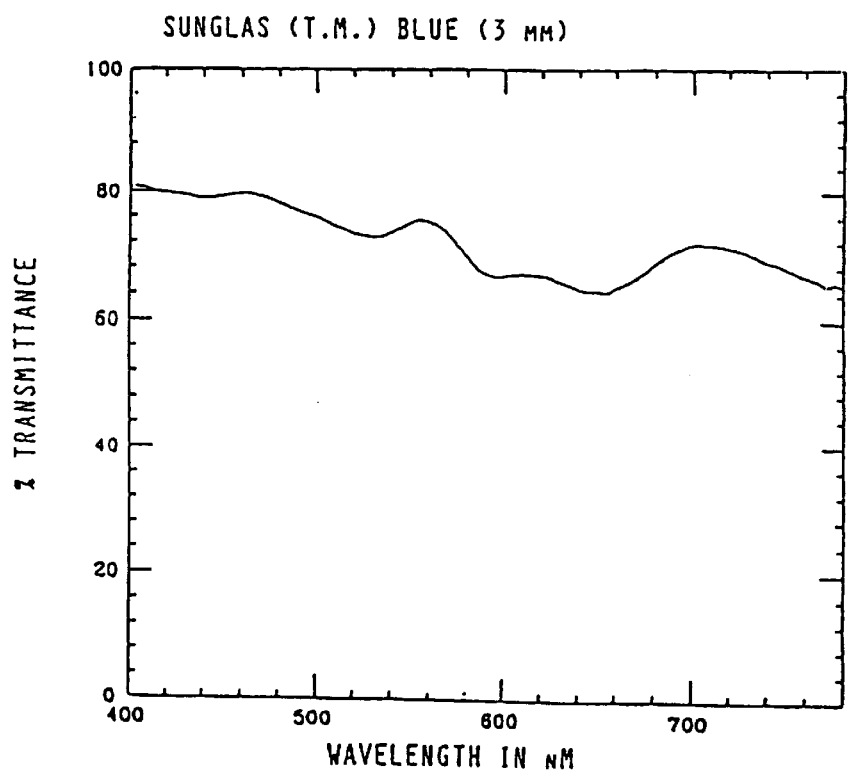

Alternately, glass panel 12d may be formed from SUNGLAS™ Blue, a blue tinted glass from Ford Glass Co., Detroit, Mich. The spectral transmission for a 3 mm pane of SUNGLAS™ Blue, a blue tinted glass is shown in FIGS. 23a and 23b. This glass is highly visibly transmitting at this thickness, i.e., 72% transmission overall with Standard Illuminant C and a photopic detector (FIG. 23b), appears light blue in transmission and strongly absorbs ultraviolet radiation below about 330 nm (FIG. 23a). Such thickness of SUNGLAS™ Blue, a blue tinted glass passes only about 11% of the incident solar energy in the 250–350 nm range and 67% of the incident solar energy in the 350–400 nm range.

The above specialized glasses may also be used for second glass panel 12e or both panels 12d and 12e. Whether or not to use such specialized glass in both panels 12d and 12e is dictated by the degree of UV radiation protection desired, and by the degree of attenuation allowable in visible transmission of light that is concurrent with use of even thicker panes or multiple panes of blue tinted or similar light filtering panels.

Mirror assembly 85 incorporating one or more blue glass panels provides a unique advantage. As described above, UV radiation stabilizers may be added to enhance the UV radiation stability of an electrochemichromic solution used in a rearview mirror assembly. Broad UV radiation stabilizers such as CYASORB 24™ from American Cyanamid Company of Wayne, N.J., UVINUL D-50™ from BASF Wyandotte Corporation, Parsippany, N.J., or TINUVIN 327™ from Ciba Geigy, Hawthorne, N.Y., impart a yellow color to electrochroic or electrochemichromic solutions or materials, especially when they are added in high concentrations where they are most effective in protecting UV vulnerable materials. Yellow is aesthetically displeasing in many applications and is particularly displeasing when used in rearview mirrors. Also, when electrochemichromic solutions are exposed to prolonged dosages of high intensity UV radiation, such as occur during natural weathering in sunny climates, those solutions frequently turn a yellowish hue which is aesthetically displeasing to the consumer. It has been found that use of specialized blue glass, such as that described above, allows use of higher concentrations of broad UV radiation stabilizers in electrochemichromic solutions than otherwise would be consumer tolerable due to yellowing.

As an example of an electrochemichromic device constructed according to FIG. 14, an electrochemichromic solution was formed from 0.025M methylviologen perchlorate, 0.025M 5,10-dihydro-5,10-dimethylphenazine, 0.025M tetraethylammonium perchlorate and 12.5% wt/vol CYASORB 24™ UV radiation stabilizer, all dissolved in 2-acetylbutyrolactone. When filled in cavity 18 of embodiment 85 as shown in FIG. 14, cavity 18 having a 150 micron thickness and using 15 ohms/sq indium tin oxide (ITO) transparent coatings 13a, 17a and with glass panels 12d and 12e both fabricated of 1.6 mm standard, clear, soda lime glass laminated together with a commercially available, clear PVB interlayer 12c SAFLEX™ SR#11 from Monsanto Company of St. Louis, Mo., at zero potential and with a silver mirror reflector such as reflective layer 26 behind the assembly, the light reflected off mirror embodiment 85 has a distinct yellow tint and measures about 80% reflectivity using Standard Illuminant A and a photopic detector. Because consumers in automobiles are accustomed and appreciative of "silvery" reflection such as is found on interior and exterior automotive mirrors of conventional design, the marked yellow tint makes use of high concentrations of broad UV radiation absorbers commercially disadvantageous. Yet, such high concentrations of UV absorbers have the advantage of affording greater UV protection and, therefore, prolong the commercial life of electrochemichromic rearview mirror devices, particularly when used on the outside of a vehicle.

However, when a 2.3 mm pane of SOLEXTRA 7010™ was substituted as the first glass panel 12d, with all other factors being the same for the example of embodiment 85 as described above, the reflection as seen in the mirror reflector was no longer yellow but had a color or tint described as gun metal blue to neutral silvery. This is a much more acceptable and commercially desirable reflective color than the yellowish tint previously obtained. Because SOLEXTRA 7010™ glass panel 12d naturally filters out yellow light thereby absorbing undesirable yellow tint, the integrated reflection at zero potential in this version of the assembly is lower than that using clear glass, i.e., about 63% reflectivity using Standard Illuminant A and a photopic detector. However, such transmission is still sufficiently high to allow successful use in vehicles, particularly as outside mirrors.

Figure 24:
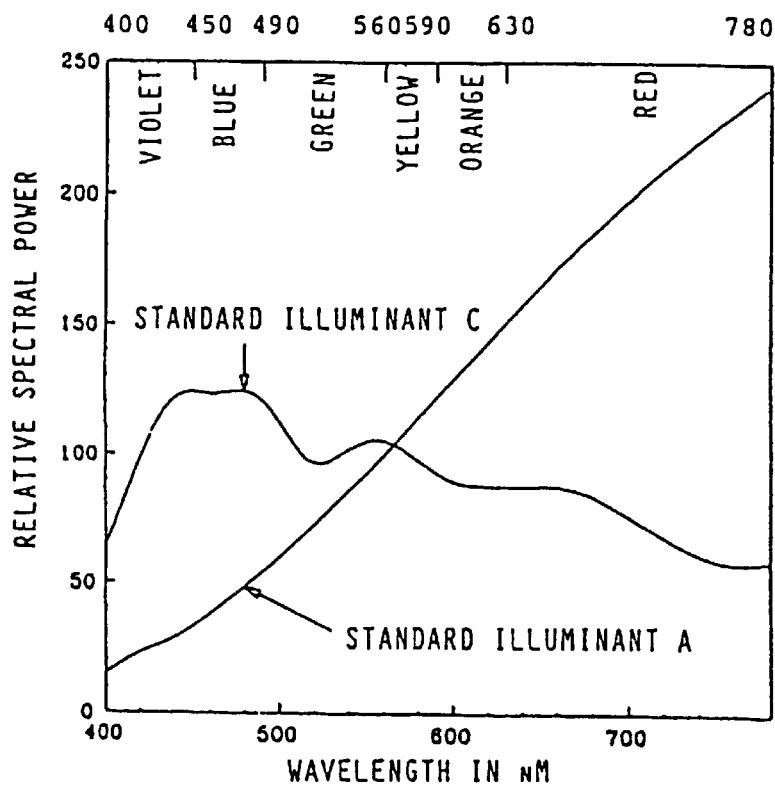
FIG. 24 is a graph showing the relative spectral power of Standard Illuminant Sources A and C as well as the main color bands of the visible spectrum.
Figure 25:
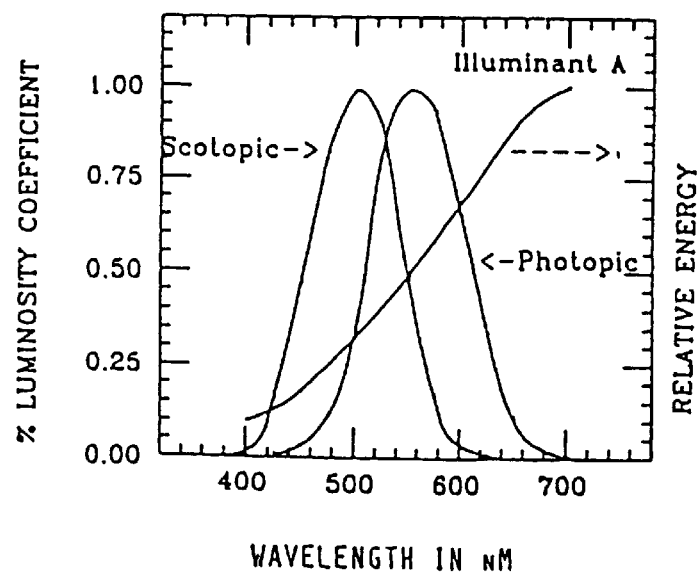
FIG. 25 is a graph showing the dark/scotopic and bright/photopic sensitivity of the human eye superimposed on the spectral output of a tungsten lamp used as Standard Illuminant A.

Yet another advantage is obtained using embodiment 85 and the specialized glass panels 12d or 12e therein. Blue mirrors are particularly well-suited to night driving. FIG. 24 illustrates the relative spectral power output versus wavelength of a CIE Standard Illuminant A and for CIE Standard Illuminant C. Illuminant A is a Planckian radiator at 2856K and, thus, is similar to an automobile headlamp. Illuminant C provides light similar to average daylight. Also included on FIG. 24 are the wavelengths of light which form the main bands of color in the visible spectrum. By day, rearview mirror illumination is natural daylight (similar to Illuminant C). By night, however, mirror illumination will be that of headlamp output (similar to Illuminant A) superimposed upon nighttime ambient light which is essentially spectrally unbiased. Vision from a mirror is also dependent on the spectral sensitivity of the driver's eye. The spectral sensitivity of the human eye depends on its light adaptation. If bright adapted, vision is photopic and the spectral sensitivity is as shown in FIG. 25. If dark adapted, however, vision is scotopic and sensitivity shifts toward the blue. Between these two extremes vision is mesopic. Almost all night driving is in the mesopic range of adaptation because the reflection of the driver's own headlights from the road provide sufficient illumination to maintain the adaptation level above the scotopic range even on a very dark, unlit road. Because a headlamp emits efficiently in the yellow/orange/red region of the visible spectrum, but relatively poorly in the blue region as shown in FIGS. 24 and 25, and because a driver's eyes when driving at night are somewhat more sensitive to blue light, mirrors which optimize reflectance in the blue spectral region but minimize reflectance in the yellow/orange/red region best match human eye sensitivity in day and night conditions, are most efficient at reducing headlamp glare and are desirable as both inside and outside rearview mirrors. Therefore, embodiment 85, which includes the specialized tinted glass panel or panels, is efficient in absorbing or filtering out substantially more light in the yellow/orange/red regions of the visible spectrum than in other regions of the visible spectrum. It tends to mask yellowness due to any inclusion of UV radiation absorbers, or due to any degradation of the EC or ECC material itself, efficiently absorbs headlamp glare, provides a pleasing, attractive reflective color, and allows matching to visible blue tinted colors on outside mirrors when one side of the vehicle has an electro-optic mirror assembly for the driver and the other has a conventional, blue tinted, passenger-side mirror. In addition, the blue tinted embodiment 85 of the present mirror assembly is more restful on a user's eyes since any yellowness otherwise present in an electro-optic mirror assembly incorporating UV radiation stabilizers is a more efficient reflector of light from a yellow headlight and, thus, would reflect more glare to a user's eyes than a comparable blue tinted mirror. Also, a commercially useful advantage of SOLEXTRA 7010™ and SUNGLAS™ Blue glass panels is that they are relatively inexpensive, namely, generally about two to three times the already low commodity cost of conventional, clear, soda lime glass.

Alternately, SunBlue™ glass from Asahi Glass Company, Tokyo, Japan, can be used for one or both panels 12*d* and 12*e*. SUNBLUE™ is a blue tinted float glass incorporating added iron content and has a visible light transmission of 83% at a 3 mm thickness (per JIS-R-3106) and a UV radiation cutoff below about 330 nm.

Figure 26A:
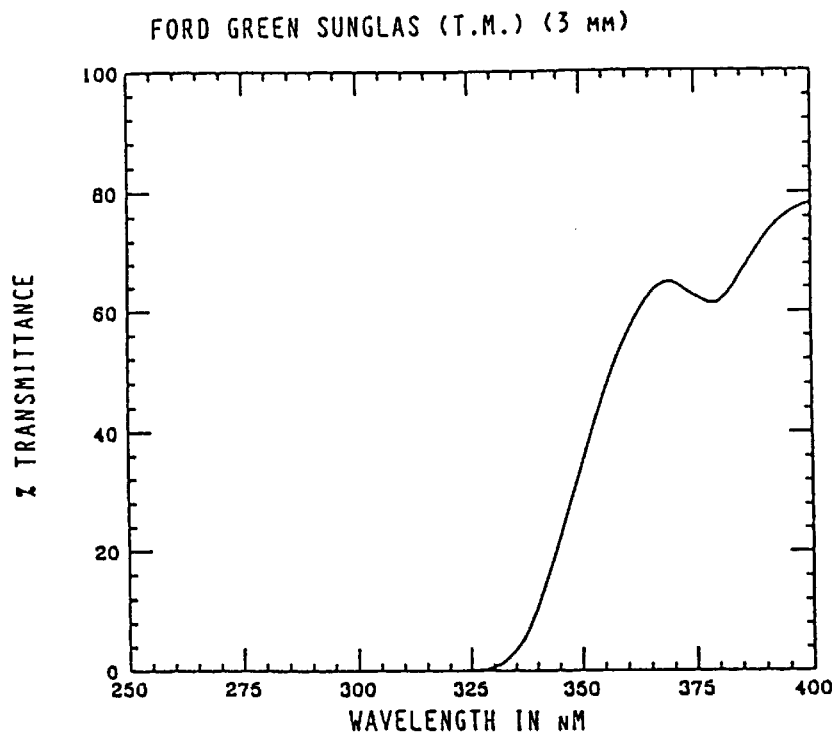
FIGS. 26a and 26b are graphs showing the percent light transmission of SUNGLAS™ Green green tinted specialized glass in the ultraviolet and visible regions of the spectrum, respectively.
Figure 26B:
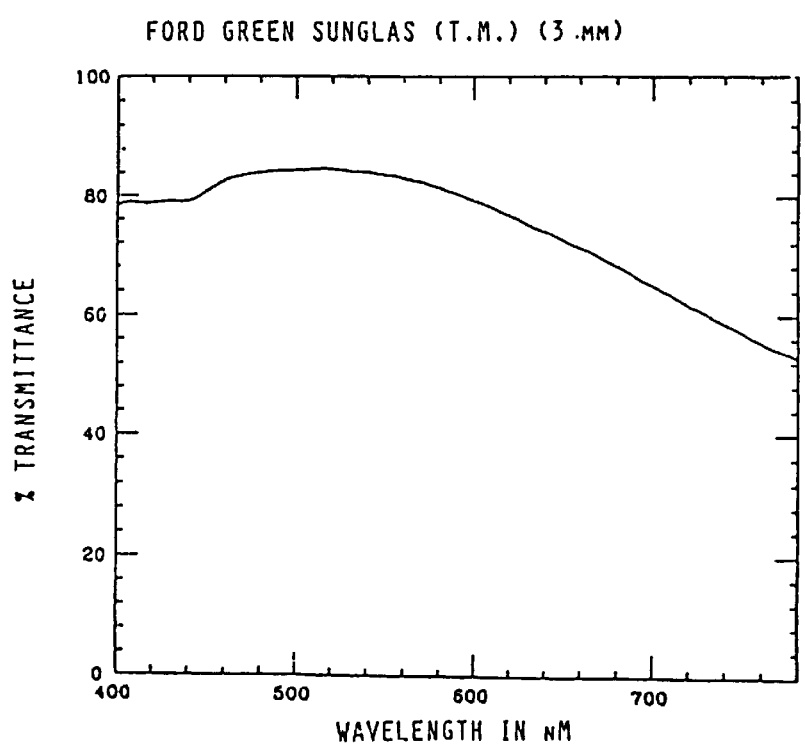

Also, SUNGLAS™ Green from Ford Glass, Detroit, Mich., a green tinted glass, could be used for either or both of glass elements 12*d* and 12*e* in embodiment 85. As shown in FIG. 26*b*, such glass, in a 3 mm thickness, is highly light transmitting in the visible spectrum, i.e., 82% transmission overall with Standard Illuminant C and a photopic detector. It is also slightly green tinted and cuts off UV radiation transmission below about 330 nm as shown in FIG. 26*a*. This glass in such thickness transmits only about 6% of the incident solar energy in the 250–350 nm region, and about 60% in the 350–400 nm region.

Figure 27A:
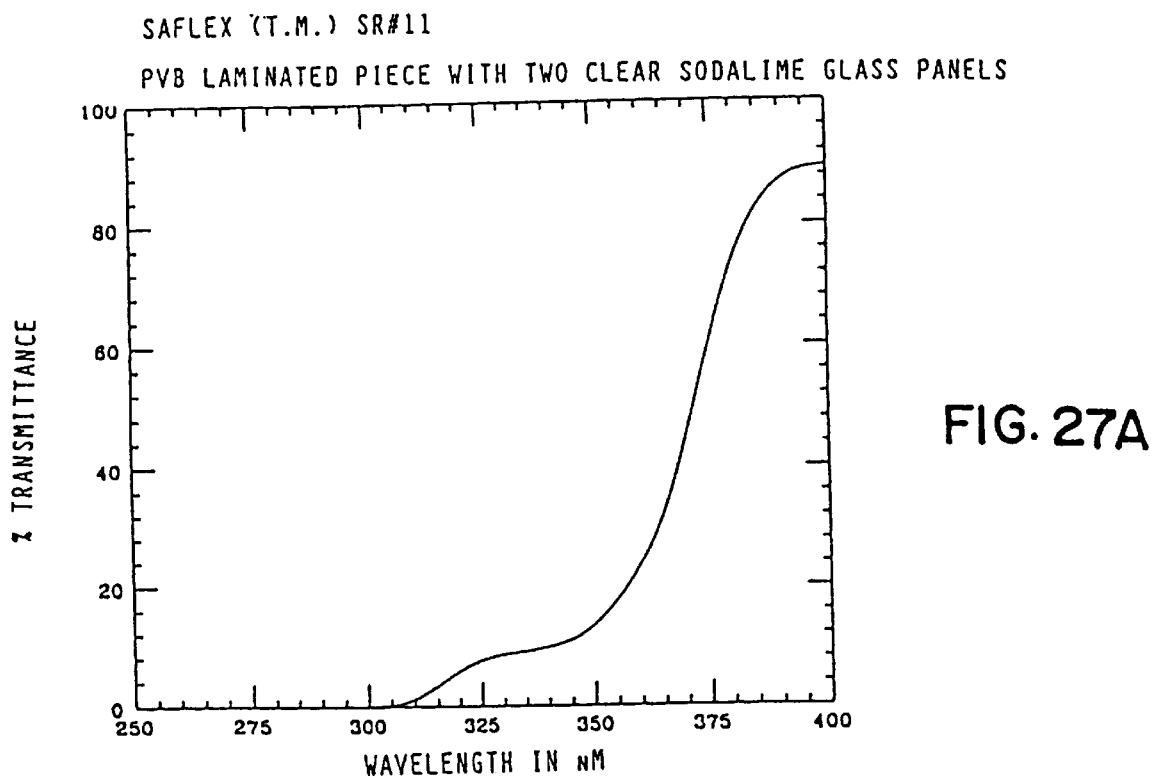
FIGS. 27a and 27b are graphs showing the percent light transmission of a pair of clear soda lime glass panels laminated together by SAFLEX™ SR#11 polyvinylbutyral sheeting in the ultraviolet and visible regions of the spectrum, respectively.
Figure 27B:
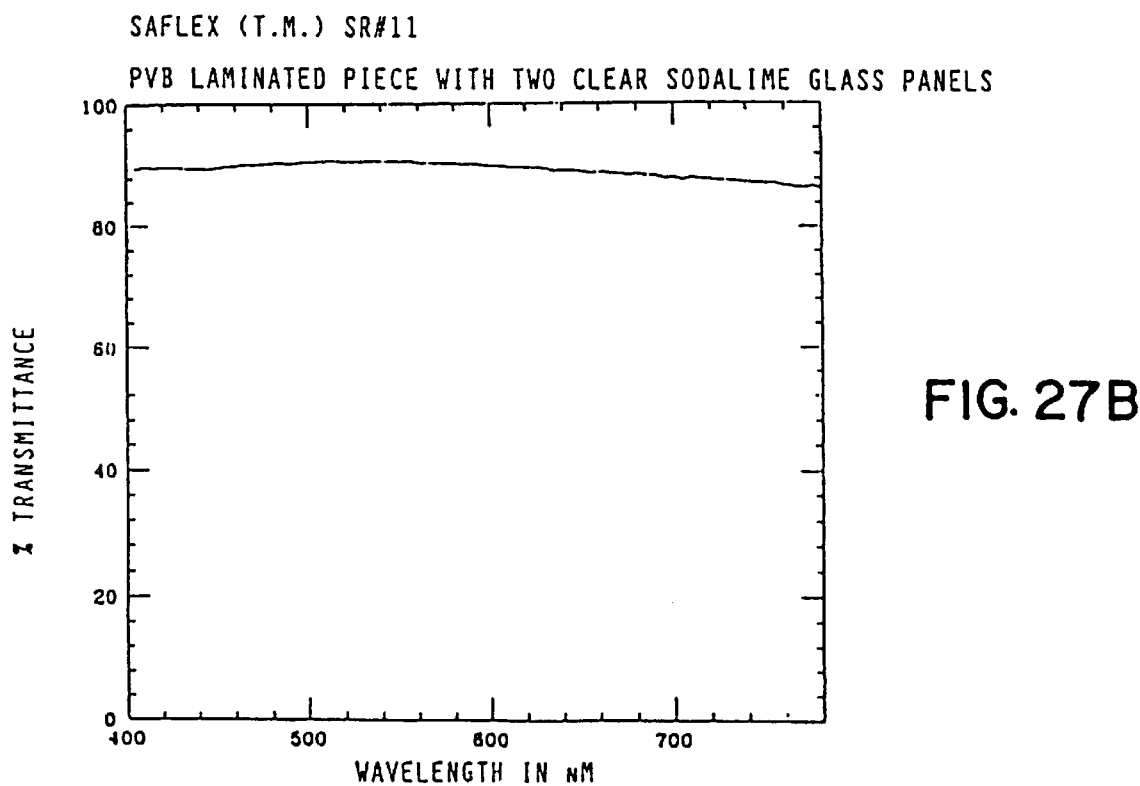

A preferred material for the interlayer 12*c* of embodiment 85 is commercially available polyvinylbutyral (PVB) sheeting such as SAFLEX™ SR#11 PVB mentioned above. Such commercially available PVB sheeting is commonly used in automotive and architectural products and is formed by combining PVB resin with added UV absorbers, as described earlier. Such commercially available polyvinylbutyral (PVB) sheeting is heavily plasticized with at least about 19 parts of plasticizer per 100 parts of polyvinylbutryal resin using plasticizers such as triethyleneglycol dihexoate, triethyleneglycol di-2-ethyl butyrate, tetraethyleneglycol di-n-heptanoate, di-n-hexyl adipate, butyl benzyl phthalate, and dibutyl sebacate. FIGS. 27*a* and 27*b* illustrate the ultraviolet and visible spectral transmission of a sheet of SAFLEX™ SR#11 PVB adhered between two 1.6 mm conventional, clear, soda lime glass panels. Such a laminated assembly, using clear glass and SAFLEX™ SR#11, transmits only about 8% of the incident solar energy in the 250–350 nm region and about 54% of such energy in the 350–400 nm region. When laminated, SAFLEX™ SR#11 sheeting is water clear in light transmission.

Figure 35A:
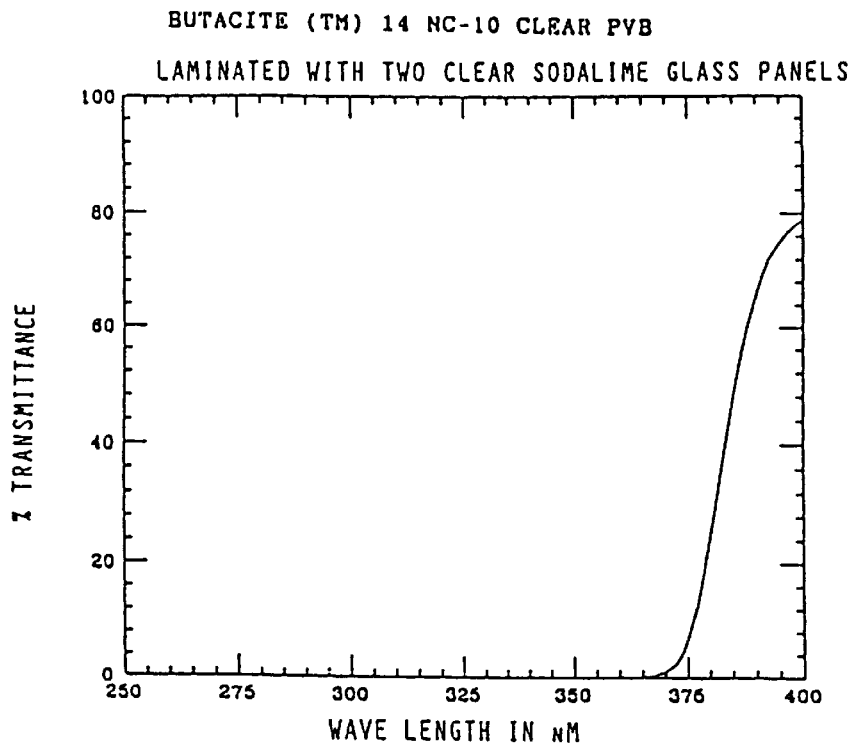
FIGS. 35a and 35b are graphs showing the percent light transmission of a pair of clear soda lime glass panels laminated together by BUTACITE™ 14 NC-10 polyvinylbutyral sheeting in the ultraviolet and visible regions of the spectrum, respectively.
Figure 35B:
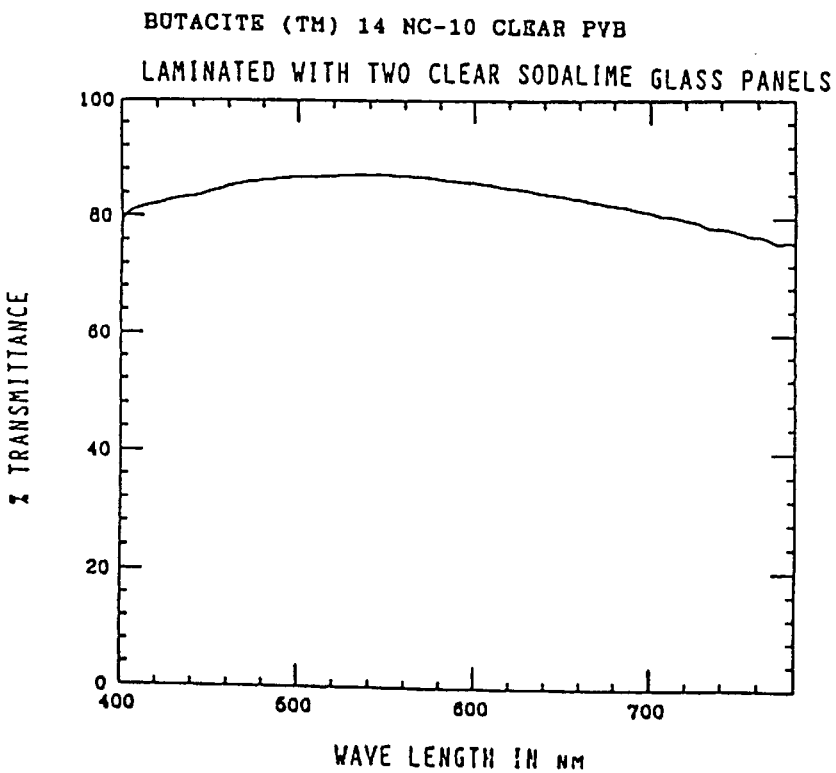

In general, various forms of SAFLEX™ polyvinylbutyral sheeting interlayers are acceptable for use in this invention as UV reducing interlayers. These include SAFLEX SR™, SAFLEX TG™ and SAFLEX TL™ sheeting in thickness ranges between about 0.015 and 0.060 inch. Thicker PVB interlayers provide better UV radiation shielding but may cause visible distortion. Yet, thicker sheeting is acceptable if due care is taken during lamination. Generally, such SAFLEX™ sheeting is preferably shipped and stored in a refrigerated or cold condition to prevent the sheeting from sticking to itself while easing handling and use. Other commercially available clear PVB sheeting can be used. For instance, an architectural composition such as BUTACITE™ 14 NC-10 clear PVB sheeting from E. I. duPont de Nemours and Company of Wilmington, Del. is a suitable choice. BUTACITE™ is plasticized polyvinylbutyral which is plasticized with tetraethyleneglycol di-n-heptanoate, with a plasticizer content (parts/100 parts resin) of about 38.5 or thereabouts. When laminated between two panels of 2.3 mm conventional, clear, soda lime glass as shown in FIGS. 35*a* and 35*b*, BUTACITE™ 14 NC-10 clear PVB sheeting transmits less than 0.1% of the incident solar energy in the 250–350 nm region and only about 25% in the 350–400 nm region. Alternatively, BUTACITE™ 140 NC-10, an automotive composition or BUTACITE™ 14 UV clear, an architectural composition PVB sheeting can be used.

Figure 28A:
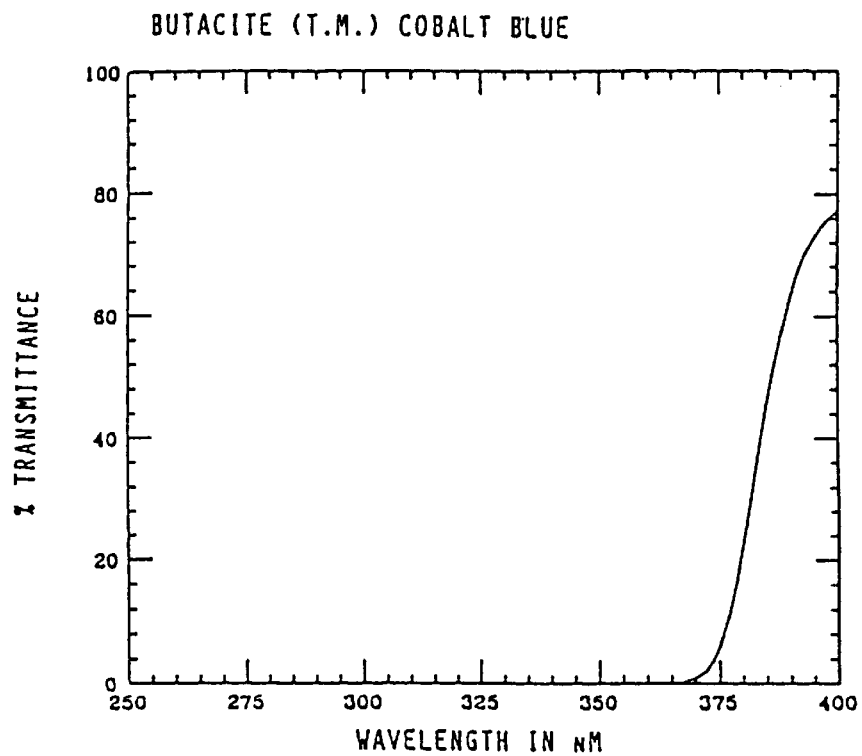
FIGS. 28a and 28b are graphs showing the percent light transmission of BUTACITE™ Cobalt Blue polymeric interlayer sheeting laminated between two clear soda lime glass panels in the ultraviolet and visible regions of the spectrum, respectively.
Figure 28B:
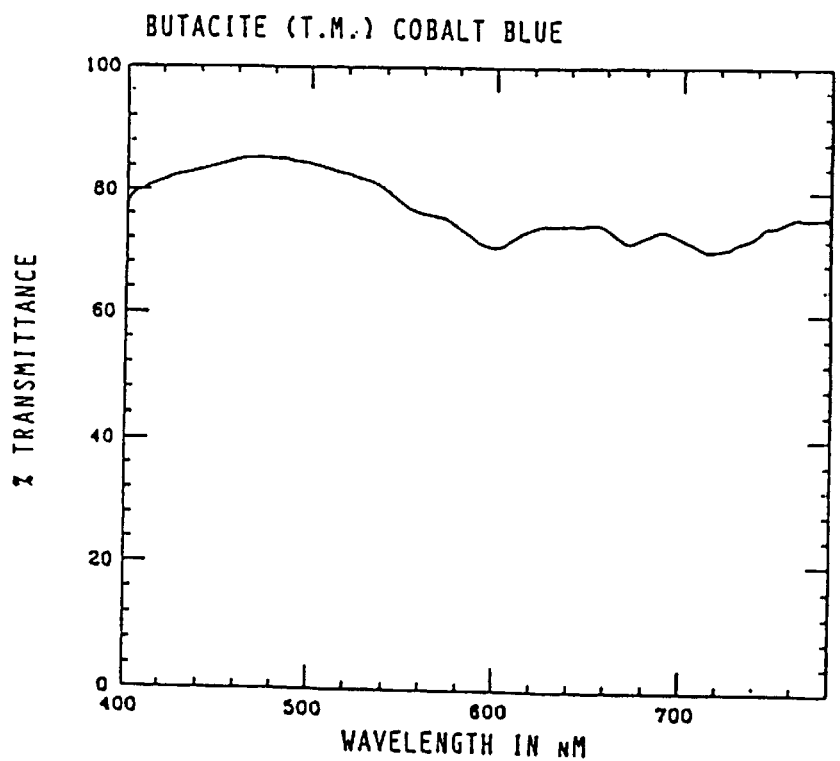

Alternately, a blue or blue/green tinted interlayer 12*c*' may be substituted to form embodiment 85' of the mirror assembly as shown in FIG. 14. Preferably, BUTACITE™ Cobalt Blue 0547800 polymeric interlayer sheeting available from E. I. duPont de Nemours and Company of Wilmington, Del. can be used. The ultraviolet and visible spectral transmission of BUTACITE™ Cobalt Blue sheeting, when laminated between two 2.3 mm standard, clear, soda lime glass panels is shown in FIGS. 28*a* and 28*b*. Such sheeting is a highly light transmitting polymeric material having 78% overall visible light transmission with Illuminant C and a photopic detector (FIG. 28*b*). It is blue in tint and highly absorbing in the UV radiation range below about 375 nm (FIG. 28*a*). It transmits only 0.01% of the incident solar energy in the 250–350 nm region and about 24% of such energy between 350 and 400 nm. By reason of its blue tint, BUTACITE™ Cobalt Blue sheeting also provides the advantage of masking yellowness in the mirror to provide a commercially acceptable silvery or silver-blue reflection from assembly 85', while reducing headlamp glare and also matching existing blue exterior rearview mirrors commonly used in many vehicles.

Figure 29A:
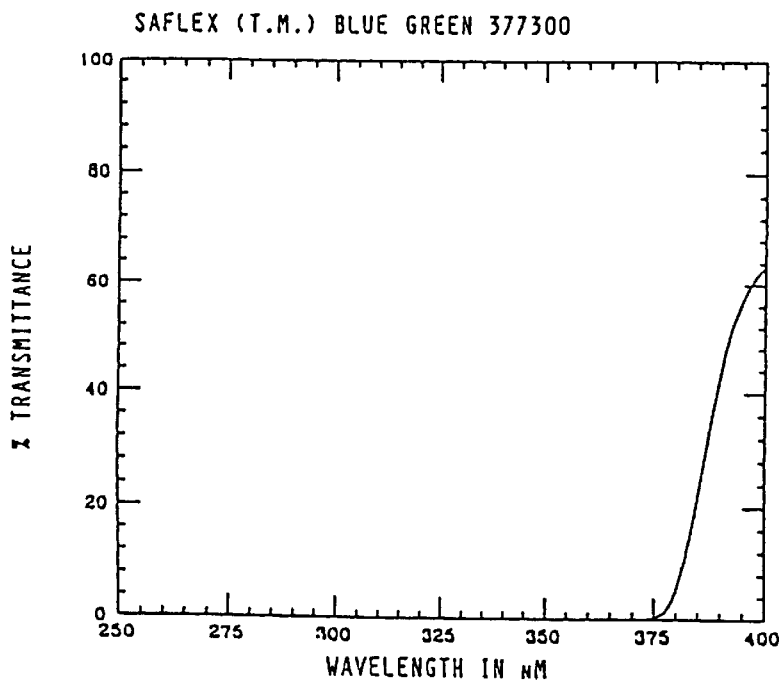
FIGS. 29a and 29b are graphs showing the percent light transmission of a pair of clear soda lime glass panels laminated by SAFLEX™ Blue Green 377300 polyvinylbutyral sheeting in the ultraviolet and visible regions of the spectrum, respectively.
Figure 29B:
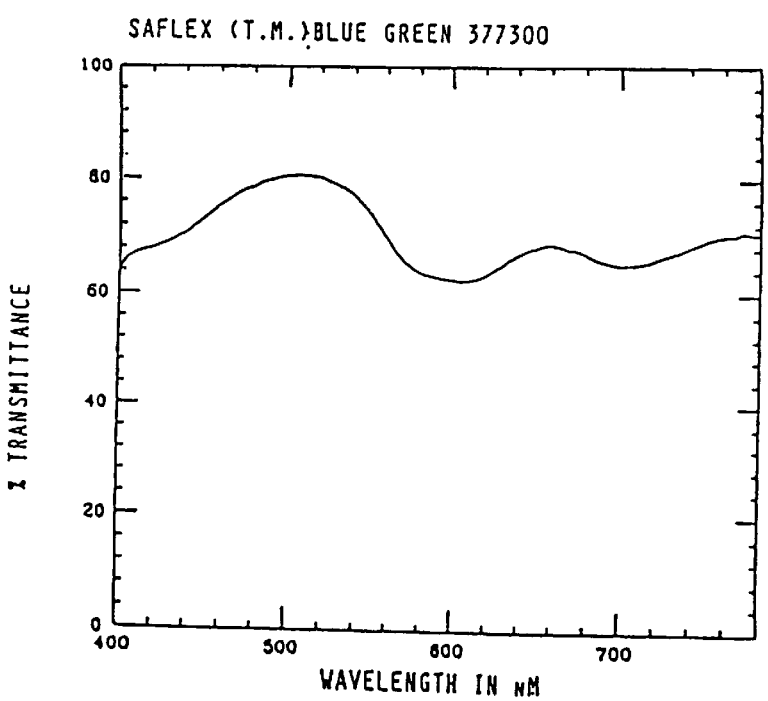

BUTACITE™ Cobalt Blue sheeting could be used alone or in combination with one or both panels 12d, 12e of embodiment 85 being specialized blue or green tinted glass. Other suitable blue tinted polymeric sheeting interlayers include BUTACITE™ Automotive Blue Green 0377800, BUTACITE™ Automotive Green Blue 1107800 and BUTACITE™ Light Blue Green 0377300 also available from E. I. duPont in Wilmington, Del. In addition, SAFLEX™ Blue Green 377300 available from Monsanto Company of St. Louis, Mo. may be used. The ultraviolet and visible spectral transmission of SAFLEX™ Blue Green 377300 sheeting is shown in FIGS. 29a and 29b. Alternately, SAFLEX™ Cool Blue 637600 or SAFLEX™ Solar Blue 755800 polymeric sheeting could also be used.

Figure 15:
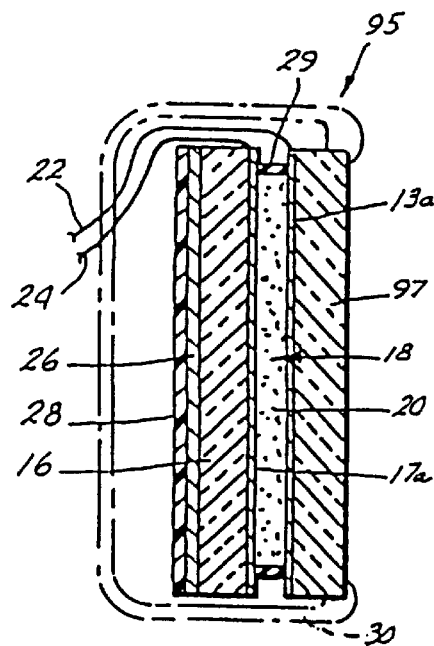
FIG. 15 is a third embodiment of an ultraviolet protected, radiation protected, laminate, electro-optic rearview mirror assembly of the present invention.

With reference to FIG. 15, another embodiment 95 of the electro-optic rearview mirror assembly of the present invention, where like numerals indicate like parts to those described above, incorporates a single glass panel 97 having parallel front and rear surfaces but formed from one of the blue or green tinted specialized glasses described above in connection with embodiments 85 and 85'. Thus, for example, front glass element 97, which also includes a coating of indium tin oxide 13a on its rear or inner surface 13, may be formed from SOLEXTRA 7010™ blue tinted glass, SUNGLAS™ Blue glass, SUNBLUE™ glass or SUNGLAS™ Green glass. When the blue tinted glasses are used, the resultant yellow absorbing light advantages described above in connection with embodiments 85 and 85' result in embodiment 95 as well. These glasses are highly efficient in absorbing or filtering out substantially more light in the yellow/orange/red regions of the visible spectrum than in other regions of the visible spectrum. With reference to the visible spectrum in FIG. 24, such specialized glasses preferentially absorb visible light with wavelengths generally higher than about 560 nm. In other respects, the embodiment 95 remains substantially the same as embodiment 60 of the mirror assembly. Optionally, panel 97 could be a panel of specialized blue or green tinted safety glass that has been tempered and/or toughened by conventional means which include thermal tempering, contact tempering and chemical tempering.

Figure 16:
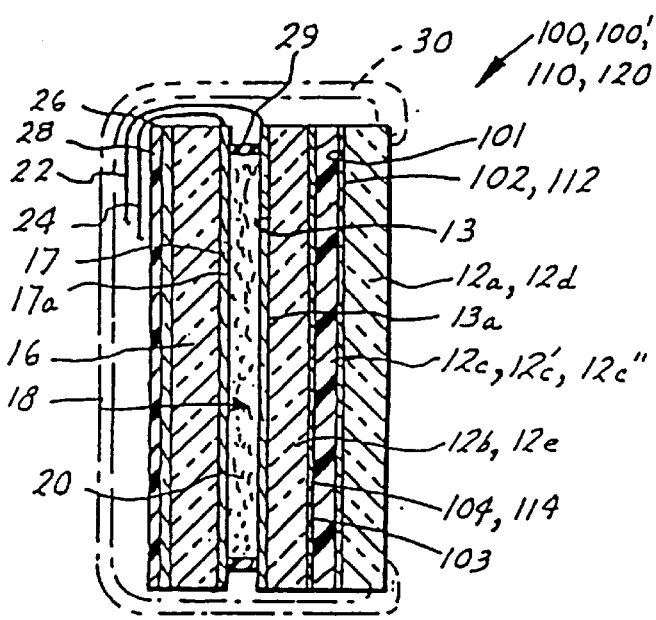
FIG. 16 is a sixth embodiment of the scatter protected, anti-lacerative, ultraviolet radiation protected, laminate, electro-optic rearview mirror assembly of the present invention.
Figure 30:
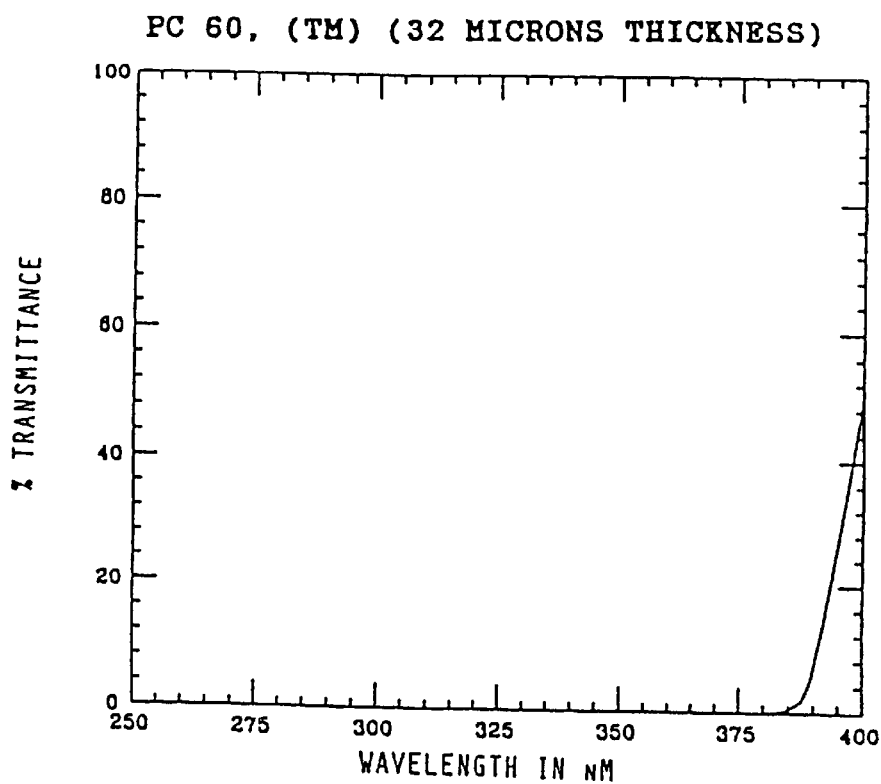
FIG. 30 shows the percent light transmission of conventional clear soda lime glass coated with UV absorbing PC-60 lacquer.

An alternate form 100 of the UV radiation reducing embodiment 65 shown in FIG. 9 is illustrated in FIG. 16. Mirror assembly 100, where like numerals indicate like parts to those described above, includes a UV absorbing paint or lacquer which is transparent to light in the visible spectrum and may be applied as coatings 102, 104 on one or both of the inwardly facing surfaces of glass elements 12a, 12b or 12d, 12e. These are the surfaces of the glass panels which face one another and adhering interlayer 12c. A preferred UV absorbing lacquer is PC-60 from American Liquid Crystal Chemical Corporation of Kent, Ohio which is a solvent based urethane with added UV stabilizers. The ultraviolet spectral transmission of an approximately 32 microns thick coating of PC-60 lacquer when applied to one surface of a 1.6 mm thick single panel of conventional, clear, soda lime glass is illustrated in FIG. 30. When applied as a coating, PC-60 is highly visibly transmitting, i.e., about 89% overall transmission with Illuminant C and a photopic detector, has a slight yellow tint, and absorbs sharply in the UV radiation region below about 390 nm. Between 250 and 350 nm, such a coating of PC-60 lacquer transmits essentially none of the solar energy incident in that region. For incident solar energy between 350 nm and 400 nm, PC-60 lacquer transmits only about 5%. Overall, such a coating of PC-60 lacquer transmits only about 3% of the incoming solar energy in the 250–400 nm region.

Figure 31:
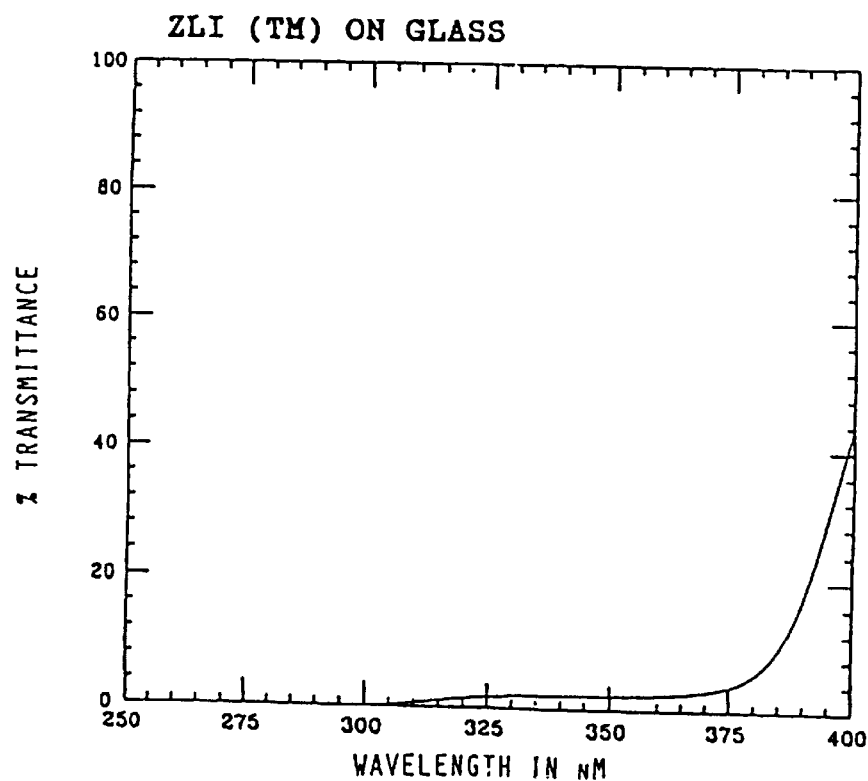
FIG. 31 is a graph showing the percent light transmission of clear soda lime glass having a UV absorbing coating of ZLI-2456 lacquer.

An alternate UV absorbing lacquer is ZLI-2456 mentioned above in layer 70 and useful to form embodiment 100' (FIG. 16). A 12 microns thick coating of ZLI-2456 transmits only about 2% of the incident solar energy in the 250–350 nm region, and only about 9% of the solar energy normally incident between 350 and 400 nm. ZLI-2456 is slightly more yellowish in color and transmission than is PC-60 lacquer. Of course, UV absorbing paint/lacquer coatings such as those described above may be used with UV absorbing/filtering interlayers 12c or 12c' as described above, or when either of glass panels 12a, 12d or 12b, 12e are formed from blue or green tinted specialized glass as described above. Indeed, in a preferred form of embodiment 100, glass panel 12d will be formed from SOLEXTRA 7010™ or SUNGLAS™ Blue glass while the electro-optic media in space 18 will include UV absorbing additives as described above. The ultraviolet spectral transmission of ZLI-2456 is shown in FIG. 31.

As a specific example of mirror assembly 100 shown in FIG. 16, an electrochemichromic solution was formulated consisting of 0.02M methylviologen hexafluorophosphate and 0.02M 5,10-dihydro-5,10-dimethylphenazine dissolved in 2-acetylbutyrolactone. To this was added 12.5% wt/vol CYASORB 24™ UV radiation absorber. This was filled into a 150 micron thick cavity between panels 16, 12b of ITO transparent coated, 1.6 mm thick, conventional, clear, soda lime glass. The ITO coating on each glass panel was 15 ohms/sq and had a visible transmission of 85%. A coating of UV absorbing ZLI-2456 lacquer was spray coated on the front facing surface 103 of rear glass panel 12b and on the rear facing surface 101 of front glass panel 12a each to a thickness of about 11 microns. Glass panels 12a, 12b were then laminated by an interlayer 12c of SAFLEX™ SR#11 PVB sheeting. When tested under mercury UV radiation lamps at a temperature of about 80° C. for a period of approximately two weeks, such a mirror assembly was found to be exceptionally UV radiation stable. Integrated irradiation in the 295–400 nm region within the UV radiation chamber used to accelerate natural weathering was around 100 W/m$^2$. Initially electrochemichromic mirror devices with such UV and anti-scatter protection had a reflection of approximately 81% at zero potential which dimmed to a reflectivity of approximately 8% when one volt potential was applied across ITO coatings 13a, 17a which enclose the electrochemichromic solution. After over 336 hours in the UV radiation chamber, the zero potential reflectivity remained high at around 80% and the mirror continued to dim to about 8% reflectivity when one volt was applied. The appearance of the mirror remained essentially unchanged after such prolonged exposure to high intensity ultraviolet radiation. Also, when the safety performance of the mirror assembly was tested by impacting it with a 0.9 kg steel ball dropped from a height of 1 meter, the SAFLEX™ SR#11 laminating interlayer securely retained all shards of glass such that they did not fly away and such that they remained securely held to the laminate interlayer. Also, the SAFLEX™ SR#11 laminate interlayer did not fracture nor tear and was effective in ensuring that contact with chemicals used within the electrochemichromic mirror assembly is minimized should the mirror glass break in an accident. Because of the high concentration (12.5% wt/vol) of broad UV absorber CYASORB 24™ used in this embodiment, and because of the slight yellow tint inherent to ZLI-2456 UV absorbing lacquer, the reflection from this example of mirror assembly 100 had a somewhat yellow tint which is cosmetically undesirable in some applications. However, when the front glass panel 12a was replaced with a blue tinted glass panel 12d as described in embodiment 85, the benefits described above were achieved. Specifically, when a 2.3 mm panel of SOLEXTRA 7010™ glass was used as front glass panel 12d, reflectance at zero potential remained close to its initial 64% in spite of over 336 hours of UV accelerated weathering testing as mentioned above. Because of the use of blue tinted glass, the reflector looked more silvery-blue and was more consumer acceptable. Also, when dimmed by applying one volt to the transparent coatings 13a, 17a, the mirror continued to dim to its low reflection state of about 7% reflectivity, even after prolonged exposure to the intense UV radiation.

Figure 32:
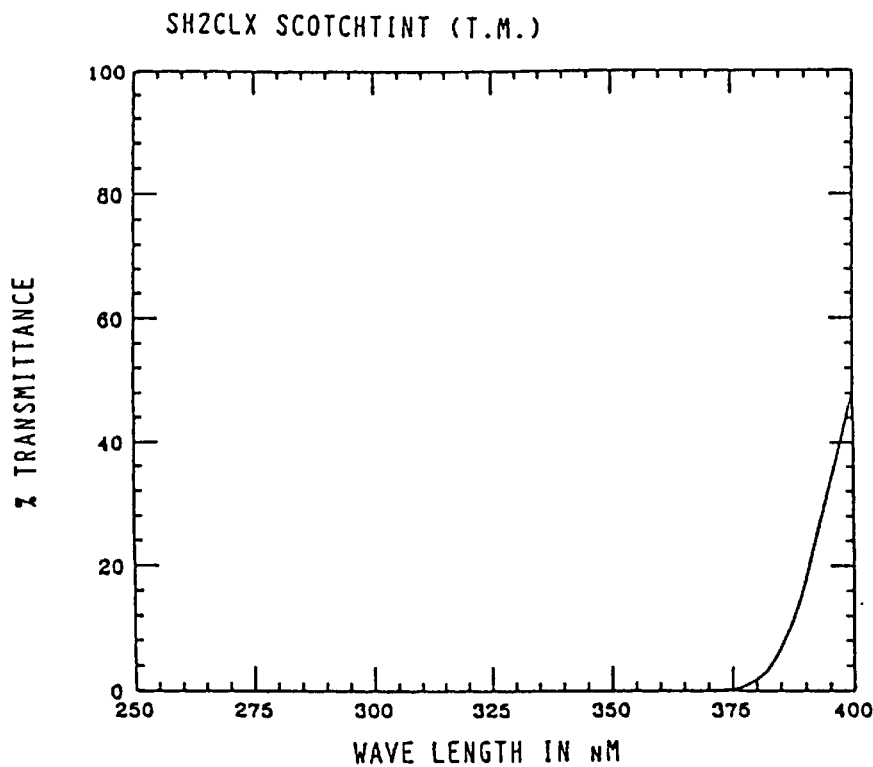
FIG. 32 is a graph showing the percent light transmission of clear soda lime glass coated with a sheet of SCOTCHTINT™ SH2CLX clear polymeric film.

Also with reference to FIG. 16, an alternate embodiment 110 substitutes different layers for paint/lacquer layers 102, 104 preferably in the form of a polymeric film such as clear SCOTCHTINT™ SH2CLX available from 3M Corporation, St. Paul, Minn. Such SCOTCHTINT™ film may be adhered as layers 112, 114 to one or both of the inner facing surfaces of glass panels 12a, 12b or specialized glass panels 12d, 12e as described above, said placement on inner surfaces having the added advantage of protecting the potentially scratchable polymeric film behind glass panels 12a, 12d. Film layers 112, 114 (FIG. 16) provide assembly 110 with similar UV reducing advantages while maintaining strength and scatter preventing advantages due to the laminate front assembly as in embodiments 100 and 100'. The ultraviolet spectral transmission of a single layer film of SCOTCHTINT™ SH2CLX adhered to a sheet of 1.6 mm conventional, clear, soda lime glass is shown in FIG. 32. SCOTCHTINT™ SH2CLX is a highly visibly transmitting film, i.e., about 82% overall transmission using Illuminant C and a photopic detector. It is also clear and absorbs sharply and intensely in the UV region below about 380 nm. Preferably, SCOTCHTINT™ SH2CLX film is used in a form including a pressure sensitive adhesive applied to one surface such that it may be easily adhered to the rear facing surface of glass panel 12a or 12d and the front facing surface of glass panel 12b or 12e. Likewise, such polymeric film adds to the anti-scatter effect of the mirror assembly 110 by retaining shards or splinters from glass panel 12a, 12d should it be broken upon impact. Also, by serving as a barrier film, they are effective in ensuring that contact with the chemicals used within the electro-optical mirror is minimized should the mirror glass break in an accident. Alternately, polymeric film such as SCOTCHTINT™ SH2CLX may be used in combination with clear or tinted UV reducing interlayers 12c or 12c' such as SAFLEX™ as described above.

Figure 33:
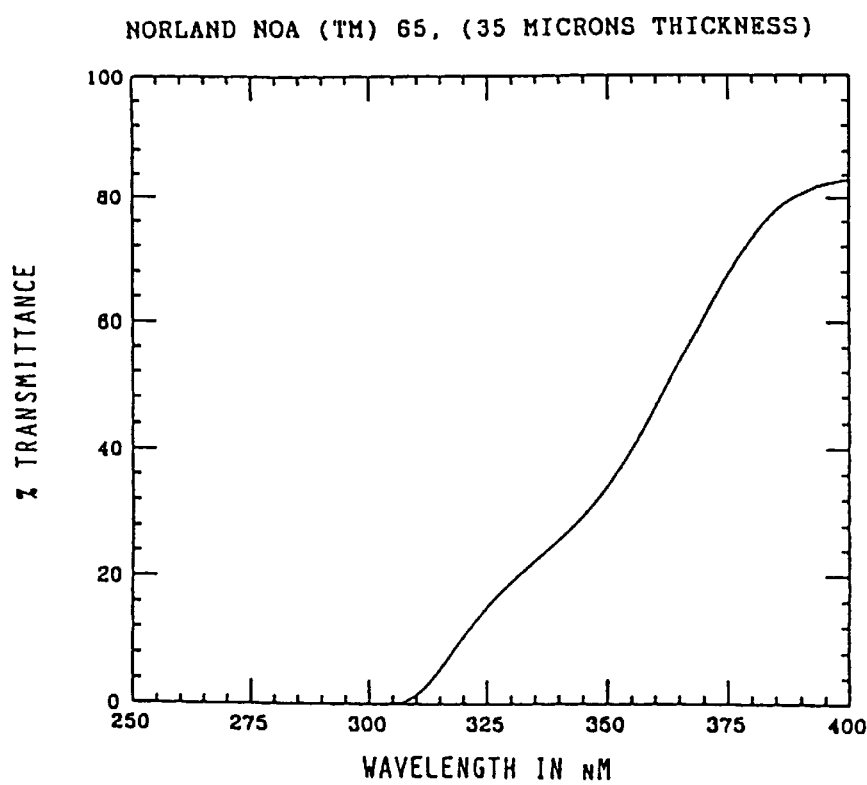
FIG. 33 is a graph showing the percent light transmission of a 35 micron thickness coating of NORLAND NOA 65™ ultraviolet cured epoxy adhesive on clear soda lime glass.

As an alternative to using polymeric sheeting 112, 114 in mirror assembly embodiments 100, 100' or 110 as described above in FIG. 16, a UV curable, pourable adhesive can be used to retain the glass panels 12a, 12b or 12d, 12e together while simultaneously reducing UV transmission as embodiment 120 (FIG. 16). A suitable ultraviolet curing polyurethane adhesive modified so as to be UV curable is NORLAND NOA 65™ available from Norland Products, Inc., New Brunswick, N.J., which is water clear, highly transparent to visible light, includes a moderate modulus of elasticity when cured such that it is not overly brittle and does not fracture upon impact, and includes an index of refraction of 1.52 matched perfectly to that of soda lime glass (which has a refractive index of 1.52). NORLAND NOA 65 also adheres well to glass, is of relatively low viscosity (1,200 centipoise) such that it easily pours and spreads between two plass panels to allow lamination once cured. It also has a relatively low modulus of elasticity (20,000 psi). Its ability to be cured with UV radiation is well-suited to manufacturing processing. FIG. 33 illustrates the ultraviolet spectral transmission of a 35 microns thick coating of cured NORLAND NOA 65™ on a 1.6 mm conventional, clear, soda lime glass panel. Ultraviolet radiation transmission is cut off below about 310 nm while only about 19% of the incident solar energy in the 250–350 nm region is transmitted while about 62% of the incident solar energy in the 350–400 nm region is transmitted.

Alternately, Norland NOA68, also a polyurethane adhesive modified so as to be UV curable and also available from Norland Products, Inc., can be used instead of NORLAND NOA 65. NORLAND NOA 68™ has a refractive index of 1.54 matched closely with clear soda lime glass. It has a modulus of 20,000 psi when cured and has an excellent adhesion to glass. NORLAND NOA 61™, which is a polyurethane adhesive modified so as to be UV curable, can also be used although, with a modulus when cured of 150,000 psi, it is somewhat more brittle. Alternately, DYMAX LIGHT-WELD 478™ acrylic adhesive available from Dymax Corporation, Torrington, Conn. can be used. This is a UV curing acrylic of Shore D hardness 65 that has a refractive index of 1.507 which is very close to that of soda lime glass when cured. Alternately, conventionally known UV curing optical epoxies, preferably of low modulus or with their modulus reduced through addition of reactive diluents and reactive flexibilizers, as is commonly known, can be used.

Should it be desired to further reduce the modulus of elasticity of the cured adhesive, clear plasticizers or clear low molecular weight epoxies can be added to the UV curing adhesives so that they are less brittle after curing, and such that they have even better lamination safety performance. For example, cyclohexanedimethanol diglycidyl ether such as HELOXY MK107™ from Wilmington Chemical Corporation of Wilmington, Del. can also be added to NORLAND NOA 61™, NOA 65™ or NOA 68™ quantities up to 30% wt/wt or more (i.e., % grams of MK107 added to grams of NOA61, etc.) to plasticize them. HELOXY MK107™ has a refractive index close to 1.48 which is also well-matched to that of clear soda lime glass. At high concentration of added MK107, the UV cured NOA61, NOA65 or NOA68 materials are quite flexible and somewhat elastic such that they are well-suited for use as anti-lacerative layers and as laminate interlayers.

Figure 34:
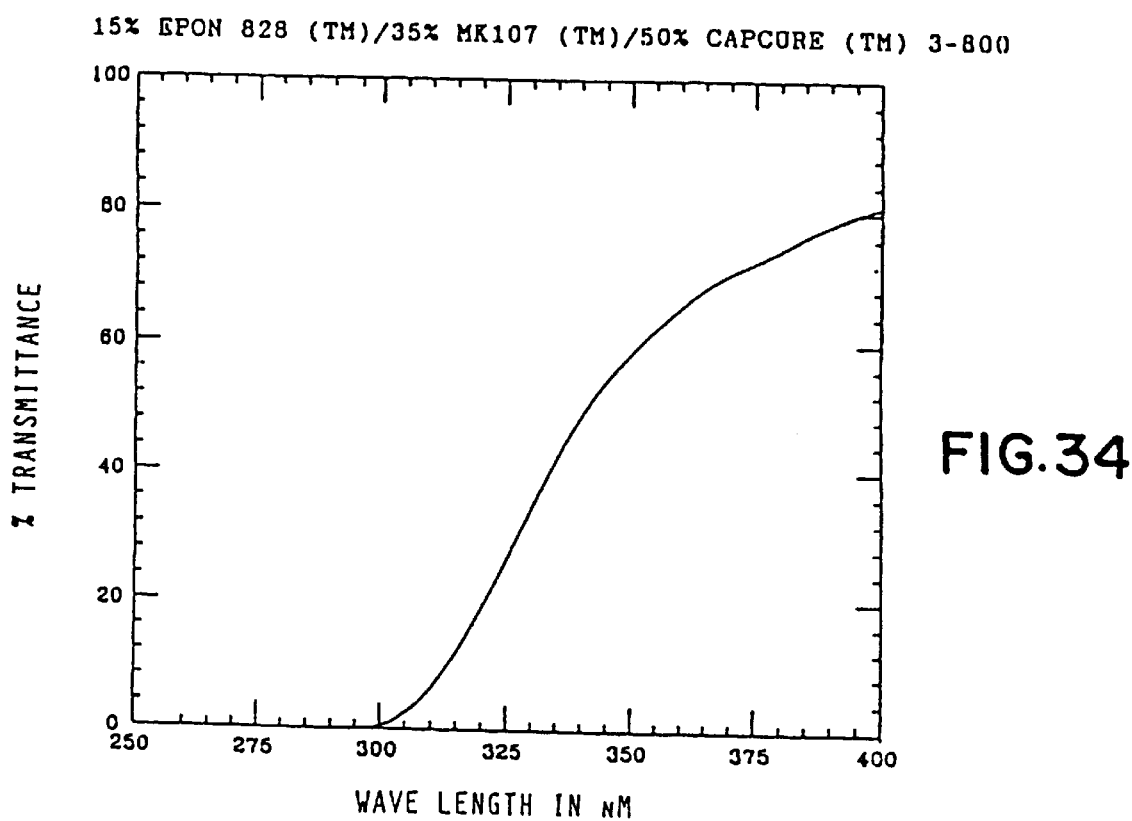
FIG. 34 is a graph showing the percent light transmission of a 500 microns thick coating of a cured mixture of 15% EPON 828™, 35% HELOXY MK107™ and 50% CAPCURE 3-800™ on clear soda lime glass.

As an alternative to the UV curing adhesives described above, thermally or catalytically cured adhesives can also be used to retain glass panels 12a, 12b and 12d, 12e together while simultaneously acting as a UV radiation reducing agent. As with the UV curing adhesives, the thermally or catalytically cured adhesives are preferably water clear, highly transparent to visible light, closely matched to the index of refraction of glass, while being of moderate modulus of elasticity when cured so as not to be overly brittle nor to fracture upon impact and thus impair retention of any glass fragments or shards. A suitable system includes a modified epoxy adhesive formed from 15% wt/wt EPON 828™ epoxy resin, mentioned above in embodiment 10, 35% wt/wt HELOXY MK107™, and 50% wt/wt CAPCURE 3-800™ mercaptan curing agent available from Diamond Shamrock Chemicals Company, Morristown, N.J. These ingredients are mixed together in a container and subsequently spun in a centrifuge at approximately 4,500 rpm for about ten minutes to remove entrained air. The resultant viscous mixture is clear and is applied between panels 12a, 12b or 12d, 12e. The resultant assembly so formed is fired at about 110° C. for about one hour followed by firing at 140° C. for a further hour. Such firing causes the adhesive mixture to cure to an adhering but moderate modulus of elasticity, somewhat flexible, optically clear laminate. The ultraviolet transmission of a 500 microns thick cured coating of this adhesive mixture, coated onto a 0.063 inch conventional, clear, soda lime glass panel is shown in FIG. 34. Such material transmits about 35% of the incident ultraviolet solar energy in the 250–350 nm region thereby providing good inherent UV absorbing properties.

Also, it is possible to enhance the already good inherent UV radiation absorbing properties of these UV, thermally, or catalytically cured adhesives by adding any of the UV absorbing materials such as UVINUL D-50™, UVINUL D-49™, UVINUL 400™, TINUVIN P™, TINUVIN 327™, TINUVIN 328™, or CYASORB 24™ to the liquid adhesives prior to their cure.

The UV, thermally, or catalytically cured adhesives can also be optionally dyed so that they have a slight bluish tint and provide the desirable properties for the electro-optic mirror assemblies including specialized blue tinted glass panels or blue tinted interlayers. For example, taking the specific adhesive mixture of EPON 828™/HELOXY MK107™/CAPCURE 3-800™ described above, such mixture can be dyed blue using NEOZAPON BLUE™ 807, a phthalocyanine dye available from BASF Wyandotte Corporation, Parsippany, N.J., added in about 0.5% to 1% by weight. When laminated between two 0.063 inch thick panels of clear, conventional, soda lime glass, such a dyed mixture, at 0.5% dye concentration, was highly visibly transmitting (78% transmission using Illuminant C and a photopic detector), was tinted blue, and was highly absorbing in the UV region with only 30% transmission of incident solar UV energy in the 250–350 nm region.

In any of the above mirror assembly embodiments, and especially those utilizing one or more panels of clear soda lime glass not already tinted blue or green as in embodiments 85, 85', 100', 110 or 120, a blue, electrochemically inert dye may be added to the electrochromic or electrochemichromic solution itself to provide the advantages of absorbing more light in the yellow/orange/red region of the visible spectrum than in other regions of the visible sepctrum. Such a dyes assembly will provide similar advantages to those including specialized blue tinted glass or blue tinted interlayers. For example, a suitable material such as NEOPEN 808™, a blue dye of the phthalocyanine type, is available from BASF Wyandotte, Parsippany, N.J. Such material dissolved to a concentration of 0.1% wt/vol in propylene carbonate (a common solvent used in electrochemichromic solutions), and when placed in a 1 mm pathlength cell, transmits about 60% of the visible spectrum (Standard Illuminant C and a photopic detector), and transmits only about 9% of the incoming solar UV energy in the 250–350 nm region.

ELECTROCHROMIC VEHICULAR GLAZING

Figure 37:
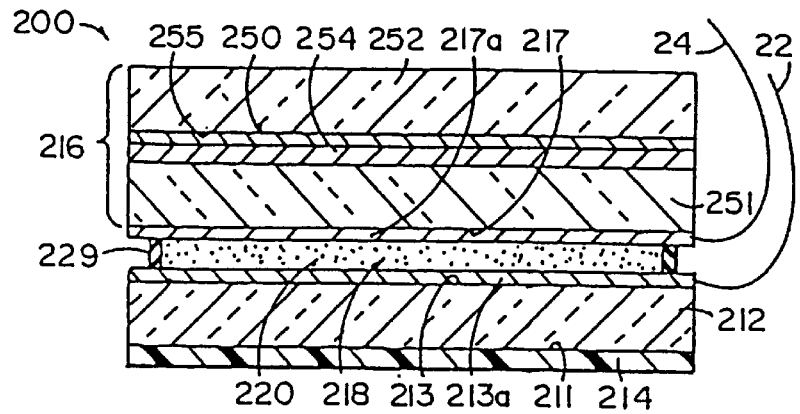
FIG. 37 is a sectional view of a first embodiment of the scatter protected, anti-lacerative, ultraviolet radiation protected, laminate, electrochromic, near-infrared attenuated glazing assembly of the present invention.

Referring now to the window or glazing assembly embodiment of the present invention, FIG. 37 illustrates a laminate, electrochromic window/glazing assembly 200 having a first optically transparent element 212 which is scatter and anti-lacerative protected with a resinous, polymeric or other coated or applied layer 214 on its inner surface 211. Layer 214 is preferably formed from tear-resistant, resilient material such as plasticized polyvinylbutyral (PVB) sheeting having a preferred thickness of from about 0.005 inches to about 0.060 inches. Element 212 is preferably formed from a sheet of conventional soda lime window glass having a preferred thickness of from about 0.02 to about 0.25 inches as is second element 216, which is spaced slightly outwardly from first element 212 to define a gap or space 218 for receiving an electrochromic medium 220. Also, element 216 is generally located closest to the outside of the vehicle and, as such, is located closest to the solar source of UV radiation. Generally, elements 212 and 216 are of compound, matched curvature. As explained hereinafter, elements 212, 216 may also be optically clear resinous, polymeric sheets to further prevent fragment scattering and lacerative injuries if broken, to further reduce UV transmission, and to reduce weight. Layer 214 also provides ultraviolet protection for the interior cabin of the vehicle and protects against contact with whatever chemicals are used in electrochromic medium 220 if element 212 should crack or break.

Space 218 is formed between the generally parallel or tangentially parallel outer surface 213 of first glass element 212 and inner facing surface 217 of second glass element 216. Preferably, each of the inner and outer surfaces 213, 217 is coated with a layer of indium tin oxide (ITO) which is substantially transparent to incident visible light yet is sufficiently electrically conductive to enable application of an electric field or voltage across space 218 between ITO layers 213a, 217a. Layers 213a and 217a also can be other transparent conductors such as doped tin oxide, doped zinc oxide, and the like. Electrical energy is provided by wire leads 22, 24 secured in conventional manner to the peripheral portions of ITO coatings 213a, 217a as shown in FIG. 37.

In order to confine and retain the electrochromic medium in gap 218, a peripheral seal 229, formed from an epoxy material which adheres well to the ITO coatings 213a, 217a on glass surfaces 213, 217 is applied adjacent the periphery of glass elements 212, 216. A suitable epoxy sealing material is EPON 828™ epoxy sealant from Shell Chemical Company of Houston, Tex. cured by polyamide based curing agents such as V-40™ curing agent from Miller Stephenson Company of Danbury, Conn. the epoxy is preferably silk screened onto the inner surface of the first glass element 212 or the second glass element 216 or onto both glass elements. The corresponding glass element is then placed face to face with the still tacky epoxy. Seal 229 is then fully cured, typically by placing the assembly into an oven at 110° C. for three hous. Gap 218 can then be filled by a variety of means such as simple injection of electrochromically active material using a syringe. The various electrochromic media proposed for use with the electro-optic mirror are also suitable for use as the electrochromic medium 220. In addition, the electrochromic medium 220 can be one of the types described in the SAE Paper #900419, the reference to which is incorporated herein.

FIG. 37 depicts an embodiment of the present invention where element 216 is a laminated composite formed from a pair of glass panels 251, 252 like element 212. A specialized near-infrared reflector 250 can be directly deposited onto the inwardly facing surface 255 of panel 252. In this arrangement, element 252 protects reflector 250 from the outside environment and from abrasive damage as in car washes and the like. Reflector 250 (shown enlarged in FIG. 38) preferably incorporates at least one semi-transparent elemental metal thin film 256 of physical thickness in the range of between about 80 angstroms to 300 angstroms and of sheet electrical resistance of no greater than about 8 ohms/square. Elemental thin metal film 256 is preferentially sandwiched between optically transparent thin metal compound films 258a, 258b. Thin metal compound films 258a, 258b may be metal oxide, nitride, halide or sulfide thin films.

Figure 39:
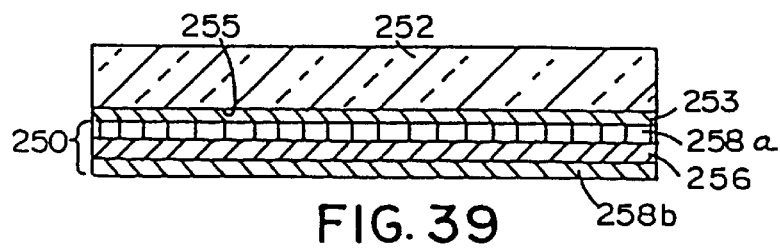
FIG. 39 is an enlarged sectional view of the near-infrared reflector of the present invention applied to a surface of a glass element.

Among the possible thin metal compound films are the following: zinc oxide, titanium oxide, vanadium oxide, zirconium oxide, tungsten oxide, indium oxide, bismuth oxide, magnesium fluoride, cerium oxide, indium/tin oxide, tin oxide, zinc sulfide, silicon oxide and silicon nitride. As shown in FIG. 39, in an alternative embodiment, near infrared reflector 250 can be deposited onto a polymer sheet or film 253, which polymer sheet or film itself is capable of providing UV protection and shatter protection.

Layer 254 in FIG. 37 is an adhesive substance for bonding panels 251 and 252 together. Layer 254 may preferably be a specialized tear-resistant, resilient interlayer of thickness 5 mils or greater such as BUTACITE™ 14 NC-10 plasticized PVB sheeting from E. I. duPont de Nemours and Company of Wilmington, Del. which imparts UV protection to electrochromic medium 220 and imparts scatter protection directly to element 216, and indirectly to element 212. Layer 254 can act to contain the electrochromically active material contained in gap 218 should outer panel 252 and panel 251 shatter under impact. Also, should tinting be desired, then tinted plasticized polyvinylbutyral sheeting such as SAFLEX OPTICOLOR SYSTEM™ interlayers from Monsanto Company of St. Louis, Mo. can be used. Preferably, such tinting causes the assembly to appear blue or green in transmission. This preserves the natural color of the sky, spectrally filters yellow light and, thus, protects from solar glare, thereby enabling use of high concentrations of UV stabilizers and reducing UV transmission through the assembly as a whole and into the electrochromic medium in particular while simultaneously and synergistically providing safety protection against contact with broken glass and the chemicals used in the electrochromic medium.

Figure 40:
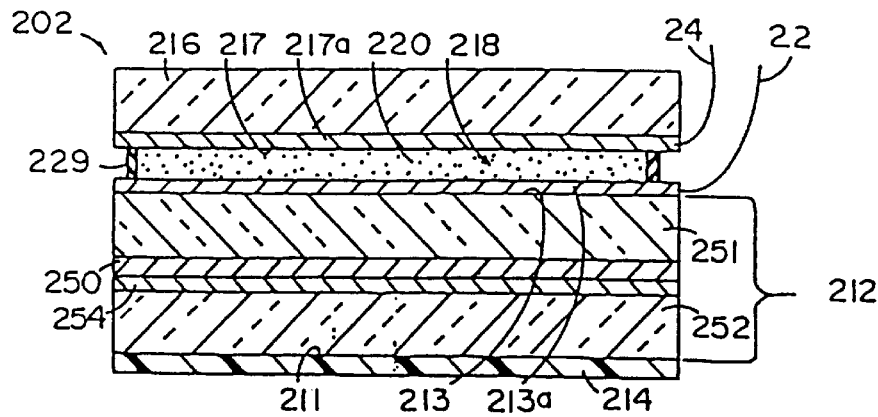
FIG. 40 is a sectional view of a second embodiment of the scatter protected, anti-lacerative, ultraviolet radiation protected, laminate, electrochromic, near-infrared attenuated glazing assembly of the present invention.

A second embodiment 202 of the window glazing assembly invention is shown in FIG. 40 where element 212 is the laminated composite formed from glass panels 251, 252. The specialized near-infrared reflector layer 250 is sandwiched between elements 251 and 252 on the inwardly facing surface of element 251. Thus, relative to the vehicle outside, layer 250 is below the electrochromic medium 220. Such a construction is less desirable than that shown in FIG. 37 because layer 250 is not in a position to protect electrochromic medium 220 from the damaging effects of solar near-infrared and ultraviolet radiation.

Figure 36:
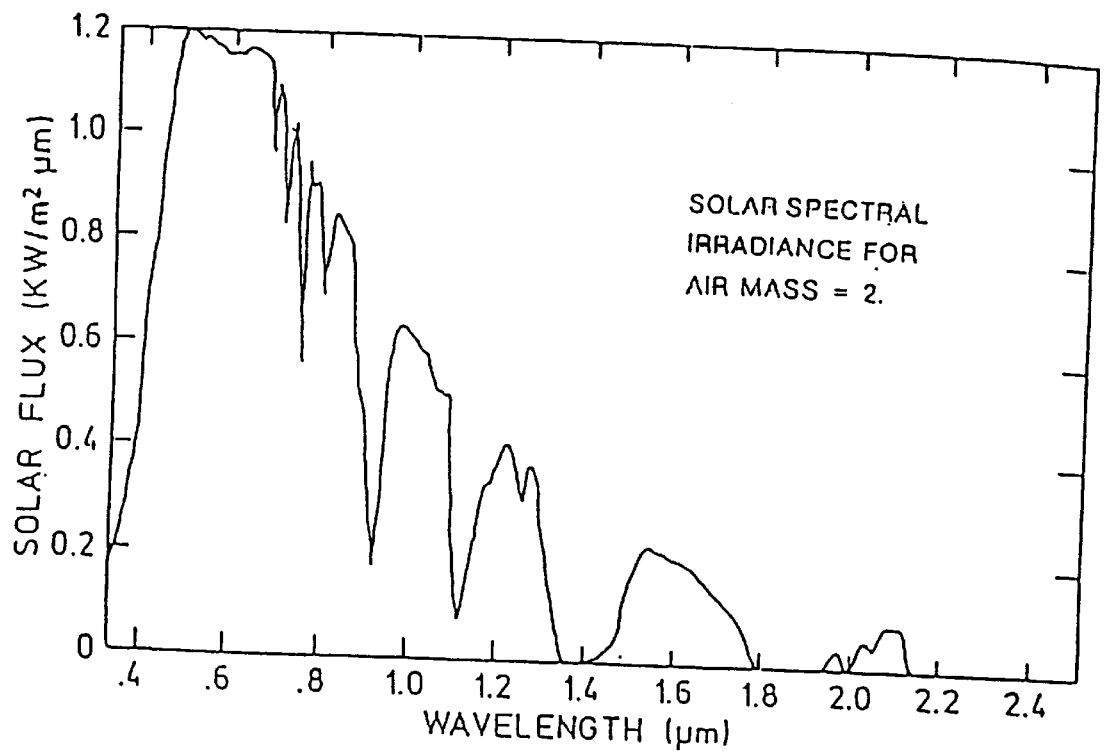
FIG. 36 is a graph which illustrates the solar energy spectrum (for Air Mass 2) constituting the solar load incident on an automobile.

FIG. 36 shows the solar energy spectrum Air Mass 2 that constitutes the solar load incident on an automobile. The solar energy for Air Mass 2 is the insolation through two standard atmospheres using data originally proposed by P. Moon, *Journal Franklin Inst.*, 230, 583 (1940). Most of the solar intensity for Air Mass 2 is between 300 and 2100 nm. On the average, ultraviolet (UV) constitutes 3% of solar radiation (up to 400 nm), while visible light or radiation is 48% (between 400 and 700 nm) and near-infrared (NIR) is 49% (between 700 and 2100). If a perfect filter could be designed to reject all solar NIR radiation, nearly half of the solar energy could be rejected without any loss of visibility.

As a specific illustration of the benefit achievable through use of a specialized near infrared reflector in combination with an electrochromic medium, UV, luminous and solar transmission studies were performed on both an electrochromic cell alone and on the combination of commercially available heat mirror constructions with the same electrochromic cell. The cell was formed by sandwiching an electrochromic solution comprising;

| | |
|---|---|
| 0.035 M | ethylviologen perchlorate |
| 0.035 M | 5,10-dihydro-5,10-dimethylphenazine |
| 5% wt/vol | UVINUL ™ 400 (2,4-dihydroxy-benzophenone) | dissolved in a solvent comprising 75% 3-hydroxypropionitrile and 25% glutaronitrile. The cell gap was 135 microns. The ITO transparent conductors sandwiching the electrochemichromic medium were of half-wave (about 1500 angstroms) thickness and of sheet resistance 15 ohms/square or thereabouts coated onto 0.043" thick soda lime glass elements. Measurements were taken over four spectral ranges, namely, ultraviolet (UV), visible, near-infrared (NIR), and solar (Air Mass 2), of the attenuating characteristics of this electrochromic cell construction, both when the cell was bleached and when it was colored under 1 volt applied potential. The results are summarized in Table A.

TABLE A

Conventional Electrochemichromic Window

Half-Wave ITO Electrodes

| | UV<br>300–400 nm<br>% T/% R | VISIBLE<br>400–800 nm<br>% T/% R | NEAR-IR<br>800–2500 nm<br>% T/% R | SOLAR<br>300–2500 nm<br>% T/% R |
|---|---|---|---|---|
| Bleached | 9%/5.5% | 77%/10% | 47%/17% | 63%/13% |
| Colored<br>(1.0 volt) | 0.01%/5.3% | 14%/6% | 37%/16% | 23%/10% |

% T = Percent Transmission
% R = Percent Reflected

As can be seen from the data, this electrochemichromic window transmits about 63% of incident solar radiation when bleached and about 23% of incident solar radiation when fully colored under 1.0 volt applied potential.

Figure 38:
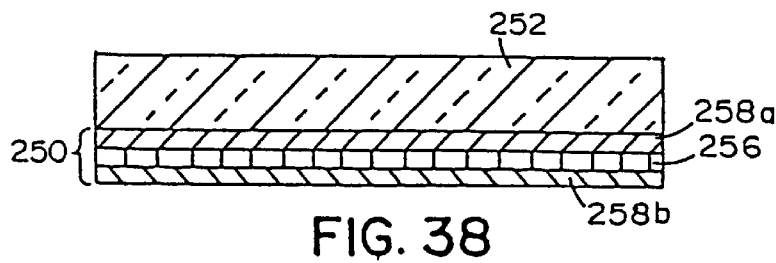
FIG. 38 is a sectional view of a preferred thin film stack typically applied to a glass surface of one of the glass elements of the present invention to form a specialized near-infrared reflector.

Table B summarizes the results of similar measurements obtained when the electrochemichromic window cell of Table A was combined with a heat mirror glass commercially available from Cardinal Glass Inc. of Spring Green, Wis. in a manner similar to that shown in FIGS. 37 and 38, but without any anti-lacerative layer 214.

TABLE B

Electrochemichromic Window Combined with Cardinal Heat Mirror

Half-Wave ITO Electrodes

| | UV<br>300–400 nm<br>% T/% R | VISIBLE<br>400–800 nm<br>% T/% R | NEAR-IR<br>800–2500 nm<br>% T/% R | SOLAR<br>300–2500 nm<br>% T/% R |
|---|---|---|---|---|
| Bleached | 7%/13% | 64%/14% | 24%/46% | 46%/27% |
| Colored<br>(1.0 volt) | 0.1%/13% | 12%/11% | 18%/46% | 14%/25% |

The Cardinal Heat Mirror (see FIG. 38) comprises a thin silver film 256 of thickness less than 300 angstroms incorporated in a multilayer thin film stack which includes a sandwich of zinc oxide thin film layers 258a, 258b on glass panel 252. More, from Table B, that combination of the Cardinal Heat Mirror with the electrochemichromic window allows preservation of a relatively high luminous visible transmission of 64% (of benefit for automotive glazing such as front, side, or rear windows where preservation of high transmittance in the bleached state may be of safety importance) while simultaneously significantly further reducing the total solar load transmitted into the automobile interior.

In the bleached state, use of the Cardinal Heat Mirror achieves a reduction in solar transmittance from 63% to 46% and, in the colored state, from 23% down to 14%. Similar benefits can be obtained by combining alternate thin film stacks to that utilized in the Cardinal Heat Mirror with the electrochemichromic window. However, it is important that the elemental metal layer 256 used therein has a high carrier density and high charge mobility so that its plasma edge rises early in the near-IR region thereby reflecting the maximum near-IR solar radiation. Sheet electrical resistance is preferably below about 8 ohms/square or thereabouts. Optionally, and given that metal layer 256 is not contacting the electrochromic medium and, as such, is electrically isolated therefrom, electric current can be passed across metal layer 256 via wires or other electrical connections secured to layer 256 from the automobile electrical system for the purpose of heating and defrosting the glazing assembly when so desired during winter months and the like. The thin elemental metal layer 256 preferably has a physical thickness between about 80 angstroms and 300 angstroms. Below 80 angstroms, the deposited coating is insufficiently continuous to yield good electrical conductivity and to achieve good near-IR reflectivity. Above 300 angstroms, the deposited thin elemental metal is overly opaque and overly luminous reflecting to be desirable for high transmittance applications, even when antireflected in a multilayer optical stack. These effects are illustrated in FIGS. 36A and 36B.

Figure 36A:
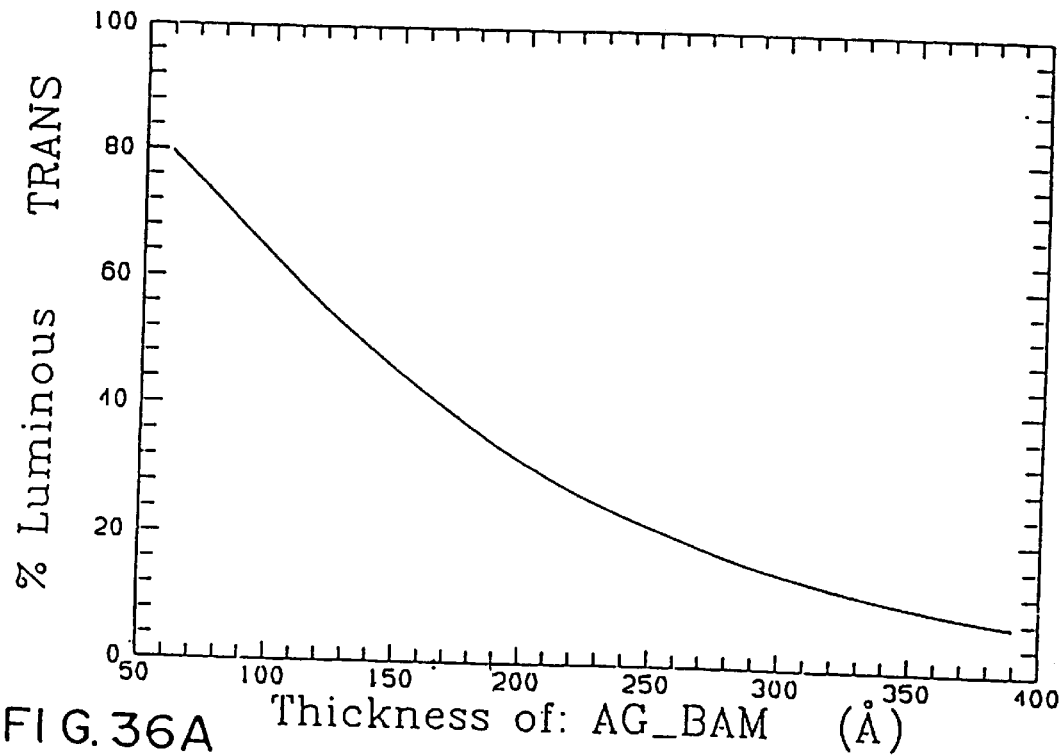
FIG. 36a is a graph which illustrates the variance of percent luminous transmission caused by varying the thickness of a silver elemental thin film deposited onto a soda lime glass substrate.
Figure 36B:
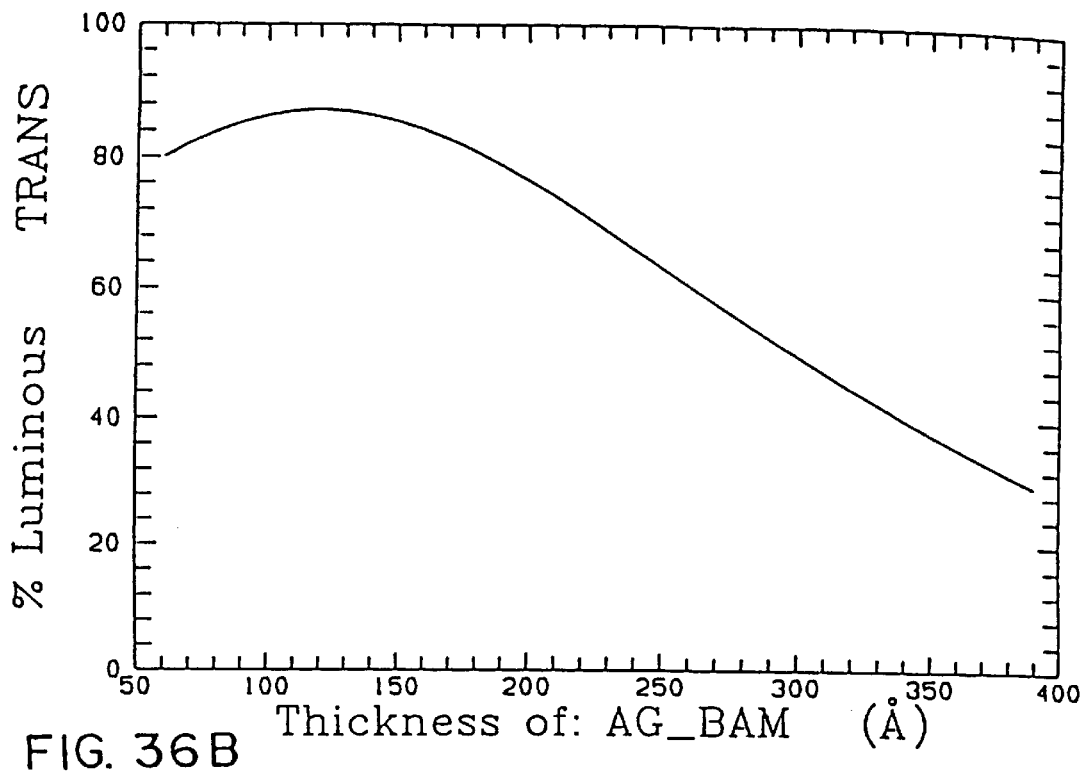
FIG. 36b is a graph which illustrates that the thickness of a silver elemental thin film can be increased to 300 angstroms while sustaining the percent luminous transmission above 50.

FIG. 36A shows the % luminous transmission (with the source being Standard Illuminant A) as the thickness of a silver elemental metal film, deposited onto a soda lime glass substrate, increases in thickness from about 60 angstroms to about 400 angstroms. Note that % luminous transmission falls off rapidly and dramatically with increasing thickness of the silver film. However, when a construction such as is shown in FIG. 38 or 39 is used with layer 258a being 180 angstroms thick film of titanium dioxide (refractive index 2.5), and layer 258b also being a 180 angstroms thick film of titanium dioxide (refractive index 2.5), and with these layers sandwiching a layer 256 of elemental silver, then, and as shown in FIG. 36B, the thickness of the silver layer can be increased to 300 angstroms, or thereabouts, while sustaining % luminous transmission above 50%.

For many automotive glazing constructions, and especially for those involving compound curvature, it is desirable that the specialized near-infrared reflector be deposited onto a flexible element like layer 253 in FIG. 39 such as MYLAR™ polyester film available from E. I. duPont of Wilmington, Del. Such polyester film is typically supplied in film thicknesses ranging from 0.001 to 0.050 inches or thereabouts. There are several advantages to use of a flexible polymer element for heat mirror coating. Being flexible and polymeric, it can be readily conformed under modest temperature and pressure, thus facilitating constructions where the rigid elements 212, 216, 251, 252, and the like are of compound curvature such as commonly found for automotive glazing. Also, the flexible polymer film can form a barrier affording protection against chemical leakage should the typically glass elements it contacts break or crack.

Such heat mirror coated flexible polymer film like 253 can be economically supplied coated on both surfaces with a conventional pressure-sensitive adhesive so that when sandwiched between glass as in the constructions contemplated in this invention, the flexible polymer film itself can afford a degree of safety protection to occupants in an accident. In addition, the polymer film itself can be a host for UV absorbers and so can supplement other UV attenuating means present in the construction as mentioned above regarding rearview mirrors (such as UV absorbers in solution in the electrochromic medium, such as glasses of increased iron oxide and/or cerium oxide content, use of a specialized UV absorbing glass for elements 212, 216, 251, 252, etc.). Further, the polymer film may be tinted to facilitate construction of tinted electrochromic windows.

An example of a near-infrared reflector forming a heat mirror which is deposited upon a flexible polymer film and is suitable to combine with an electrochromic window to achieve the objectives of this invention is HM-55 film from Southwall Corporation of Palo Alto, Calif. HM-55 includes a thin film coating of silver sandwiched between indium oxide thin film layers, all in turn deposited onto a thin MYLAR™ flexible polymer film. Table C summarizes the results obtained when the electrochemichromic window cell of Table A was combined with a HM-55 heat mirror film by application to the outer glass surface.

TABLE C

Electrochemichromic Window Combined with HM-55 Heat Mirror

| | Half-Wave ITO Electrodes | | | |
|---|---|---|---|---|
| | UV 300–400 nm % T/% R | VISIBLE 400–800 nm % T/% R | NEAR-IR 800–2500 nm % T/% R | SOLAR 300–2500 nm % T/% R |
| Bleached | 3.8%/43% | 37%/46% | 23%/77% | 25%/58% |
| Colored (1.0 volt) | 0%/43% | 6%/44% | 18%/77% | 6%/58% |

As indicated, the HM-55 film is relatively attenuating in the visible region so that this combination is best suited for applications such as an automotive sunroof where high bleached state transmittance is not necessary but where it is highly desirable to be darkly attenuating in the colored state and where exceptional solar performance in both the bleached and the colored states is desired. As Table C indicates, solar transmittance in the bleached state is only 25% and this decreases to a mere 6% when the electrochemichromic window is dimmed under 1.0 volt applied potential. Thus, the use of a thin elemental metal layer in combination with an electrochromic window (which itself is relatively solar transmitting in both the bleached and colored state) achieves exceptional solar performance for the combination. Note also that the UV transmission in the bleached state using HM-55 film is substantially reduced over that achieved with previously described designs, such UV reduction being beneficial in avoiding degradation of interior trim such as seats, carpets, etc. Note also the low near-infrared solar transmittance through this assembly. Such low UV and near-IR transmittance, even in the bleached state, can have an important safety implication. The human eye is not sensitive to radiation in the UV and near-IR spectral region. Thus, it is important that UV and near-IR transmission be minimized to avoid eye damage, and particularly retinal damage, for consumers viewing the sky and the sun through the electrochromic window assembly.

As an alternative to HM-55, HM-77, HM-66, HM-44, and HM-33 heat mirror coatings on polyester film, all available commercially from Southwall Corporation of Palo Alto, Calif., can be used. HM-77 and HM-66 are low reflectance heat mirrors most suited to automotive glazing applications like front, side, and rear windows where high luminous transparency is of benefit. HM-44 and HM-33 are low transmittance heat mirrors most suited to automotive glazing applications such as sunroofs where high transparency is not a requirement. Also, all such heat mirror multilayer stacks could be deposited onto tinted polyester film to facilitate production of tinted electrochromic window assemblies. Alternatively, the heat mirror polyester films could be combined with tinted glass such as GRAYLITE™, a dark gray tinted glass available from PPG Industries Inc., Pittsburg, Pa.

Alternatively, the specialized near-infrared reflectors described above could be combined with specialized UV-absorbing glasses such as AZURLITE™, a light aqua (blue-green) tinted glass available from Pittsburg Plate Glass Industries, Pittsburg, Pa., LOF EZ-KOOL™ glass which is a green tinted glass of increased cerium oxide and iron oxide content, available from Libbey Owens Ford of Toledo, Ohio, or with equivalent specialized UV-absorbing glasses as described above in connection with the electrochromic mirrors. Such specialized UV-absorbing glasses have a higher iron oxide content of within the range of about 0.2% to 0.9% by weight and/or a higher cerium oxide content of 0.2% to 0.9% by weight. Even higher iron oxide and/or cerium oxide contents, such as 1% to 2% or more, can be contemplated, for applications such as sunroofs, etc., where the dark tinting that accompanies such high levels of iron oxide and/or cerium oxide may not be product objectionable. For specialized UV absorbing glasses that have a high iron oxide content, it is desirable to maximize UV absorption by maximizing the ferric (FE III) ion content of the glass. Alternately, a specialized UV absorbing glass of titanium dioxide content greater than 0.2 weight percent or thereabouts can be used.

The exceptionally high near-IR reflectances, and consequent beneficial climate control when combined with an electrochromic window, attained by specialized near-infrared reflectors is not achieved by standard low-E coatings such as semiconducting oxides which are used in architectural climate control. This is illustrated in Table D and in the plots on the graph of FIG. 41 which contrast the performance achieved using a multilayer stacks, such as the Cardinal Heat Mirror and the HM-55 film described above and incorporating an elemental metal thin film to the performance attained with a low-E coating such as half-wave (1500 angstroms) and full-wave (3000 angstroms) ITO

TABLE D

| | UV 300–400 nm % T/% R | VISIBLE 400–800 nm % T/% R | NEAR-IR 800–2500 nm % T/% R | SOLAR 300–2500 nm % T/% R |
| --- | --- | --- | --- | --- |
| Half-Wave ITO | 78%/13% | 85%/10% | 64%/17% | 77%/13% |
| Full-Wave ITO | 74%/16% | 83%/12% | 71%/17% | 72%/14% |
| Cardinal Heat Mirror | 53%/11% | 83%/7% | 42%/45% | 65%/23% |
| HM-55 | 36%/44% | 52%/40% | 14%/81% | 36%/57% |

Figure 41:
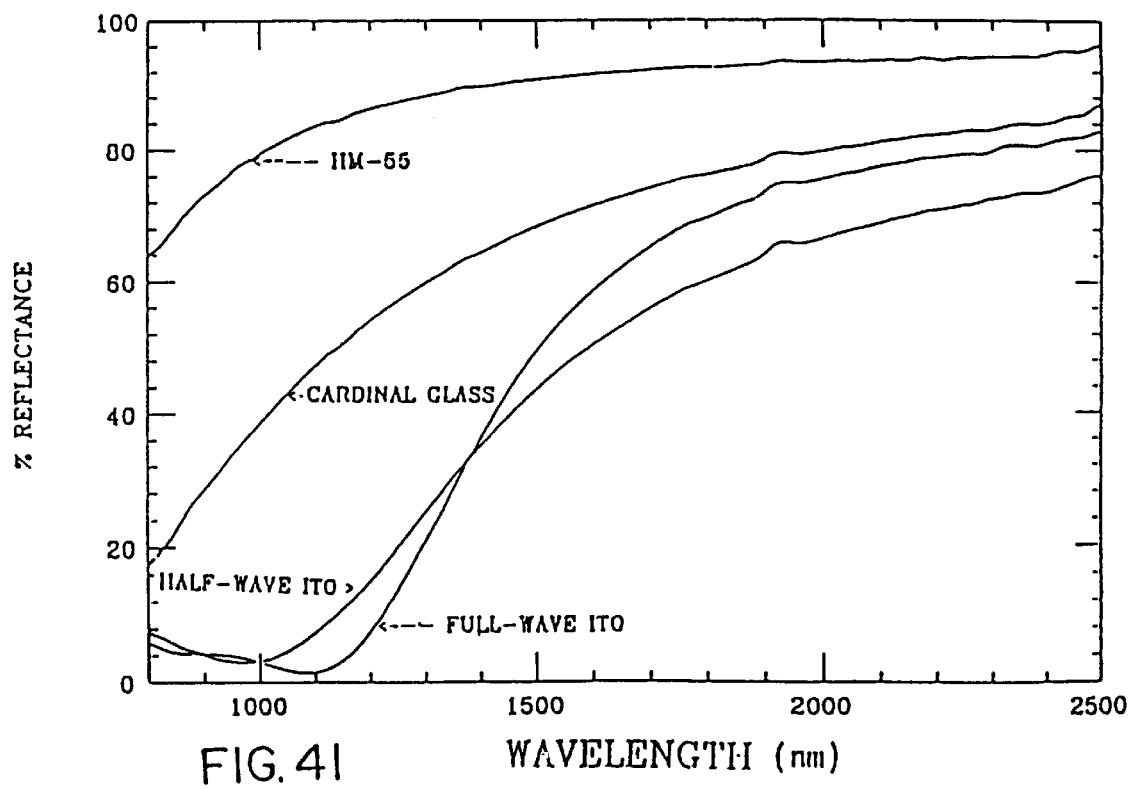
FIG. 41 is a graph which compares the near-infrared reflectance performance in the 800–2500 nm electromagnetic radiation region of the spectrum for a half-wave coating of ITO on glass, a full-wave coating of ITO on glass, and two different, commercially available heat mirror structures on glass.
Figure 41A:
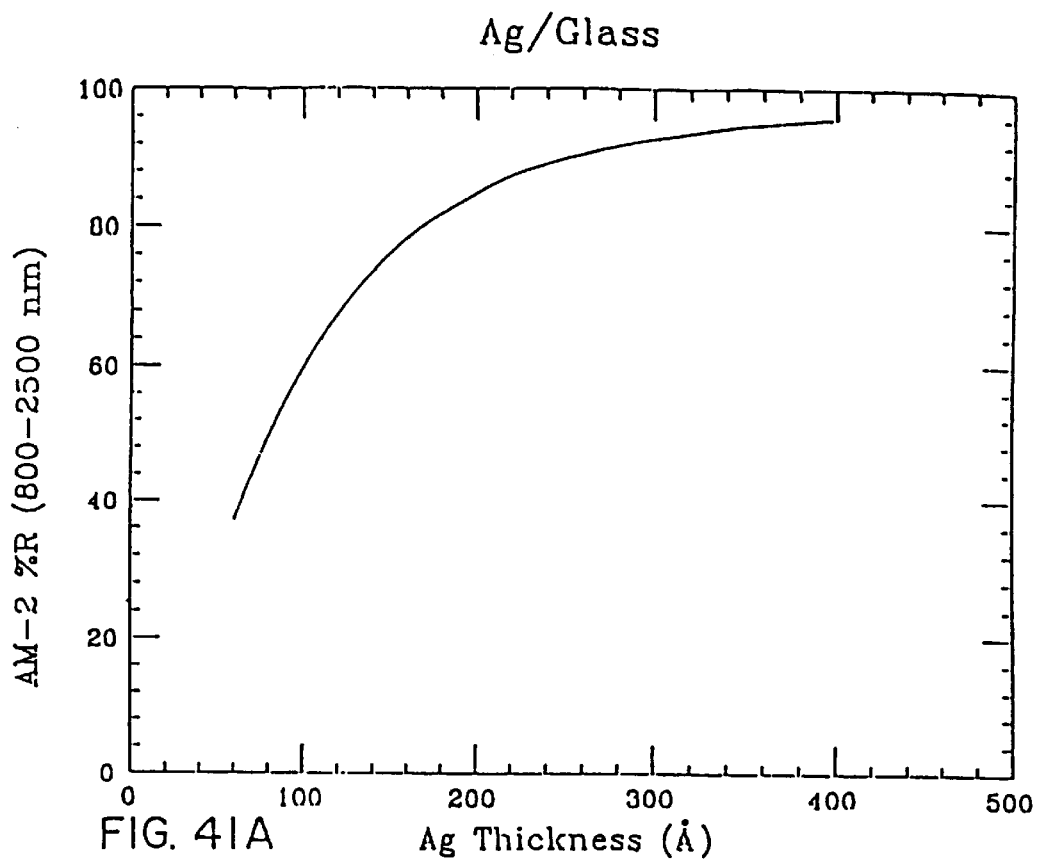
FIG. 41A is a graph of the percent reflectance of near-infrared solar energy for Air Mass 2 in the 800 to 2500 nanometer spectral range for silver thin elemental films of thickness between about 60 and 400 angstroms on glass.
Figure 41B:
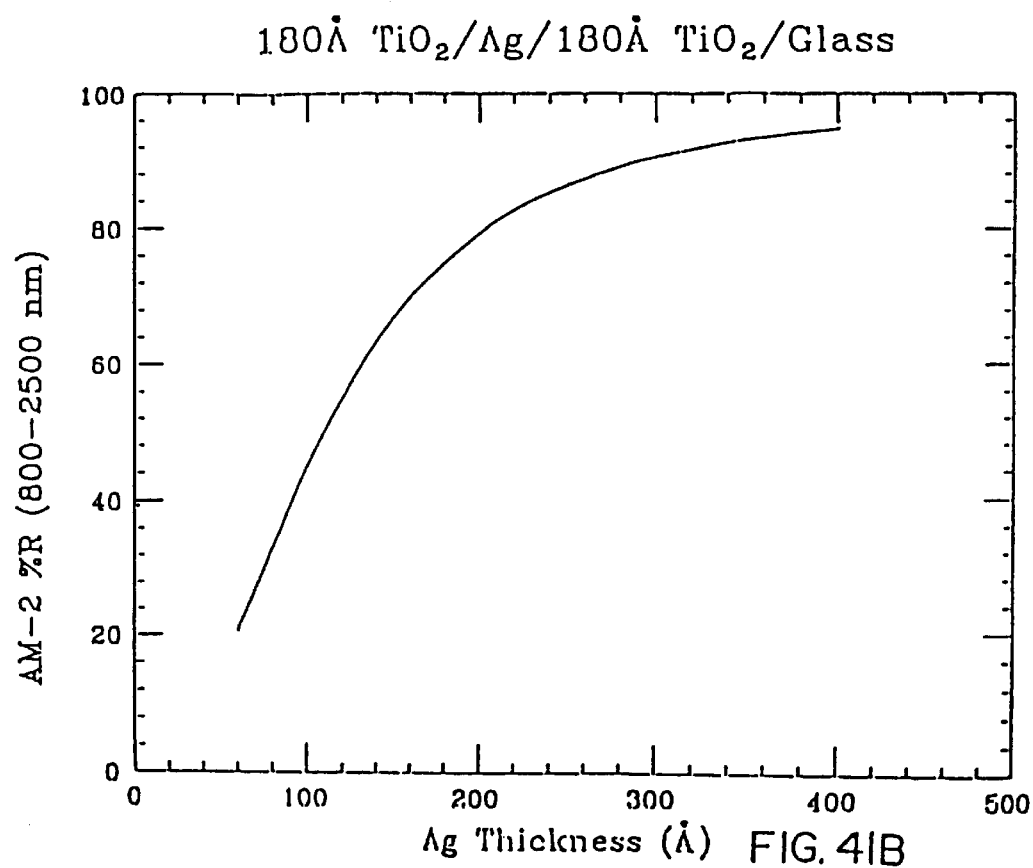
FIG. 41B is a graph similar to FIG. 41B but with the silver elemental thin film sandwiched between two 180 angstrom thick titanium dioxide layers on glass.

Whereas the ITO coating merely reflects less than 20% of the near-infrared portion of the solar insolation in the 800–2500 nm region, the heat reflectors incorporating a thin elemental metal film significantly reflect near-infrared radiation in this region with the Cardinal Heat Mirror reflecting 45% solar near-infrared radiation and the HM-55 film reflecting 81% in this region. The reason for this good near-infrared reflectance performance is illustrated in FIG. 41 which plots percent reflectance versus wavelength in the 800–2500 nm region for half-wave ITO, full-wave ITO, Cardinal Heat Mirror, and HM-55. The thin elemental metal film based near-infrared reflectors are seen to rise in reflectance earlier and sharper in the near-infrared region than what is achieved with the semiconducting ITO coatings. Thus, combination of thin elemental metal-based reflectors with electrochromic windows more closely approaches the ideal performance for automotive glazing which is independent control, via electrochromism, of visible light transmission while simultaneously achieving maximal (ideally 100%) reflectance of incoming near-infrared solar energy. In general, thin elemental metal-based reflectors useful to achieve the objectives of this invention reflect at least about 30% of Air Mass 2 near-infrared solar energy in the 800 nm to 2500 nm spectral range. The percent reflectance of near-infrared solar energy for Air Mass 2 in the 800 nm to 2500 nm spectral range for silver thin elemental metal films ranging in thickness from about 60 angstroms to about 400 angstroms and deposited onto a glass substrate is plotted in FIG. 41A. As the graph shows a silver film of at least about 60 angstroms, or thereabouts, thickness reflects at least about 37% of Air Mass 2 near-infrared solar energy in the 800 nm to 2500 nm spectral range. When a silver elemental thin film of thickness ranging from about 60 angstroms to 400 angstroms is sandwiched between two 180 angstroms titanium dioxide layers, with the resulting tri-layer stack itself deposited onto a glass substrate, the variation of percent reflectance of Air Mass 2 near-infrared solar energy in the 800 nm to 2500 nm spectral range versus thickness of the silver film is given in FIG. 41B. Note that the titanium dioxide layers have an anti-reflecting effect in this spectral region. For this stack design, a reflectivity in the 800–2500 nm spectral range for Air Mass 2 of at least about 30% is achieved for a silver film of at least about 75 angstroms or thereabouts.

Figure 42:
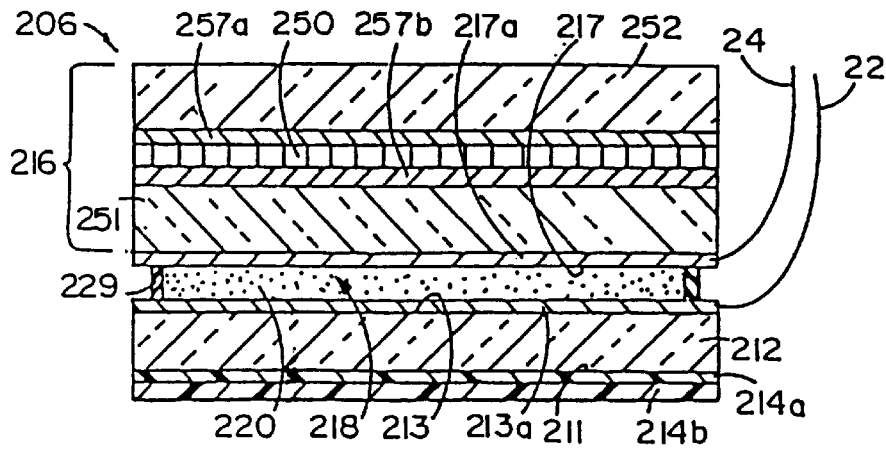
FIG. 42 is a sectional view of a third embodiment of the scatter protected, anti-lacerative, ultraviolet radiation protected, laminate, electrochromic, near-infrared attenuated glazing assembly of the present invention.

FIG. 42 illustrates another embodiment 206 of the invention, the performance of which is given in Table E.

TABLE E

| UV Attenuating, Near-IR Reflecting, Safety Protected Electrochromic Window | | | |
| --- | --- | --- | --- |
| UV 300–400 nm % T/% R | VISIBLE 400–800 nm % T/% R | NEAR-IR 800–2500 nm % T/% R | SOLAR 300–2500 nm % T/% R |
| Bleached 3.4%/10% | 22%/26% | 3.5%/29% | 14%/27% |
| Colored (1.0 volt) 0%/10% | 3.4%/26% | 2.6%/29% | 3%/29% |

Element 216 consists of panels 251, 252. Panel 252 is a blue-tinted, UV-absorbing specialized glass (3 mm thickness) available from Ford Glass Company, Detroit, Mich., under the trademark SUNGLA™ BLUE. Layers 257a and 257b are blue-tinted plasticized polyvinylbutyral sheeting, each of sheet thickness 0.030", available from E. I. duPont de Nemours and Company of Wilmington, Del., under the trade name BUTACITE™ Cobalt Blue B140 0547800. Layer 250 is a specialized near-infrared reflector available from Southwall Corporation of Palo Alto, Calif., under the trade name HM-55 film. Element 212 and panel 251 were coated on their respective surfaces 213 and 217 with a transparent conducting layer of full-wave indium tin oxide (ITO) of thickness approximately 3000 angstroms and of 7 ohms/square or thereabouts sheet resistance. The interpane gap 218 between elements 212 and 216 was about 135 microns in thickness. The electrochromic medium 220 was an electrochemichromic solution comprising:

| | |
|---|---|
| 0.035 M | ethylviologen perchlorate |
| 0.035 M | 5,10-dihydro-5,10-dimethylphenazine |
| 5% wt/vol | UVINUL ™ 400 (2,4-dihydroxy-benzophenone) | dissolved in a solvent comprising 75% by volume 3-hydroxypropionitrile and 25% glutaronitrile. Coloration was achieved by applying 1 volt potential across the electrochromic medium 220. Antilacerative layer 214 is a two-layer composite comprising an inner tear-resistant sheet 214A of plasticized polyvinylbutyral and an outer abrasion resistant layer 214b of polyester, and is marketed under the trademark BE 1028 by E. I. duPont, Wilmington, Del.

Figure 42A:
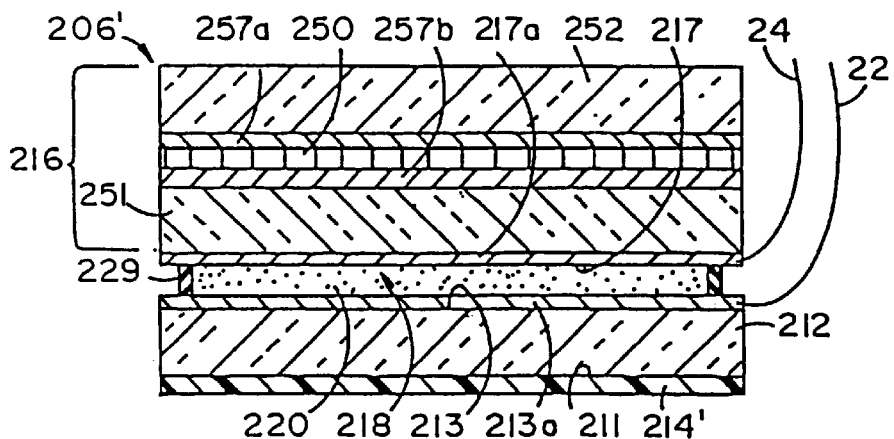
FIG. 42A is a sectional view of a fourth embodiment of the scatter protected, anti-lacerative, ultraviolet radiation protected, laminate, electrochromic, near infrared attenuated glazing assembly of the present invention.

Layer 214 can also include silicone moieties chemically incorporated in the anti-lacerative composite to prevent condensation and/or beading up of condensed water on the coated front surface 211 of element 212, in high humidity conditions thereby providing an anti-fogging, anti-misting result. A material found useful as anti-lacerative, anti-fogging layer is silicone impregnated polyurethane layer 214' of sunroof/glazing embodiment 206' shown in FIG. 42A. Layer 214' is supplied under the trade name CLARI-FLEX™ by Saint-Gobain Vitrage of Paris, France. UV reducing additives such as those described above in connection with FIG. 2 may also be incorporated in the anti-lacerative, anti-fogging layer to increase the lifetime of the assembly. Alternately, element 212 may be fashioned from conventional soda lime glass, UV reducing specialized glasses, or polymer plastics. It is also possible to utilize thin film coatings or UV reducing pairs or lacquers on at least one surface of front element 212 when the anti-lacerative, anti-fogging layer is incorporated. Likewise, it is possible to apply a near-infrared reflector incorporating a thin elemental metal film to front surface 211 of element 212.

The construction of FIG. 42 is particularly suited towards automotive sunroofs. As can be seen from Table E, transmission into the vehicle interior is only 14% of the solar Air Mass 2 spectrum, even in the bleached state and this decreases to only 3% when the electrochromic medium is colored. Note that visible transmission is 22% in the bleached state (acceptable in an automotive sunroof where the driver or vehicular occupant will be viewing the outside bright sky through the sunroof) which decreases to only about 3.4% visible transmission when the electrochromic medium is colored under 1.0 volt applied potential (desirable in that the driver or vehicular occupant perceives a significant visible attenuation when the electrochromic sunroof dims and also benefits from reduced solar glare). Further, and useful when both driving and parked, the total solar load transmitted into the car interior is drastically reduced, particularly when the electrochromic medium 220 is colored. Hence, the car can be parked for prolonged periods in a sunny climate without such a sunroof contributing significantly to heat-buildup in the car interior. Note also from Table E that UV transmission through the complete assembly 206 is very small when the device is bleached and is essentially eliminated when the device is colored. Such UV reduction is beneficial in avoiding degradation of interior trim such as seats and carpets.

The appearance of assembly 206, when viewed from the side of panel 252, is slightly but perceptively metallic-like in appearance whereas, when viewed from the side of layer 214, the appearance is more blue-like in transmission. This is a benefit in that, since panel 252 is on the exterior of the vehicle, assembly 206 has a more metallic appearance while, to the vehicular occupant, assembly 206 operates from a partial blue tint to a dark blue tint. Thus, the driver and occupants simultaneously benefit from a sense of privacy and from a sense of user-control over the sunroof tint. When dimming or dimmed, the change perceived from the outside of the vehicle is much less than that experienced viewing from the car interior to the outside sky. Thus, the outward appearance of the vehicle remains fairly constant (of benefit to designers who desire a style and color match of the sunroof or other glazing to the rest of the vehicle) while, simultaneously, the driver or occupants perceive good value for their investment in a controllable-tint glazing element. Also, the blue tint of the assembly, particularly in its fully or substantially bleached states, as seen in transmission from the interior vehicular cabin to the outside sky is particularly advantageous in that such blue tint selectively and preferably absorbs glare from the sun which is predominantly yellow in color while simultaneously transmitting wavelengths in the blue and green region from 400 nm to 560 nm, and so preserving the blue, natural color of the sky. Further, use of tinted means such as blue tinted glass, blue tinted polymer layers and blue dyes in the assembly allow use of increased concentrations of UV stabilizers and absorbers while avoiding the consumer undesirable yellow tint that usually accompanies such use of high concentrations of UV stabilizers and absorbers. In window assemblies, excellent UV stabilization is particularly important given that the electrochromic device will be exposed to intense UV solar radiation, typically while in its colored state.

Also, for additional scatter protection and safety, in any of the above disclosed mirror assembly embodiments, any of the glass panels of the assemblies could be formed from safety glass that has been tempered and/or toughened by conventional means including thermal, contact and chemical tempering. Also, such tempered, safety glass can be glue or green tinted to provide the advantages described above. In addition, layer 214 provides occupant protection against injury due to scattered glass or lacerative contact with broken shards and prevents immediate occupant and interior trim contact with the solvents and chemicals used in electrochromic medium 220. Likewise, and particularly for applications such as a sunroof, sun visor, or shade band where sun glare reduction, good shading efficiency, and good thermal insulation performance is desirable, at least one of elements 212, 216, 251 and 252 can be formed from architectural glass such as SOLARBRONZE™, a bronze tinted glass; SOLARGRAY™, a gray tinted glass; GRAYLITE™, a dark gray tinted glass; and SOLEX™, a green tinted glass; all available from Pittsburgh Plate Glass Industries of Pittsburgh, Pa.; SUNGLAS™Gray, a gray tinted glass; and SUNGLAS™ bronze, a bronze tinted glass; available from Ford Glass Company, Detroit, Mich.; and with E-Z-EYE™, a green tinted glass; available from Libby Ownes Ford of Toledo, Ohio. Further, elements 212, 216, 251 and 252 can be coated with low-emittance monolithic architectural coatings such as SUNGATE™ 100, a low emittance, high transmittance coating available from Pittsburgh Plate Glass Industries of Pittsburgh, Pa.; and SUN-GLAS™ HR, a low emittance, high transmittance coating available from Ford Glass Company, Detroit, Mich. Also, ECLIPSE™, a pyrolytic Low-E coating available from Libby Ownes Ford of Toledo, Ohio can be used. Further, elements 212, 216, 251 and 252 can be coated with vacuum deposited architectural coatings such as SOLARBAN™ available from Pittsburgh Plate Glass Industries of Pittsburgh, Pa., or can be coated with KOOLOF™, a solar control coating available from Libby Ownes Ford of Toledo, Ohio.

Figure 43:
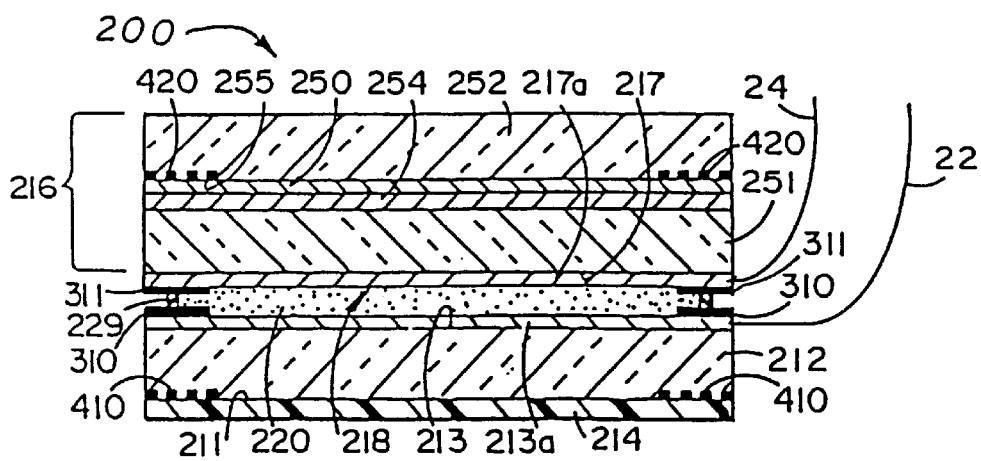
FIG. 43 is a sectional view of perimetal coatings which can applied to the scatter protected anti-lacerative, ultraviolet radiation protected, laminate, electrochromic, near-infrared attenuated glazing assemblies of the present invention.

Further, Perimetric or Perimeter coatings and darkened/color matched seals, as described in U.S. Pat. No. 5,066,112 PERIMETER COATED, ELECTRO-OPTIC MIRROR, invented by Niall R Lynam, the disclosure of which is hereby incorporated by reference herein, can be applied to window glazing constructions such as shown in FIGS. 37, 40 and 43. For example, Perimetric or Perimeter coatings, 310 and 311 of FIG. 43, of a conductive black frit or paint, can be applied around the perimeter of surface layers 213a and 217a so as to hide from view the seal 229 and the connection of electrical leads 22, 24 to layers 213a, 217a. A suitable material is ENGLEHARD SC 6002 (# 6082), a platinum/palladium conductive ink available from Englehard corporation of Iselin, N.J. Also, seal 229 can be color matched to any bezels, gaskets, encapsulants, or vehicular body moldings used to fix the electrochromic window assembly into a vehicle. For example, carbon black, in a nonconducting form, could be added to seal 229 in order to render it color matched to any black or dark rubber or plastic encapsulation means used to secure the electrochromic assembly into the vehicle. Alternately, perimetric or perimeter coatings 410, 420, as shown by the dashed lines on FIG. 43, and formed from, for example, a frit material such as DRAKENFELD™ black enamel 24-1729 available from Drakenfeld Colors of Wilmington, Pa., can be used to obscure from view the seal/electrical means used in the assembly.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follows.

What is claimed is:

1. A reduced ultraviolet transmitting, safety protected electrochromic vehicular glazing assembly adapted for mounting in a vehicle having an interior and an exterior, said assembly comprising:

first and second spaced transparent panels, said first panel located closest to said exterior of said vehicle when said assembly is mounted in said vehicle and said second panel located closest to said interior of said vehicle when said assembly is mounted in said vehicle;

said first and said second panels each having a front surface and an opposing rear surface, said rear surface of said first panel facing and spaced from said front surface of said second panel defining a space between said first and second panels, said rear surface of said first panel and said front surface of said second panel coated with a transparent electrical conductor;

an electrochromic medium disposed in said space whose light transmittance is variable upon the application of an electric field thereto;

ultraviolet radiation reducing means incorporated in said assembly for reducing ultraviolet radiation transmission through said assembly; and a polymeric antilacerative layer disposed on said rear surface of said second panel for preventing lacerative injuries should said second panel crack or break.

2. The vehicular glazing assembly of claim 1 wherein said glazing assembly comprises a vehicle window.

3. The vehicular glazing assembly of claim 1 wherein said glazing assembly comprises a vehicle sunroof.

4. The vehicular glazing assembly of claim 1 wherein said glazing assembly comprises a vehicle sun visor.

5. The vehicular glazing assembly of claim 1 wherein said glazing assembly comprises a vehicle shade band.

6. The vehicular glazing assembly of claim 1 wherein at least one of said first and second panels comprises a tempered, safety glass panel.

7. The vehicular glazing assembly of claim 6 wherein each of said first and second panels comprises a tempered, safety glass panel.

8. The vehicular glazing assembly of claim 1 wherein at least said first panel comprises a tempered, safety glass panel.

9. The vehicular glazing assembly of claim 1 wherein at least one of said first and second panels comprises a tinted glass panel.

10. The vehicular glazing assembly of claim 9 wherein said tinted glass panel has a tint selected from the group consisting of a blue tint, a green tint, a blue/green tint, a bronze tint and a gray tint.

11. The vehicular glazing assembly of claim 1 wherein said antilacerative layer comprises a single-layer polymer film.

12. The vehicular glazing assembly of claim 11 wherein said single-layer polymer film comprises polyurethane.

13. The vehicular glazing assembly of claim 1 wherein said antilacerative layer comprises a two-layer polymer film.

14. The vehicular glazing assembly of claim 13 wherein one layer of said two-layer polymer film comprises plasticized polyvinylbutyral.

15. The vehicular glazing assembly of claim 14 wherein the other layer of said two-layer polymer film comprises polyester and wherein said polyvinylbutyral layer is disposed between said polyester layer and said rear surface of said second panel.

16. The vehicular glazing assembly of claim 1 wherein at least one of said first and second panels comprises a glass panel bent to a compound curvature.

17. The vehicular glazing assembly of claim 1 wherein at least said first panel comprises a glass panel bent to a compound curvature.

18. The vehicular glazing assembly of claim 1 wherein said antilacerative layer has a thickness in the range from about 0.005 inches to about 0.25 inches.

19. The vehicular glazing assembly of claim 18 wherein said antilacerative layer has a thickness in the range from about 0.01 inches to about 0.06 inches.

20. The vehicular glazing assembly of claim 1 wherein said antilacerative layer comprises a tear-resistant, resilient material.

21. The vehicular glazing assembly of claim 1 wherein said antilacerative layer comprises a flexible polymer film.

22. The vehicular glazing assembly of claim 21 wherein said flexible polymer film is adhesively attached to said rear surface of said second panel.

23. The vehicular glazing assembly of claim 1 wherein said transparent conductor comprises one of indium tin oxide, doped tin oxide and doped zinc oxide.

24. The vehicular glazing assembly of claim 1 wherein at least one of said first and second panels comprises a specialized glass transmitting in the visible portion of the electromagnetic spectrum and having reduced transmission in the ultraviolet portion of the electromagnetic spectrum.

25. The vehicular glazing assembly of claim 1 wherein at least said first panel comprises a specialized glass transmitting in the visible portion of the electromagnetic spectrum and having reduced transmission in the ultraviolet portion of the electromagnetic spectrum.

26. The vehicular glazing assembly of claim 25 wherein at least said first panel comprises a tempered, safety glass panel.

27. The vehicular glazing assembly of claim 26 wherein at least said first panel comprises a glass panel bent to a compound curvature.

28. The vehicular glazing assembly of claim 1 wherein said assembly incorporates spectrally absorbing means for absorbing more light in those regions of the visible spectrum from about 560 nanometers to about 780 nanometers than is absorbed in those regions of the visible spectrum from about 400 nanometers to about 560 nanometers.

29. The vehicular glazing assembly of claim 1 wherein said ultraviolet reducing means comprises an additive for absorbing, blocking and/or screening ultraviolet radiation.

30. The vehicular glazing assembly of claim 29 wherein said additive is selected from the group consisting of benzophenones, cinnamic acid derivatives, esters of benzoin acids, salicyclic acid, terephthalic and isophthalic acids with resorcinol and phenols, pentamethyl piperidine derivatives, salicylates, benzotriazoles, cyanoacrylates, benzilidenes, malonates, hindered amines, organo-nickel complexes, nickel chelates and oxalanilides.

31. The vehicular glazing assembly of claim 29 wherein said additive comprises a benzophenone.

32. The vehicular glazing assembly of claim 29 wherein said additive comprises a benzotriazole.

33. The vehicular glazing assembly of claim 29 wherein said additive comprises a cyanoacrylate.

34. The vehicular glazing assembly of claim 29 wherein said electrochromic medium includes said additive.

35. The vehicular glazing assembly of claim 29 wherein said antilacerative layer includes said additive.

36. The vehicular glazing assembly of claim 1 wherein said assembly includes near-infrared radiation transmission reducing means.

37. The vehicular glazing assembly of claim 36 wherein said near-infrared radiation transmission reducing means are located on at least one of said first panel, said second panel and said antilacerative layer.

38. The vehicular glazing assembly of claim 36 wherein said near-infrared radiation transmission reducing means comprises a near-infrared reflector deposited onto one of a polymer sheet and a polymer film.

39. The vehicular glazing assembly of claim 1 wherein said antilacerative layer comprises an anti-fogging antilacerative layer.

* * * * *

UNITED STATES PATENT AND TRADEMARK OFFICE
CERTIFICATE OF CORRECTION

PATENT NO.    : 6,122,093
DATED         : September 19, 2000
INVENTOR(S)   : Niall R. Lynam It is certified that error appears in the above-identified patent and that said Letters Patent is hereby corrected as shown below:

Column 39,
Line 40, insert -- optically -- after "spaced"

Signed and Sealed this

Fifth Day of November, 2002

Attest:

JAMES E. ROGAN
Attesting Officer          Director of the United States Patent and Trademark Office